United States Patent
Reznik et al.

(10) Patent No.: US 8,631,060 B2
(45) Date of Patent: Jan. 14, 2014

(54) FAST ALGORITHMS FOR COMPUTATION OF 5-POINT DCT-II, DCT-IV, AND DST-IV, AND ARCHITECTURES

(75) Inventors: Yuriy Reznik, San Diego, CA (US); Ravi Kiran Chivukula, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 1221 days.

(21) Appl. No.: 12/334,238

(22) Filed: Dec. 12, 2008

(65) Prior Publication Data

US 2009/0157785 A1 Jun. 18, 2009

Related U.S. Application Data

(60) Provisional application No. 61/013,579, filed on Dec. 13, 2007, provisional application No. 61/016,106, filed on Dec. 21, 2007, provisional application No. 61/039,194, filed on Mar. 25, 2008.

(51) Int. Cl.
*G06F 17/14* (2006.01)

(52) U.S. Cl.
USPC .......................................... 708/400; 708/402

(58) Field of Classification Search
USPC ................................. 708/402, 400
See application file for complete search history.

(56) References Cited

U.S. PATENT DOCUMENTS

| | | | |
|---|---|---|---|
| 6,496,795 B1 | 12/2002 | Malvar | |
| 7,216,140 B1* | 5/2007 | Chen et al. | 708/607 |
| 2002/0040299 A1 | 4/2002 | Makino et al. | |
| 2009/0103825 A1* | 4/2009 | Wang et al. | 382/250 |

FOREIGN PATENT DOCUMENTS

| | | |
|---|---|---|
| CN | 1886737 A | 12/2006 |
| EP | 1175030 A2 | 1/2002 |
| RU | 2131169 | 5/1999 |
| RU | 2216791 C1 | 11/2003 |
| RU | 2289858 C2 | 12/2006 |
| TW | 507194 B | 10/2002 |
| TW | 533405 B | 5/2003 |
| TW | 546630 B | 8/2003 |
| TW | I321810 B | 3/2010 |
| WO | 9501680 A1 | 1/1995 |
| WO | 03063135 A1 | 7/2003 |
| WO | 2005073959 A1 | 8/2005 |

OTHER PUBLICATIONS

Krishnan et al., "Fast and Lossless Implemetnation of the Forward and Inverse MDCT Computation in MPEG Audio Coding", IEEE, 2002, pp. 181-184.*

Muddhasani et al., "Bininear Algorithms for Discrete Cosine Transforms of Pime lengths", Signal processing, 2006, pp. 2391-2406.*

(Continued)

*Primary Examiner* — Chuong D Ngo
(74) *Attorney, Agent, or Firm* — Espartaco Diaz Hidalgo

(57) ABSTRACT

A more efficient encoder/decoder is provided in which an N-point MDCT transform is mapped into smaller sized N/2-point DCT-IV, DST-IV and/or DCT-II transforms. The MDCT may be systematically decimated by factor of 2 by utilizing a uniformly scaled 5-point DCT-II core function as opposed to the DCT-IV or FFT cores used in many existing MDCT designs in audio codecs. Various transform factorizations of the 5-point transforms may be implemented to more efficiently implement a transform.

52 Claims, 32 Drawing Sheets

(56) References Cited

OTHER PUBLICATIONS

Kim et al., "A new optimized algorithm for computation of MDCT and its inverse transform," Proceedings of the 2004 International Symposium on Intelligent Signal Processing and Communications Systems, Seoul, Korea, Nov. 18, 2004, pp. 528-530.

Britanak, Vladimir et al., "An efficient implementation of the forward and inverse MDCT in MPEG audio coding," IEEE Signal Processing Letters, vol. 8, No. 2, Feb. 1, 2001.

Cheng, Mu-Huo et al., "Fast IMDCT and MDCT algorithms—A Matrix Approach," IEEE Transactions on Signal Processing, vol. 51, No. 1, Jan. 1, 2003.

Kok C.W., "Fast algorithm for computing discrete cosine transform," IEEE Transactions on Signal Processing, vol. 45, No. 3, Mar. 1, 1997.

Heideman M.T., "Computation of an odd-length DCT from a real-valued DFT of the same length," IEEE Transactions on Signal Processing, vol. 40, No. 1, Jan. 1, 1992, pp. 54-61.

Silverman H.F., "An introduction to programming the Winograd Fourier transform algorithm (WFTA)." IEEE Transactions on Acoustics, Speech and Signal Processing, vol. 25, No. 2, Apr. 1, 1977, pp. 152-165.

Sivlerman H.F., "Corrections and addendum to an introduction to programming the Winograd Fourier transform algorithm (WFTA)," IEEE Transactions on Acoustics, Speech and Signal Processing, vol. assp-26, No. 3, Jun. 1, 1978, p. 268.

Chivukula, Ravi K. et al.. "Efficient Implementation of a class of MDCT/IMDCT filterbanks for speech and audio coding applications," Acoustics, Speech and Signal Processing, 2008, Mar. 31, 2008, pp. 213-216.

Chivukula et al., "Fast algorithms for MDCT and low delay fliterbanks used in audio coding," Internet Citation, Aug. 8, 2008, p. Complete.

International Search Report—PCT/US08/086739. International Search Authority—European Patent Office, Feb. 23, 2009.

Written Opinion—PCT/US08/086739, International Search Authority—European Patent Office, Feb. 23, 2009.

Taiwan Search Report—TW097148864—TIPO—Dec. 28, 2012.

\* cited by examiner

FAST ALGORITHMS FOR COMPUTATION OF 5-POINT DCT-II, DCT-IV, AND DST-IV, AND ARCHITECTURES

CLAIM OF PRIORITY UNDER 35 U.S.C. §119

The Present Application for Patent claims priority to U.S. Provisional Application No. 61/013,579 entitled "Fast Algorithms for Computation of 5-Point DCT-II, DCT-IV, and DST-V, and Architecture for Design of Transforms of Size N=5*$2^K$" filed Dec. 13, 2007, U.S. Provisional Application No. 61/016,106, entitled "Fast Algorithms for Computation of 5-Point DCT-III, DCT-IV, and DST-V, and Architecture for Design of Transforms of Size N=5*$2^K$", filed on Dec. 21, 2007, and U.S. Provisional Application No. 61/039,194 entitled "G.EV-VBR MDCT Module" filed Mar. 25, 2008, both assigned to the assignee hereof and hereby expressly incorporated by reference herein.

BACKGROUND

1. Field

The following description generally relates to encoders and decoders and, in particular, to an efficient MDCT/IMDCT implementation for voice and audio codecs.

2. Background

One goal of audio coding is to compress an audio signal into a desired limited information quantity while keeping as much as the original sound quality as possible. In an encoding process, an audio signal in a time domain is transformed into a frequency domain, and a corresponding decoding process reverses such operation.

As part of such an encoding process, a signal may be processed by a modified discrete cosine transform (MDCT). The modified discrete cosine transform (MDCT) is a Fourier-related transform based on the type-IV discrete cosine transform (DCT-IV), with the additional property that blocks are overlapped so that the ending of one block coincides with the beginning of the next block. This overlapping helps to avoid aliasing artifacts, and in addition to the energy-compaction qualities of the DCT, makes the MDCT especially attractive for signal compression applications.

MDCT transform has also found applications in speech compression. ITU-T G.722.1 and G.722.1C vocoders apply MDCT on input speech signal, while more recent ITU-T G.729.1 and G.718 algorithms use it to process residual signal, remaining after the use of Code Excited Linear Prediction (CELP) encoder. The above mentioned vocoders operate with input sampling rates of either 8 kHz or 16 kHz, and 10 or 20-millisecond frames. Hence, their MDCT filterbanks are either 160 or 320-point transforms.

However, if future speech coders will support block-switching functionality support for decimated sizes (e.g. 160, 80, 40-points) may also be needed. Consequently, efficient implementations of small transform sizes are desirable to implement a larger transform using a small size core transform.

SUMMARY

The following presents a simplified summary of one or more embodiments in order to provide a basic understanding of some embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

An encoding method and/or device are provided for computing transform values. Time-domain input values representing an audio signal are received. The input values are transformed into spectral coefficients using a Modified Discrete Cosine Transform (MDCT) that is recursively decimated into a plurality of 5-point transforms. Various factorizations may be implemented to efficiently process the 5-point transform.

In one example (FIG. 5), at least one of the plurality of 5-point transforms may include at least one Discrete Cosine Transform type II (DCT-II) (502) factorized by twelve (12) addition operations, eight (8) multiplication operations, and a longest path length of three (3) operations. For instance, at least one of the plurality of 5-point transforms includes at least one Discrete Cosine Transform type II (DCT-II) (502) that takes an input vector [x0, x1, x2, x3, x4] to produce an output vector [X0, X1, X2, X3, X4] and is characterized by at least a plurality of the intermediate results intermediate results of:

$w0=x0-x4;$ $w4=x0+x4;$ $w1=x1-x3;$ $w3=x1+x3;$ $u2=x2+w3+w4;$ $u3=-d*w3+c*w4;$ $u4=d*w4+c*w3;$ such that $X0=u2;$ $X1=b*w1+a*w0;$ $X2=u3-x0;$ $X3=a*w1-b*w0;$ $X4=u4+x0;$ where $a = \sqrt{2}\cos\left(\frac{\pi}{10}\right); b = \cos\left(\frac{3\pi}{10}\right); c = -\cos\left(\frac{\pi}{5}\right);$ and $d = \cos\left(\frac{2\pi}{5}\right).$ In another example (FIG. 6), at least one of the plurality of 5-point transforms includes at least one Discrete Cosine Transform type II (DCT-II) (602) factorized by twelve (12) addition operations, five (5) multiplication operations, two (2) shift operations, and a longest path length of four (4) operations. For instance, at least one of the plurality of 5-point transforms includes at least one Discrete Cosine Transform type II (DCT-II) (602) that takes an input vector [x0, x1, x2, x3, x4] to produce an output vector [X0, X1, X2, X3, X4] and is characterized by at least a plurality of the intermediate results of:

$w0=x0-x4;$ $w1=x1-x3;$ $z2=x1+x3$;

$z4=x0+x4$;

$u2=z2+z4$;

such that $X0=u2+x2$;

$X1=b*w1+a*w0$;

$X2=c*u2+0.5*z2-x2$;

$X3=a*w1-b*w0$;

$X4==-c*u2-0.5*z4+x2$;

where $a = \sqrt{2}\cos(\frac{\pi}{10})$; $b = \cos(\frac{3\pi}{10})$; $c = -\cos(\frac{\pi}{5})$;

and $d = \cos(\frac{2\pi}{5})$.

In another example (FIG. 7), at least one of the plurality of 5-point transforms may include at least one Discrete Cosine Transform type II (DCT-II) (702) factorized by twelve (12) addition operations, five (5) multiplication operations, one (1) shift operation, and a longest path length of four (4) operations. For instance, at least one of the plurality of 5-point transforms includes at least one Discrete Cosine Transform type II (DCT-II) (702) that takes an input vector [x0, x1, x2, x3, x4] to produce an output vector [X0, X1, X2, X3, X4] and is characterized by having intermediate results of:

$w0=x0-x4$;

$w1=x1-x3$;

$z2=x1+x3$;

$z4=x0+x4$;

$t2=z2+z4$;

$t4=z2-z4$;

$c'=c+0.25$;

such that $X0=t2+x2$;

$X1=b*w1+a*w0$;

$X2=c'*t2-0.25*t4-x2=0.25*t4+c'*t2-x2$);

$X3=a*w1-b*w0$;

$X4=-c'*t2-0.25*t4+x2=0.25*t4-(c'*t2-x2)$;

where $a = \sqrt{2}\cos(\frac{\pi}{10})$; $b = \cos(\frac{3\pi}{10})$; $c = -\cos(\frac{\pi}{5})$;

and $d = \cos(\frac{2\pi}{5})$.

In another example (FIG. 8), at least one of the plurality of 5-point transforms may include at least one Discrete Cosine Transform type II (DCT-II) (802) factorized by twelve (12) addition operations, four (4) multiplication operations, two (2) shift operations, and a longest path length of four (4) operations. For instance, at least one of the plurality of 5-point transforms includes at least one Discrete Cosine Transform type II (DCT-II) (802) that takes an input vector [x0, x1, x2, x3, x4] to produce an output vector [X0, X1, X2, X3, X4] and is characterized by at least a plurality of the intermediate results:

$w1=x0+x4$;

$w2=x4-x0$;

$w3=x3-x1$;

$w4=x3+x1$;

$w5=w1+w4$;

$w6=w4-w1$;

$u1=x2-\alpha w5$;

$u2=x2+w5$;

$u3=\beta w2+\gamma w3$;

$u4=\beta w3-\gamma w2$;

$u5=\delta w6$;

such that $X0=u2$;

$X1=u4$;

$X2=u4-u1$;

$X3=u3$;

$X4=u1+u5$;

where $a = \frac{1}{4}$; $\beta = \cos(\frac{3\pi}{10})$; $\gamma = -\cos(\frac{\pi}{10})$; and $\delta = -\frac{\sqrt{5}}{4}$.

Alternatively, at least one of the plurality of 5-point transforms may include at least one transform (802) factorized by twelve (12) addition operations, five (5) multiplication operations, one (1) shift operation, and a longest path length of four (4) operations.

In another example (FIG. 9), at least one of the plurality of 5-point transforms may include a Discrete Cosine Transform type IV (DCT-IV) (902) factorized by twenty (20) addition operations, sixteen (16) multiplication operations, and a longest path length of three (3) operations. For instance, at least one of the plurality of 5-point transforms may include at least one Discrete Cosine Transform type IV (DCT-IV) (902) that takes an input vector [x0, x1, x2, x3, x4] to produce an output vector [X0, X1, X2, X3, X4] and is characterized by at least a plurality of the intermediate results:

$k1=g*x1+h*x3$;

$k2=h*x1+g*x3$;

$k3=f*x0+i*x4$;

$k4=i*x0+f*x4;$ $k5=i*x1-f*x3;$ $k6=-f*x1+i*x3;$ $k7=g*x0-h*x4;$ $k8=h*x0-g*x4;$ $j1=x0+x4;$ $j2=x3-x1;$ such that $X0=k3+k1+x2;$ $X1=k7+k5-x2;$ $X2=j1+j2-x2;$ $X3=h*x0-g*x4-f*x1+i*x3+x2;$ $X4=k4-k2+x2.$ where $f = \sqrt{2}\cos(\frac{\pi}{20});$ $g = \sqrt{2}\cos\left(\frac{3\pi}{20}\right);$ $h = \sqrt{2}\cos\left(\frac{7\pi}{20}\right);$ and $i = \sqrt{2}\cos\left(\frac{9\pi}{20}\right).$ In another example (FIG. 10), at least one of the plurality of 5-point transforms may include a Discrete Cosine Transform type IV (DCT-IV) (1002) factorized by twenty (20) addition operations, twelve (12) multiplication operations, and a longest path length of four (4) operations. For instance, at least one of the plurality of 5-point transforms may include at least one Discrete Cosine Transform type IV (DCT-IV) (1002) that takes an input vector [x0, x1, x2, x3, x4] to produce an output vector [X0, X1, X2, X3, X4] and is characterized by at least a plurality of the intermediate results:

$q1=x0+x4;$ $q2=x3-x1;$ $p1=(x1-x3)*g-x1*(g+h)=q2*g-x1*(g+h);$ $p2=(x1-x3)*g+x3*(h+g)=q2*g+x3*(g+h);$ $p3=(x0+x4)*f+x0*(i-f)=q1*f+x0*(i-f);$ $p4=(x0+x4)*f+x4*(i-f)=q1*f+x4*(i-f);$ $p5=(x3-x1)*f+x3*(i-f)=q2*f+x3*(i-f);$ $p6=(x3-x1)*f-x1*(i-f)=q2*f-x1*(i-f);$ $p7=(x0+x4)*g+x0*(h+g)=q1*g+x0*(h+g);$ $p8=(x0+x4)*g+x4*(h+g)=q1*g+x4*(h+g);$ such that:

$X0=p2+p4+x2;$ $X1=p5+p7-x2;$ $X2=q1+q2-x2;$ $X3=p6+p8+x2;$ $X4=p1+p3+x2.$ where $f = \sqrt{2}\cos(\frac{\pi}{20});$ $g = \sqrt{2}\cos\left(\frac{3\pi}{20}\right);$ $h = \sqrt{2}\cos\left(\frac{7\pi}{20}\right);$ and $i = \sqrt{2}\cos\left(\frac{9\pi}{20}\right).$ In another example (FIG. 14), at least one of the plurality of 5-point transforms may include a Discrete Cosine Transform type IV (DCT-IV) (1402) factorized by sixteen (16) addition operations, nine (9) multiplication operations, and a longest path length of five (5) operations. For instance, at least one of the plurality of 5-point transforms may include at least one Discrete Cosine Transform type IV (DCT-IV) (1402) that takes an input vector [x0, x1, x2, x3, x4] to produce an output vector [X0, X1, X2, X3, X4] and is characterized by at least a plurality of the intermediate results:

$w0=f*x0-i*x4;$ $w1=g*x1-h*x3;$ $z2=g*x1+h*x3;$ $z4=f*x0+i*x4;$ $v1=2b*w1+2a*w0;$ $v2=z2+z4;$ $v3=2b*w0-2a*w1;$ $y2=2c*v2+z2-2*x2;$ $y4=-2c*v2-z4+2*x2;$ such that:

$X0=v2+x2;$ $X1=v1-2*X0;$ $X2=y2-X1;$ $X3=v3-X2;$ $X4=y4-X3;$ where $a = \sqrt{2}\cos(\frac{\pi}{10});$ $b = \cos\left(\frac{3\pi}{10}\right);$ $c = -\cos(\frac{\pi}{5});$ and $d = \cos\left(\frac{2\pi}{5}\right);$ $f = \sqrt{2}\cos(\frac{\pi}{20});$ -continued $$g = \sqrt{2}\cos\left(\frac{3\pi}{20}\right);$$

$$h = \sqrt{2}\cos\left(\frac{7\pi}{20}\right);$$

$$\text{and } i = \sqrt{2}\cos\left(\frac{9\pi}{20}\right).$$

In another example (FIG. 15), wherein at least one of the plurality of 5-point transforms may include a Discrete Cosine Transform type IV (DCT-IV) (1502) factorized by fifteen (15) addition operations, ten (10) multiplication operations, two shift (2) operations, and a longest path length of five (5) operations. For instance, at least one of the plurality of 5-point transforms may include at least one Discrete Cosine Transform type IV (DCT-IV) (1502) that takes an input vector [x0, x1, x2, x3, x4] to produce an output vector [X0, X1, X2, X3, X4] and is characterized by at least a plurality of the intermediate results of:

$w0=f*x0-i*x4;$ $w1=g*x1-h*x3;$ $z2=g*x1+h*x3;$ $z4=f*x0+i*x4;$ $v1=2b*w1+2a*w0;$ $v2=z2+z4;$ $v3=2b*w0-2a*w1;$ $y2=(2c+2)*v2+z2;$ $y4=2c*v2+z4;$ such that $X0=v2+x2;$ $X1=v1-2*X0;$ $X2=y2-v1;$ $X3=v3-X2;$ $X4=-y4+2*x2-X3;$ where $a = \sqrt{2}\cos\left(\frac{\pi}{10}\right);$ $b = \cos\left(\frac{3\pi}{10}\right);$ $c = -\cos\left(\frac{\pi}{5}\right);$ and $d = \cos\left(\frac{2\pi}{5}\right);$ $f = \sqrt{2}\cos\left(\frac{\pi}{20}\right);$ $g = \sqrt{2}\cos\left(\frac{3\pi}{20}\right);$ $h = \sqrt{2}\cos\left(\frac{7\pi}{20}\right);$ and $i = \sqrt{2}\cos\left(\frac{9\pi}{20}\right).$ In another example (FIG. 16), at least one of the plurality of 5-point transforms may include a Discrete Cosine Transform type IV (DCT-IV) (1602/1702) factorized by fifteen (15) addition operations, eleven (11) multiplication operations, two shift (2) operations, and a longest path length of five (5) operations. For instance, at least one of the plurality of 5-point transforms may include at least one Discrete Cosine Transform type IV (DCT-IV) (1602) that takes an input vector [x0, x1, x2, x3, x4] to produce an output vector [X0, X1, X2, X3, X4] and is characterized by at least a plurality of the intermediate results of:

$w0=f*x0-i*x4;$ $w1=g*x1-h*x3;$ $z2=g*x1+h*x3;$ $z4=f*x0+i*x4;$ $v1=2b*w1+2a*w0;$ $v2=z2+z4;$ $v3=2b*w0-2a*w1;$ $d2=(2c+2)*z2+(2c+2)*z4;$ $d4=(2c+2)*z4+2c*z2;$ such that:

$X0=z2+z4+x2;$ $X1=v1-2*X0;$ $X2=d2-v1;$ $X3=v3-X2;$ $X4=-d4+2*x2-X3;$ where $a = \sqrt{2}\cos\left(\frac{\pi}{10}\right);$ $b = \cos\left(\frac{3\pi}{10}\right);$ $c = -\cos\left(\frac{\pi}{5}\right);$ and $d = \cos\left(\frac{2\pi}{5}\right);$ $f = \sqrt{2}\cos\left(\frac{\pi}{20}\right);$ $g = \sqrt{2}\cos\left(\frac{3\pi}{20}\right);$ $h = \sqrt{2}\cos\left(\frac{7\pi}{20}\right);$ and $i = \sqrt{2}\cos\left(\frac{9\pi}{20}\right).$ In another example (FIG. 17), at least one of the plurality of 5-point transforms may include at least one Discrete Cosine Transform type IV (DCT-IV) (1702) that takes an input vector [x0, x1, x2, x3, x4] to produce an output vector [X0, X1, X2, X3, X4] and is characterized by at least a plurality of the intermediate results of:

$w0 = f*x0 - i*x4;$ $w1 = g*x1 - h*x3;$ $z2 = g*x1 + h*x3;$ $z4 = f*x0 + i*x4;$ $z1 = 2a*w0 + 2b*w1$ $z3 = (2b+2a)*w0 - (2a-2b)*w1;$ $d2 = 2(c+2)*z2 + (2c+2)*z4;$ $d4 = (2c+2)*z4 + 2c*z2;$ such that:

$X0 = z2 + z4 + x2;$ $X1 = z1 - 2*X0;$ $X2 = d2 - z1;$ $X3 = z3 - d2;$ $X4 = -d4 + 2*x2 - X3;$ where $a = \sqrt{2} \cos\left(\frac{\pi}{10}\right);$ $b = \cos\left(\frac{3\pi}{10}\right);$ $c = -\cos\left(\frac{\pi}{5}\right);$ and $d = \cos\left(\frac{2\pi}{5}\right);$ $f = \sqrt{2} \cos\left(\frac{\pi}{20}\right);$ $g = \sqrt{2} \cos\left(\frac{3\pi}{20}\right);$ $h = \sqrt{2} \cos\left(\frac{7\pi}{20}\right);$ and $i = \sqrt{2} \cos\left(\frac{9\pi}{20}\right).$ In another example (FIG. 18), at least one of the plurality of 5-point transforms may include a Discrete Cosine Transform type IV (DCT-IV) (1802) factorized by fifteen (15) addition operations, twelve (12) multiplication operations, two (2) shift operations, and a longest path length of five (5) operations. For instance, at least one of the plurality of 5-point transforms may include at least one Discrete Cosine Transform type IV (DCT-IV) (1802) that takes an input vector [x0, x1, x2, x3, x4] to produce an output vector [X0, X1, X2, X3, X4] and is characterized by intermediate results of:

$w0 = f*x0 - i*x4;$ $w1 = g*x1 - h*x3;$ $z2 = g*x1 + h*x3;$ $z4 = f*x0 + i*x4;$ $z1 = 2a*w0 + 2b*w1$ $z3 = (2b+2a)*w0 - (2a-2b)*w1;$ $r2 = (2c+2)*z2 + (2c+2)*z4;$ $r4 = 4(c+1)*z2 + 4(c+1)*z4.$ such that $X0 = z2 + z4 + x2;$ $X1 = z1 - 2*X0;$ $X2 = d2 - z1;$ $X3 = z3 - r2;$ $X4 = -r4 + 2*x2 - z3;$ where $a = \sqrt{2} \cos\left(\frac{\pi}{10}\right);$ $b = \cos\left(\frac{3\pi}{10}\right);$ $c = -\cos\left(\frac{\pi}{5}\right);$ and $d = \cos\left(\frac{2\pi}{5}\right);$ $f = \sqrt{2} \cos\left(\frac{\pi}{20}\right);$ $g = \sqrt{2} \cos\left(\frac{3\pi}{20}\right);$ $h = \sqrt{2} \cos\left(\frac{7\pi}{20}\right);$ and $i = \sqrt{2} \cos\left(\frac{9\pi}{20}\right).$ Additionally, the transform method and/or device may perform a windowing operation on the input values prior to performing the transformation, wherein the windowing operation implements an asymmetric window function In some implementations, the MDCT may implement at least one of a 640, 320, 160, 80, 40-point transform using a 5-point Discrete Cosine Transform type II.

In other implementations, the MDCT may implement at least one of a 640, 320, 160, 80, 40-point transform using a 5-point Discrete Cosine Transform type IV.

In yet other implementations, the MDCT may implement at least one of a 640, 320, 160, 80, 40-point transform using a 5-point Discrete Cosine Transform type II and a 5-point Discrete Cosine Transform type IV.

In yet other implementations, the MDCT implements at least one of a 640, 320, 160, 80, 40-point transform using a 5-point Discrete Sine Transform type IV.

A decoding method and/or device are provided for computing inverse transform values. Spectral coefficient input values representing an audio signal are received. The spectral coefficient input values are then transformed into time-domain output values using an Inverse Modified Discrete Cosine Transform (IMDCT) that is recursively decimated into a plurality of 5-point inverse transforms.

In one example (FIG. 32), at least one of the plurality of 5-point inverse transforms may include at least one Inverse Discrete Cosine Transform type II (DCT-II) (3202) factorized by twelve (12) addition operations, four (4) multiplication operations, two (2) shift operations, and a longest path length of four (4) operations. For instance, at least one of the plurality of 5-point inverse transforms may include at least one Inverse Discrete Cosine Transform type II (IDCT-II) (3202) that takes an input vector [X0, X1, X2, X3, X4] to produce an output vector [x0, x1, x2, x3, x4] and is characterized by at least a plurality of the intermediate results:

$u1 = X4 - X2;$ $u5 = X4 + X2;$ $w0 = X0 + u1;$ $w5 = X0 - \alpha u1;$ $w2 = 1 X3 - \gamma X1;$ $w3 = \gamma X3 - \beta X1;$ $w6 = 5 u5;$ $w1 = w5 - w6;$ $w4 = w5 + w6;$ such that $x0 = w1 - w2;$ $x1 = w4 + w3;$ $x2 = w0.$ $x3 = w4 - w3;$ $x4 = w1 + w2;$ where $\alpha = \dfrac{1}{4};$ $\beta = \cos\left(\dfrac{3\pi}{10}\right);$ $\gamma = -\cos\left(\dfrac{\pi}{10}\right);$ $\delta = -\dfrac{\sqrt{5}}{4}.$ Additionally, the decoding method and/or device may perform a windowing operation on the input values after performing the inverse transformation, wherein the windowing operation implements an asymmetric window function In one implementation, the IMDCT may implement at least one of a 640, 320, 160, 80, 40-point transform using a 5-point Inverse Discrete Cosine Transform type II.

In another implementation, the IMDCT may implement at least one of a 640, 320, 160, 80, 40-point transform using a 5-point Inverse Discrete Cosine Transform type IV.

In yet another implementation, the IMDCT may implement at least one of a 640, 320, 160, 80, 40-point transform using a 5-point Inverse Discrete Cosine Transform type II and a 5-point Inverse Discrete Cosine Transform type IV.

In one implementation, the IMDCT may implement at least one of a 640, 320, 160, 80, 40-point transform using a 5-point Inverse Discrete Sine Transform type IV.

BRIEF DESCRIPTION OF THE DRAWINGS

Various features, nature, and advantages may become apparent from the detailed description set forth below when taken in conjunction with the drawings in which like reference characters identify correspondingly throughout.

DETAILED DESCRIPTION

Figure 1:
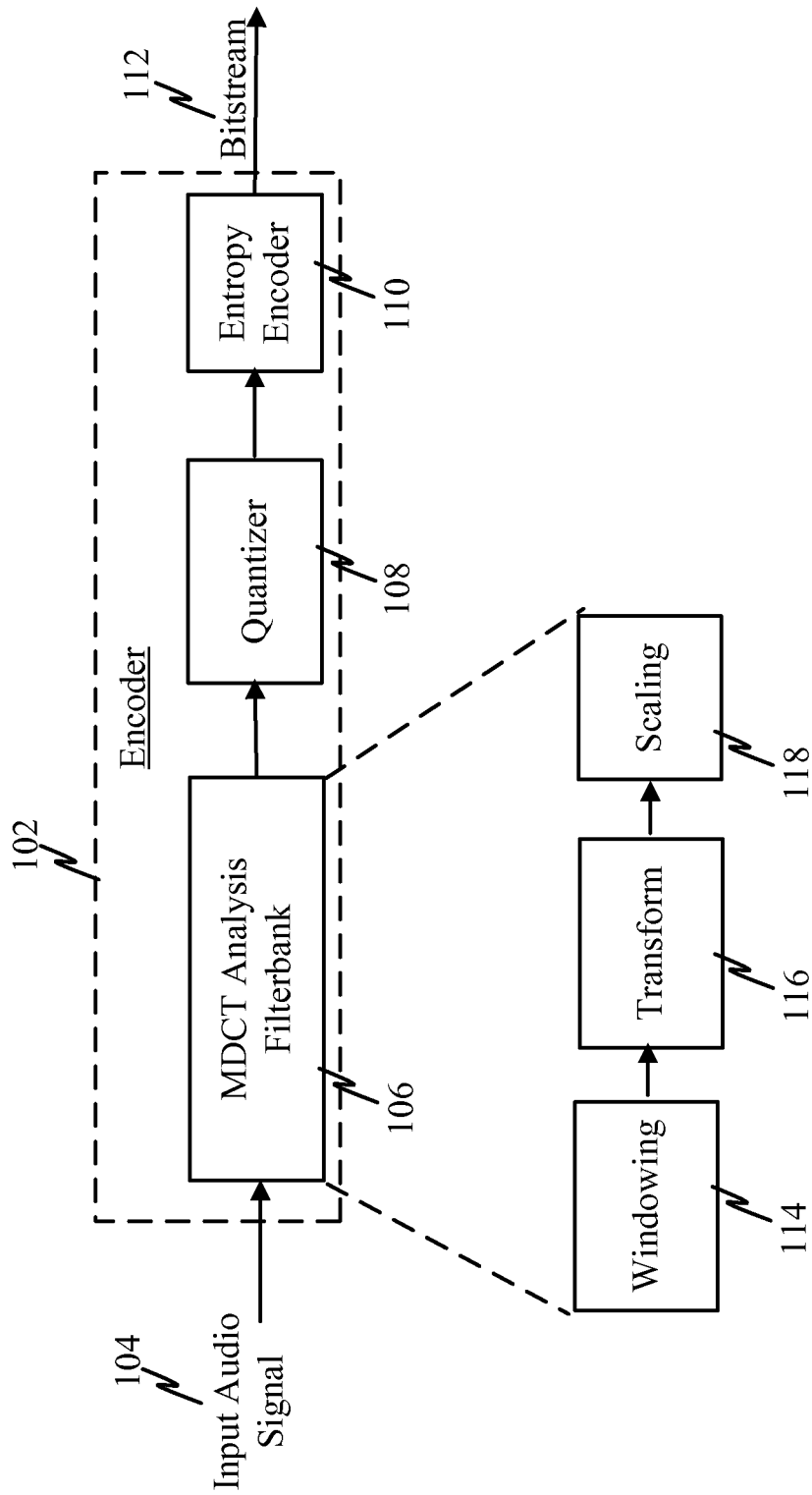
FIG. 1 is a block diagram illustrating an example of an encoder that may include an MDCT analysis filterbank.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

Overview

One feature provides for implementing an N-point MDCT transform (where $N=5*2^K$, for some integer $K>=1$) by mapping it into smaller sized N/2-point DCT-IV, DST-IV, and/or DCT-II transforms. In one example, the MDCT may be systematically decimated by factor of 2 and utilizing a scaled 5-point core function at the last stage. One feature provides several fast algorithms for computing DCT-II, DCT-IV, and DST-IV core transforms of size five (5). The overall transform architecture that is claimed here is a generic decimation process, recursively splitting transforms of size N to two transforms of sizes N/2, where $N=5*2^K$, and where the final (smallest) 5-point transforms are implemented by using fast techniques described herein. Transforms of such size arise in the design of MDCT filterbanks for speech and audio coding applications, such as recent and emerging standards G.729.1, G.718, and EVRC-WB.

Another feature provides for using a modified windowing stage of an MDCT that combines the above architecture for computing MDCT with an asymmetric window to reduce the delay associated to the transform stage to while keeping the same number of frequency coefficients.

Codec Structure

FIG. 1 is a block diagram illustrating an example of an encoder that may include an MDCT analysis filterbank. The encoder 102 may receive an input audio signal 104. An MDCT Analysis Filterbank 106 (i.e., modified discrete cosine transform based on the type-IV discrete cosine transform) operates to decompose the time-domain input audio signal 104 into a plurality of sub-band signals and convert the signals to the frequency-domain, where each sub-band signal is converted into a transform coefficient per sub-band per block. The resulting signal is then quantized by a Quantizer 108 and encoded by an Entropy Encoder 110 to produce a bitstream 112 of the digitized audio signal. According to one example, the MDCT Analysis Filterbank 106 may be implemented by a windowing function 114, a transform 116 (e.g., time-domain to frequency domain), and/or a scaling function 118. The MDCT Analysis Filterbank 106, including the windowing function 114, transform 116, and/or scaling function 116, may be implemented in hardware (e.g., as a processor, circuit, programmable logic device, etc.), software (e.g., instructions executable by a processor), and/or a combination thereof.

Figure 2:
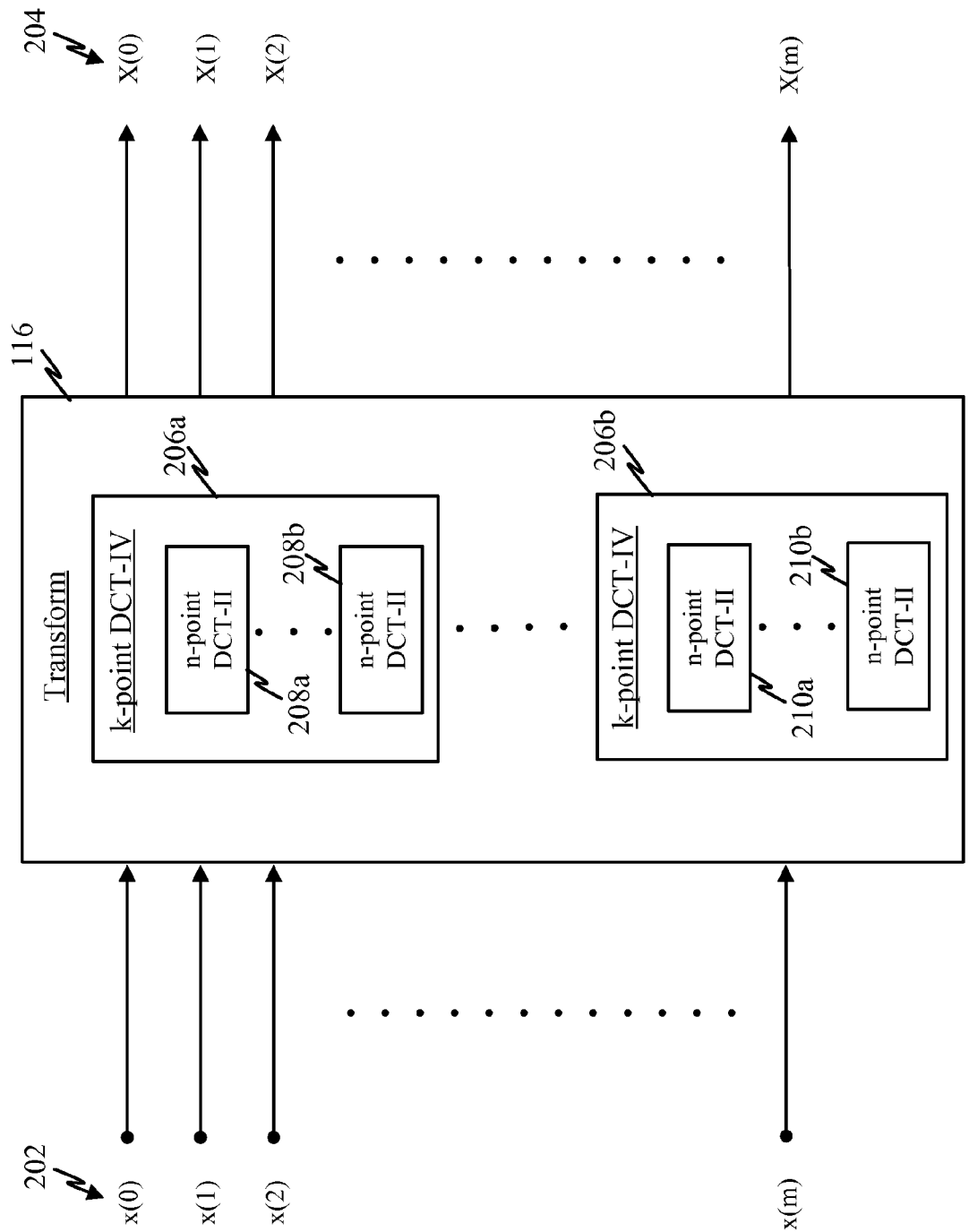
FIG. 2 is a block diagram illustrating an example of how a transform may be implemented by smaller transforms.

FIG. 2 is a block diagram illustrating an example of how a transform may be implemented by smaller transforms. In this example, the transform 116 of FIG. 1 may receive a plurality of inputs 202 and produces a plurality of outputs 204. To accomplish this, the transform 116 may be represented by one or more transforms of the same or smaller size. For example, the transform 116 may be implemented by a plurality of k-point DCT-IV transforms 206a and 206b. In turn, each k-point DCT-IV transform 206a and 206b may be implemented by one or more n-point DCT-II transforms 208a, 208b, or 210a, 210b. Note that in some implementations, Discrete Sine Transforms (DST)-IV may be used instead of DCT-IV transforms. By recursively splitting a larger transform 116 into a plurality of smaller transforms 208, this simplifies the implementation of the larger transform 116. However, an efficient algorithm implementation of the smaller transforms is desirable to achieve fast transform performance that minimizes operations. In one example, the transform 116 may receive time-domain input values $x(0) \ldots x(m)$ 202 representing an audio signal and transform them into frequency-domain spectral coefficients $X(0) \ldots X(m)$ 204. Various implementations for these smaller transforms are described below.

Figure 3:
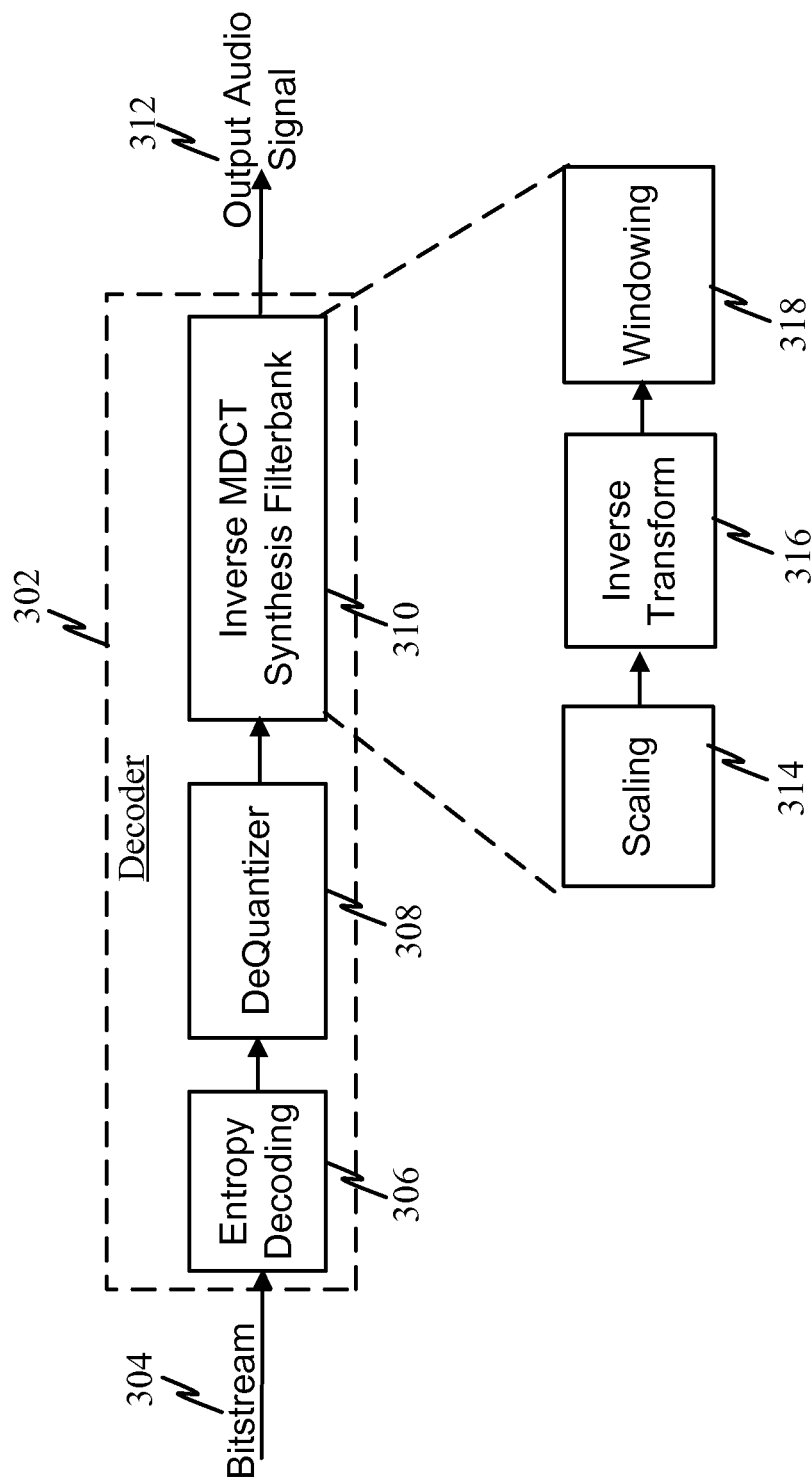
FIG. 3 is a block diagram illustrating an example of a decoder that may implement include an IMDCT synthesis filterbank.

FIG. 3 is a block diagram illustrating an example of a decoder that may implement include an IMDCT synthesis filterbank. The decoder 302 may receive a bitstream 304. An Entropy Decoder 306 decodes the bitstream 304 which is then dequantized by a Dequantizer 308 to produce a frequency-domain signal. An IMDCT Synthesis Filterbank 310 (i.e., inverse modified discrete cosine transform based on the type-IV discrete cosine transform) operates to convert the frequency-domain signal 304 back to a time-domain audio signal 312. The IMDCT Synthesis Filterbank 310 may reverse the operations of the MDCT Analysis Filterbank 106. According to one example, the IMDCT Synthesis Filterbank 310 may be implemented by a scaling function 314, an inverse transform 316 (e.g., frequency domain to time-domain), and a windowing plus overlap and add function 318. The IMDCT Synthesis Filterbank 310, including the scaling function 314, inverse transform 316, and/or windowing function 318, may be implemented in hardware (e.g., as a processor, circuit, programmable logic device, etc.), software (e.g., instructions executable by a processor), and/or a combination thereof.

Figure 4:
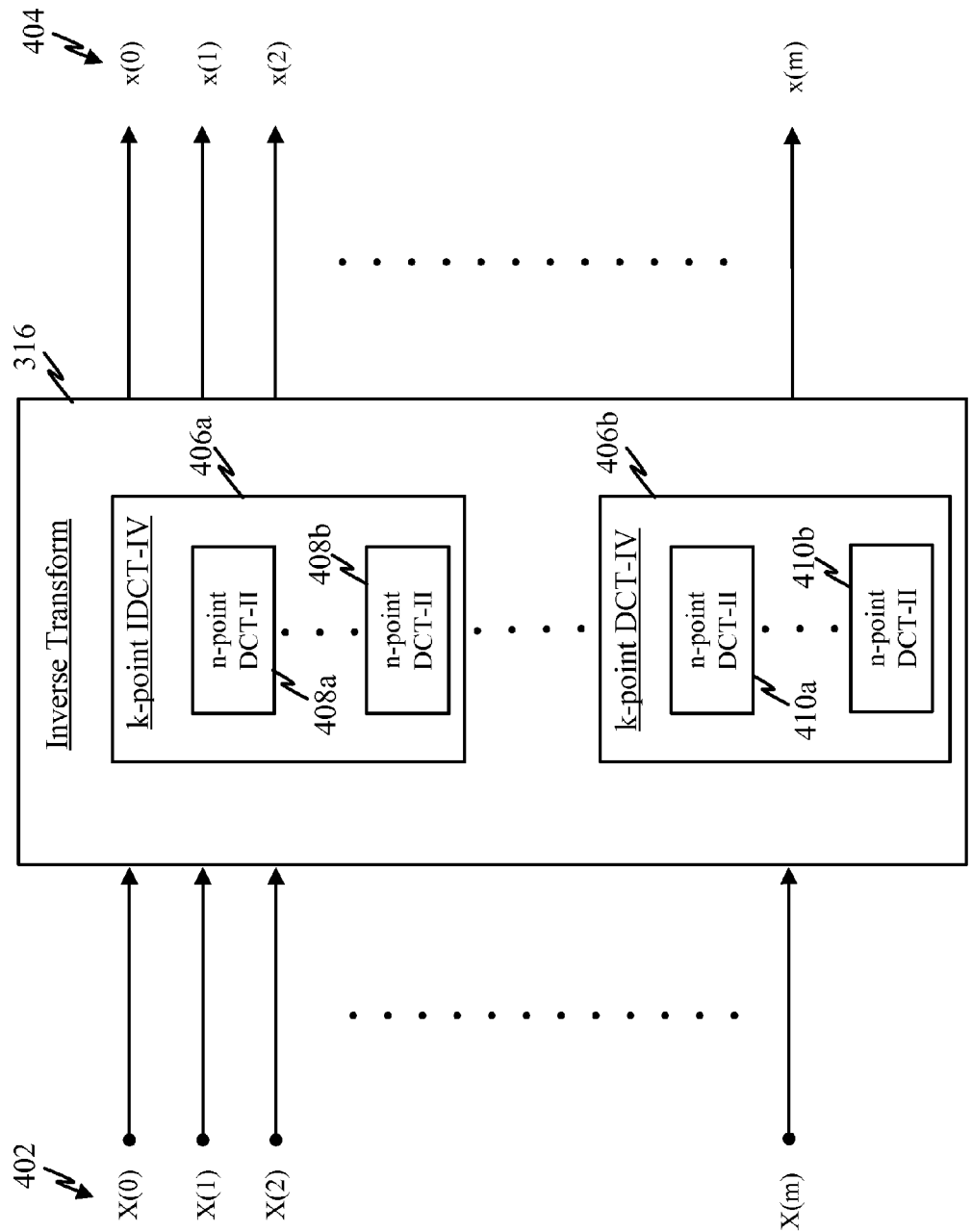
FIG. 4 is a block diagram illustrating an example of how an inverse transform may be implemented by smaller inverse transforms.

FIG. 4 is a block diagram illustrating an example of how an inverse transform may be implemented by smaller inverse transforms. In this example, the inverse transform 316 of FIG. 3 may receive a plurality of inputs 402 and produces a plurality of outputs 404. To accomplish this, the inverse transform 316 may be represented by one or more transforms of the same or smaller size. For example, the inverse transform 316 may be implemented by a plurality of k-point IDCT-IV inverse transforms 406a and 406b. In turn, each k-point IDCT-IV inverse transform 406a and 406b may be implemented by one or more n-point IDCT-II transforms 408a, 408b, or 410a, 410b. Note that in some implementations, Inverse Discrete Sine Transforms (IDST)-IV may be used instead of IDCT-IV transforms. In one example, the transform 316 may receive frequency-domain spectral coefficients X(0) ... X(m) 402 representing an audio signal and transform them into time-domain reconstructed output values x(0) ... x(m) 404. However, an efficient algorithm implementation of the smaller inverse transforms is desirable to achieve fast transform performance that minimizes operations.

Note that the inputs to the MDCT 102 and IMDCT 302 transforms may be processed as frames or blocks having a plurality of data points. Consequently, in order for an MDCT-based vocoder (such as, e.g. G.722.1 or G.722.1C) to support data blocks having frame lengths smaller than 320, transforms of decimated sizes are needed. For blocks having a frame length of 160, 80, 40, etc., it is observed that these sizes are all multiples of 5. Therefore, the last non-reducible (by decimation techniques) block size could use a transform of size 5. It is observed that, in terms of computational complexity, it is much more efficient to design a 5-point DCT-II transform than either DCT-IV or FFF transforms.

Defining MDCT Transforms

Using matrix notation, an MDCT transform can be represented by a matrix M:

$$M(i, j) = \cos\left(\frac{\pi}{2N}\left(2j + 1 + \frac{N}{2}\right)(2i + 1)\right),$$

where $i = 0, 1, \ldots, N/2 - 1; j = 0, 1, \ldots, N - 1$.

Consequently, $X = Mx$ and $\hat{x} = M^T X$, where x represents a matrix of input samples $[x(0), \ldots, x(N-1)]^T$, X represents a matrix of resulting MDCT coefficients $$\left[X(0), \ldots, X\left(\frac{N}{2} - 1\right)\right]^T,$$

and $\hat{x}$ represents a matrix of reconstructed outputs $[\hat{x}(0), \ldots \hat{x}(N-1)]^T$.

In order to implement the MDCT transform, it may be mapped into an N/2-point core transform function. For example, the transform 116 of FIG. 1 may be implemented as one or more N/2-point DCT-IV transforms.

A DCT-IV transform can be defined as:

$$C_k^{IV} = X(k) = \frac{2}{N}\sum_{n=0}^{N-1} x(n)\cos\left(\frac{\pi}{4N}(2n+1)(2k+1)\right),$$

$k = 0, 1, \ldots, N - 1.$

Meanwhile, an IDCT-IV transform can be defined as:

$$x(n) = \sum_{k=0}^{N-1} C_k^{IV} \cos\left(\frac{\pi}{4N}(2n+1)(2k+1)\right),$$

$n = 0, 1, \ldots, N - 1.$

The MDCT transform can be mapped to an N/2-point DCT-IV transform as $M^T = PSC_{N/2}^{IV}$ and the IMDCT transform can be mapped to an N/2-point IDCT-IV transform as $M = C_{N/2}^{IV} SP^T$ where $$P = \begin{bmatrix} 0 & I_{N/4} \\ 0 & -J_{N/4} \\ J_{N/4} & 0 \\ I_{N/4} & 0 \end{bmatrix}$$

where $I_{N/4}$ is an N/4×N/4 identity matrix and $J_{N/4}$ is an N/4× N/4 order reversal matrix, and matrix S is defined as $$S = \begin{bmatrix} -I_{N/4} & 0 \\ 0 & I_{N/4} \end{bmatrix},$$

and $C_{N/2}^{IV}$ is an N/2×N/2 DCT-IV matrix that can be defined as $$C_{N/2}^{IV}(i, j) = \cos\left(\frac{\pi}{2N}(2j+1)(2i+1)\right),$$

$i, j = 0, 1, \ldots, N/2 - 1$

By using the symmetry and involutory properties of the DCT-IV matrix, it can be mapped into a DCT-II transform. The DCT-II transform may be defined as:

$$C_k^{II} = X(k) = \frac{\lambda(k)}{2} \sum_{n=0}^{N-1} x(n)\cos\left(\frac{(2n+1)k\pi}{2N}\right),$$

$k = 0, 1, \ldots, N - 1.$

Likewise, an IDCT-II transform may be defined as:

$$x(n) = \sum_{k=0}^{N-1} \frac{\lambda(k)}{2} C_k^{II} \cos\left(\frac{(2n+1)k\pi}{2N}\right), \quad \text{(Equation 12)}$$

$n = 0, 1, \ldots, N - 1.$ where $\lambda(k) = 1/\sqrt{2}$, if k=0, otherwise 1.

Defining DCT-IV, DST-IV, and DCT-II Transforms

According to a feature, the transform 116 (FIG. 1) and inverse transform 316 (FIG. 3) may be decimated and implemented by one or more DCT-IV or DST-IV (and IDCT-IV or DST-IV) transforms which can be implemented as one or more DCT-II (and IDCT-II) transforms, respectively.

A DCT-IV and IDCT-IV may be defined, correspondingly, as:

$$X^{IV}(k) = \sqrt{\frac{2}{N}} \sum_{n=0}^{N-1} x(n)\cos\left(\frac{\pi}{4N}(2n+1)(2k+1)\right), \quad \text{(Equation 1)}$$
$$k = 0, 1, \ldots, N-1.$$

$$x(n) = \sqrt{\frac{2}{N}} \sum_{n=0}^{N-1} X^{IV}(k)\cos\left(\frac{\pi}{4N}(2n+1)(2k+1)\right), \quad \text{(Equation 2)}$$
$$n = 0, 1, \ldots, N-1.$$

A DST-IV and IDST-IV may be defined, correspondingly, as:

$$Y^{IV}(k) = \sqrt{\frac{2}{N}} \sum_{n=0}^{N-1} x(n)\sin\left(\frac{\pi}{4N}(2n+1)(2k+1)\right), \quad \text{(Equation 3)}$$
$$k = 0, 1, \ldots, N-1.$$

$$x(n) = \sqrt{\frac{2}{N}} \sum_{n=0}^{N-1} Y^{IV}(k)\sin\left(\frac{\pi}{4N}(2n+1)(2k+1)\right), \quad \text{(Equation 4)}$$
$$n = 0, 1, \ldots, N-1.$$

Similarly, the DCT-II and its inverse transforms may be defined, correspondingly, as:

$$X^{II}(k) = \sqrt{\frac{2}{N}} \lambda(k) \sum_{n=0}^{N-1} x(n)\cos\left(\frac{(2n+1)k\pi}{2N}\right), \quad \text{(Equation 5)}$$
$$k = 0, 1, \ldots, N-1.$$

$$x(n) = \sqrt{\frac{2}{N}} \sum_{n=0}^{N-1} X^{II}(k)\lambda(k)\cos\left(\frac{(2n+1)k\pi}{2N}\right), \quad \text{(Equation 6)}$$
$$n = 0, 1, \ldots, N-1.$$

where $\lambda(k)=\frac{1}{2}$, if k=0, otherwise 1.

In Equations 1-6, $\{x(n)\}$, for n=0, 1, ... N−1, represents the input sequence of samples, N denotes the frame length, X(k) is the resulting MDCT coefficients.

In the case where N=5, the matrices C_IV for DCT-IV, S_IV for DST-IV, and C_II for DCT-II transforms can be represented, correspondingly, as:

$$C\_IV := \begin{bmatrix} \frac{1}{5}\cos\left(\frac{\pi}{20}\right)\sqrt{10} & \frac{1}{5}\sqrt{10}\cos\left(\frac{3\pi}{20}\right) & \frac{\sqrt{5}}{5} & \frac{1}{5}\sqrt{10}\cos\left(\frac{7\pi}{20}\right) & \frac{1}{5}\sqrt{10}\cos\left(\frac{9\pi}{20}\right) \\ \frac{1}{5}\sqrt{10}\cos\left(\frac{3\pi}{20}\right) & \frac{1}{5}\sqrt{10}\cos\left(\frac{9\pi}{20}\right) & -\frac{\sqrt{5}}{5} & -\frac{1}{5}\cos\left(\frac{\pi}{20}\right)\sqrt{10} & -\frac{1}{5}\sqrt{10}\cos\left(\frac{7\pi}{20}\right) \\ \frac{\sqrt{5}}{5} & -\frac{\sqrt{5}}{5} & -\frac{\sqrt{5}}{5} & \frac{\sqrt{5}}{5} & \frac{\sqrt{5}}{5} \\ \frac{1}{5}\sqrt{10}\cos\left(\frac{7\pi}{20}\right) & -\frac{1}{5}\cos\left(\frac{\pi}{20}\right)\sqrt{10} & \frac{\sqrt{5}}{5} & \frac{1}{5}\sqrt{10}\cos\left(\frac{9\pi}{20}\right) & -\frac{1}{5}\sqrt{10}\cos\left(\frac{3\pi}{20}\right) \\ \frac{1}{5}\sqrt{10}\cos\left(\frac{9\pi}{20}\right) & -\frac{1}{5}\sqrt{10}\cos\left(\frac{7\pi}{20}\right) & \frac{\sqrt{5}}{5} & -\frac{1}{5}\sqrt{10}\cos\left(\frac{3\pi}{20}\right) & \frac{1}{5}\cos\left(\frac{\pi}{20}\right)\sqrt{10} \end{bmatrix}, \quad \text{(Matrix A)}$$

$$S\_IV = \begin{bmatrix} \frac{1}{5}\sqrt{10}\sin\left(\frac{\pi}{20}\right) & \frac{1}{5}\sqrt{10}\sin\left(\frac{3\pi}{20}\right) & \frac{\sqrt{5}}{5} & \frac{1}{5}\sqrt{10}\sin\left(\frac{7\pi}{20}\right) & \frac{1}{5}\sqrt{10}\sin\left(\frac{9\pi}{20}\right) \\ \frac{1}{5}\sqrt{10}\sin\left(\frac{3\pi}{20}\right) & \frac{1}{5}\sqrt{10}\sin\left(\frac{9\pi}{20}\right) & \frac{\sqrt{5}}{5} & -\frac{1}{5}\sqrt{10}\sin\left(\frac{\pi}{20}\right) & -\frac{1}{5}\sqrt{10}\sin\left(\frac{7\pi}{20}\right) \\ \frac{\sqrt{5}}{5} & \frac{\sqrt{5}}{5} & -\frac{\sqrt{5}}{5} & -\frac{\sqrt{5}}{5} & \frac{\sqrt{5}}{5} \\ \frac{1}{5}\sqrt{10}\sin\left(\frac{7\pi}{20}\right) & -\frac{1}{5}\sqrt{10}\sin\left(\frac{\pi}{20}\right) & -\frac{\sqrt{5}}{5} & \frac{1}{5}\sqrt{10}\sin\left(\frac{9\pi}{20}\right) & -\frac{1}{5}\sqrt{10}\sin\left(\frac{3\pi}{20}\right) \\ \frac{1}{5}\sqrt{10}\sin\left(\frac{9\pi}{20}\right) & -\frac{1}{5}\sqrt{10}\sin\left(\frac{7\pi}{20}\right) & \frac{\sqrt{5}}{5} & -\frac{1}{5}\sqrt{10}\sin\left(\frac{3\pi}{20}\right) & \frac{1}{5}\sqrt{10}\sin\left(\frac{\pi}{20}\right) \end{bmatrix}, \quad \text{(Matrix B)}$$

$$C\_II := \begin{bmatrix} \frac{\sqrt{5}}{5} & \frac{\sqrt{5}}{5} & \frac{\sqrt{5}}{5} & \frac{\sqrt{5}}{5} & \frac{\sqrt{5}}{5} \\ \frac{1}{5}\sqrt{10}\cos\left(\frac{\pi}{10}\right) & \frac{1}{5}\sqrt{10}\cos\left(\frac{3\pi}{10}\right) & 0 & -\frac{1}{5}\sqrt{10}\cos\left(\frac{3\pi}{10}\right) & -\frac{1}{5}\sqrt{10}\cos\left(\frac{\pi}{10}\right) \\ \frac{1}{5}\sqrt{10}\cos\left(\frac{\pi}{5}\right) & -\frac{1}{5}\sqrt{10}\cos\left(\frac{2\pi}{5}\right) & -\frac{\sqrt{10}}{5} & -\frac{1}{5}\sqrt{10}\cos\left(\frac{2\pi}{5}\right) & \frac{1}{5}\sqrt{10}\cos\left(\frac{\pi}{5}\right) \\ \frac{1}{5}\sqrt{10}\cos\left(\frac{3\pi}{10}\right) & -\frac{1}{5}\sqrt{10}\cos\left(\frac{\pi}{10}\right) & 0 & \frac{1}{5}\sqrt{10}\cos\left(\frac{\pi}{10}\right) & -\frac{1}{5}\sqrt{10}\cos\left(\frac{3\pi}{10}\right) \\ \frac{1}{5}\sqrt{10}\cos\left(\frac{2\pi}{5}\right) & -\frac{1}{5}\sqrt{10}\cos\left(\frac{\pi}{5}\right) & \frac{\sqrt{10}}{5} & -\frac{1}{5}\sqrt{10}\cos\left(\frac{\pi}{5}\right) & \frac{1}{5}\sqrt{10}\cos\left(\frac{2\pi}{5}\right) \end{bmatrix}. \quad \text{(Matrix C)}$$

To simplify the representation of a DCT-II, factors $\lambda(k)=1/\sqrt{2}$ can be ignored and all coefficients can be multiplied by $\sqrt{5/2}$, while using the following notation:

$$a = \sqrt{2}\cos\left(\frac{\pi}{10}\right);$$
$$b = \cos\left(\frac{3\pi}{10}\right);$$
$$c = -\cos\left(\frac{\pi}{5}\right);$$
$$d = \cos\left(\frac{2\pi}{5}\right)$$

thereby producing:

$$\frac{\sqrt{10}\, C\_II}{2} = \begin{bmatrix} 1 & 1 & 1 & 1 & 1 \\ a & b & 0 & -b & -a \\ c & -d & -1 & -d & c \\ b & -a & 0 & a & -b \\ d & -c & 1 & -c & d \end{bmatrix} \quad \text{(Matrix D)}$$

Here, note that $a^2+b^2=1.25$, and that $c^2+d^2=0.75$. Moreover, also note that $c-d=0.5$. This follows from algebraic expressions for the involved cosine values:

$$a = \cos\left(\frac{\pi}{10}\right) = \frac{\sqrt{10+2\sqrt{5}}}{4};$$
$$b = \cos\left(\frac{3\pi}{10}\right) = \frac{\sqrt{10-2\sqrt{5}}}{4};$$
$$c = \cos\left(\frac{\pi}{5}\right) = \frac{1+\sqrt{5}}{4};$$
$$d = \cos\left(\frac{2\pi}{5}\right) = \frac{\sqrt{5}-1}{4};$$

Similarly, in the case of DCT-IV, all coefficients are multiplied by $\sqrt{5}$, and use notation:

$$f = \sqrt{2}\cos\left(\frac{\pi}{20}\right);$$
$$g = \sqrt{2}\cos\left(\frac{3\pi}{20}\right);$$
$$h = \sqrt{2}\cos\left(\frac{7\pi}{20}\right);$$
$$i = \sqrt{2}\cos\left(\frac{9\pi}{20}\right)$$

producing:

$$\sqrt{5}\, C\_IV = \begin{bmatrix} f & g & 1 & h & i \\ g & i & -1 & -f & -h \\ 1 & -1 & -1 & 1 & 1 \\ h & -f & 1 & i & -g \\ i & -h & 1 & -g & f \end{bmatrix} \quad \text{(Matrix E)}$$

Note that $f^2+i^2=2$, and similarly $g^2+h^2=2$. Moreover, notice that $f+i=\sqrt{2}\times c$, and that $h+g=\sqrt{2}\times a$. This follows from algebraic expressions for the involved cosine values:

$$\cos\left(\frac{\pi}{20}\right) = \frac{\sqrt{8+2\sqrt{10+2\sqrt{5}}}}{4};$$
$$\cos\left(\frac{9\pi}{20}\right) = \frac{\sqrt{8-2\sqrt{10+2\sqrt{5}}}}{4};$$
$$\cos\left(\frac{3\pi}{20}\right) = \frac{\sqrt{8+2\sqrt{10-2\sqrt{5}}}}{4};$$
$$\cos\left(\frac{7\pi}{20}\right) = \frac{\sqrt{8-2\sqrt{10-2\sqrt{5}}}}{4}.$$

Finally, in the case of DST-IV, all coefficients may be multiplied by $\sqrt{5}$, and use notation:

$$f = \sqrt{2}\sin\left(\frac{\pi}{20}\right);$$
$$g = \sqrt{2}\sin\left(\frac{3\pi}{20}\right);$$
$$h = \sqrt{2}\sin\left(\frac{7\pi}{20}\right);$$
$$i = \sqrt{2}\sin\left(\frac{9\pi}{20}\right)$$

to produce:

$$\sqrt{5}\, S\_IV = \begin{bmatrix} f & g & 1 & h & i \\ g & i & 1 & -f & -h \\ 1 & 1 & -1 & -1 & 1 \\ h & -f & -1 & i & -g \\ i & -h & 1 & -g & f \end{bmatrix} \quad \text{(Matrix F)}$$

Similar to the DCT-IV case, note that here $f^2+i^2=2$, and similarly $g^2+h^2=2$.

Derivation of Fast Algorithms for Computing 5-Point DCT-II

In order to achieve processing efficiency, the smallest size transforms used by a larger transform should be fast and efficient. This is accomplished by minimizing the operations (e.g., multiplications, additions, and shifts) performed by these small size transforms. Consequently, various factorizations for smallest size transforms may be implemented to achieve this. The choice of which transform factorization is implemented may depend on various factors, including the capabilities of the processor being used.

An efficient DCT-II transform may be implemented in various ways. For instance, assuming that the input to transform is provided by an input vector x, such that the product of vector x with the scaled DCT-II matrix (scaled by $\sqrt{5}$ as in Matrix D) produces a DCT-II matrix X:

$$X := x \times \sqrt{5}\, C\_II := \begin{bmatrix} x0 + x1 + x2 + x3 + x4 \\ ax0 + bx1 - bx3 - ax4 \\ cx0 - dx1 - x2 - dx3 + cx4 \\ bx0 - ax1 + ax3 - bx4 \\ dx0 - cx1 + x2 - cx3 + dx4 \end{bmatrix} = \begin{bmatrix} X0 \\ X1 \\ X2 \\ X3 \\ X4 \end{bmatrix}$$

where $a = \sqrt{2}\cos\left(\frac{\pi}{10}\right); b = \cos\left(\frac{3\pi}{10}\right); c = -\cos\left(\frac{\pi}{5}\right); d = \cos\left(\frac{2\pi}{5}\right)$ Consider the computation of the odd coefficients X1 and X3 in this matrix X:

$X1=a*x0+b*x1-b*x3-a*x4=a*(x0-x4)+b*(x1-x3);$ $X3=b*x0-a*x1+a*x3-b*x4=b*(x0-x4)-a*(x1-x3);$

This suggests that both coefficients X1 and X3 can be computed as a simple butterfly over x0−x4 and x1−x3. Now, consider the computation of the even coefficients X2 and X4 in this matrix X:

$X2=c*x0-d*x1-d*x3+c*x4-x2=c*(x0+x4)-d*(x1+x3)-x2;$ $X4=d*x0-c*x1-c*x3+d*x4+x2=d*(x0+x4)-c*(x1+x3)+x2;$

Here, again, it appears that computations can be organized as a simple butterfly over x0+x4 and x1+x3.

The actual transform operations may be efficiently implemented by rearranging the internal transforms operations to reduce the overall number of additions, multiplications, and/or shifts. Consequently, different intermediate results may be achieved by different factorizations of a transform and such intermediate results characterize each corresponding transform.

Figure 5:
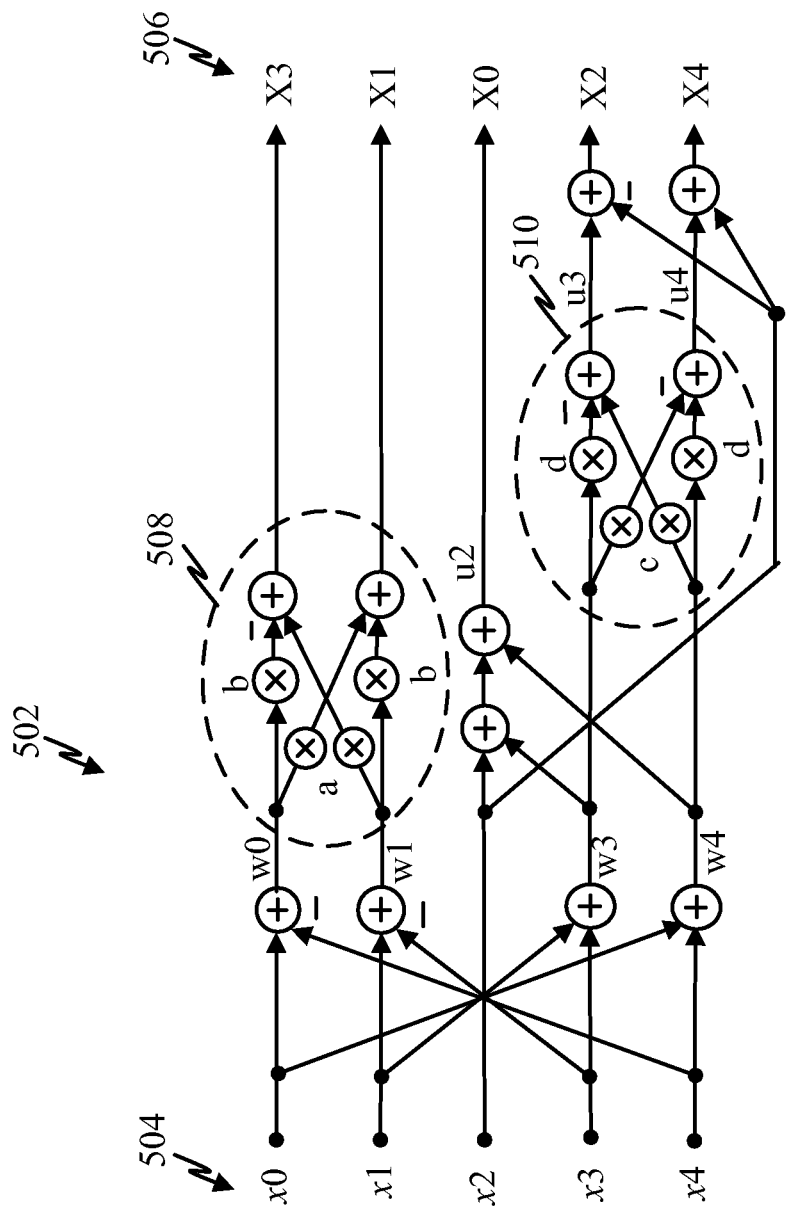
FIG. 5 is a flow diagram illustrating a first example of a factorization of a 5-point DCT-II transform.

FIG. 5 is a flow diagram illustrating a first example of a factorization of a 5-point DCT-II transform 502. In this example, the relationships between the odd coefficients X1 and X3 and even coefficients X2 and X4 of the matrix X noted above is exploited to represent the 5-point DCT II transform 502 such that, the following intermediate results are computed:

$w0=x0-x4;$ $w4=x0+x4;$ $w1=x1-x3;$ $w3=x1+x3;$ and $u2=x2+w3+w4;$ $u3=-d*w3+c*w4;$ $u4=d*w4+c*w3;$ to obtain the outputs:

$X0=u2;$ $X1=b*w1+a*w0;$ $X2=u3-x0;$ $X3=a*w1-b*w0;$ $X4=u4+x0;$ where the input coefficients 504 (x0, x1, x2, x3, x4) are transformed by the into the output coefficients 506 (X0, X1, X2, X3, and X4). The complexity of this scheme of FIG. 5 is twelve (12) additions and eight (8) multiplications. In particular, a first butterfly 508 is implemented to obtain output coefficients X1 and X3, and a second butterfly 510 is implemented to obtain output coefficients X2 and X4. The longest path in this transform 502 is only three (3) operations (additions and/or multiplications assuming that the butterfly needs just 1 MAC for each path). The operations performed by a "butterfly" are often referred to as a planar rotation or Givens rotation.

Figure 6:
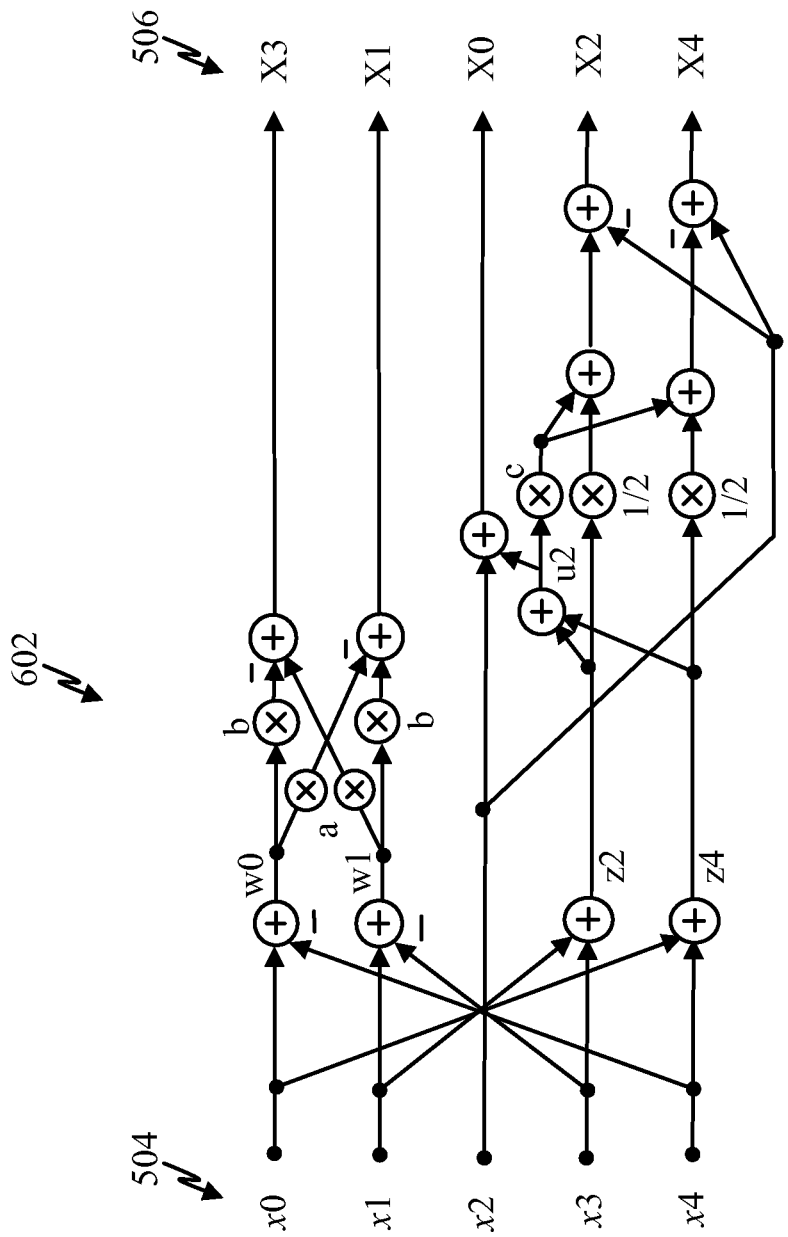
FIG. 6 is a flow diagram illustrating a second example of a factorization of a 5-point DCT-II transform.

FIG. 6 is a flow diagram illustrating a second example of a factorization of a 5-point DCT-II transform 602. This transform 602 may be a derived from the transform 502 of FIG. 5 to transform the input coefficients 504 into the output coefficients 506. In this implementation, the inputs to the second butterfly 510 (FIG. 5) are represented as values z4=x0+x4 and z2=x1+x3 and may be added along the forward path towards X0. Consequently, intermediate results are computed as:

$w0=x0-x4;$ $w1=x1-x3;$ $z2=x1+x3;$ $z4=x0+x4;$ $u2=z2+z4.$

Additionally, the fact that c−d=0.5 is used to represent outputs X0, X2, and X4 as:

$X0=z4+z2+x2;$ $X2=c*z4-d*z2-x2=c*(z4+z2)+(c-d)*z2-x2=c*(z4+z2)+0.5*z2-x2;$ $X4=d*z4-c*z2+x2=-c*(z4+z2)-(c-d)*z4+x2=-c*(z4+z2)-0.5*z4+x2.$

Consequently, the 5-point DCT II transform 602 is characterized by:

$X0=u2+x2;$ $X1=b*w1+a*w0;$ $X2=c*u2+0.5*z2-x2;$ $X3=a*w1-b*w0;$ $X4==c*u2-0.5*z4+x2.$

The complexity of this transform 602 is twelve (12) additions, five (5) multiplications, and two (2) shifts. Note that the ½ factors in this transform are a dyadic rational, and so such "multiplication" by ½ is just a binary shift operation (i.e., a shift). The longest path length here is four (4) operations.

Figure 7:
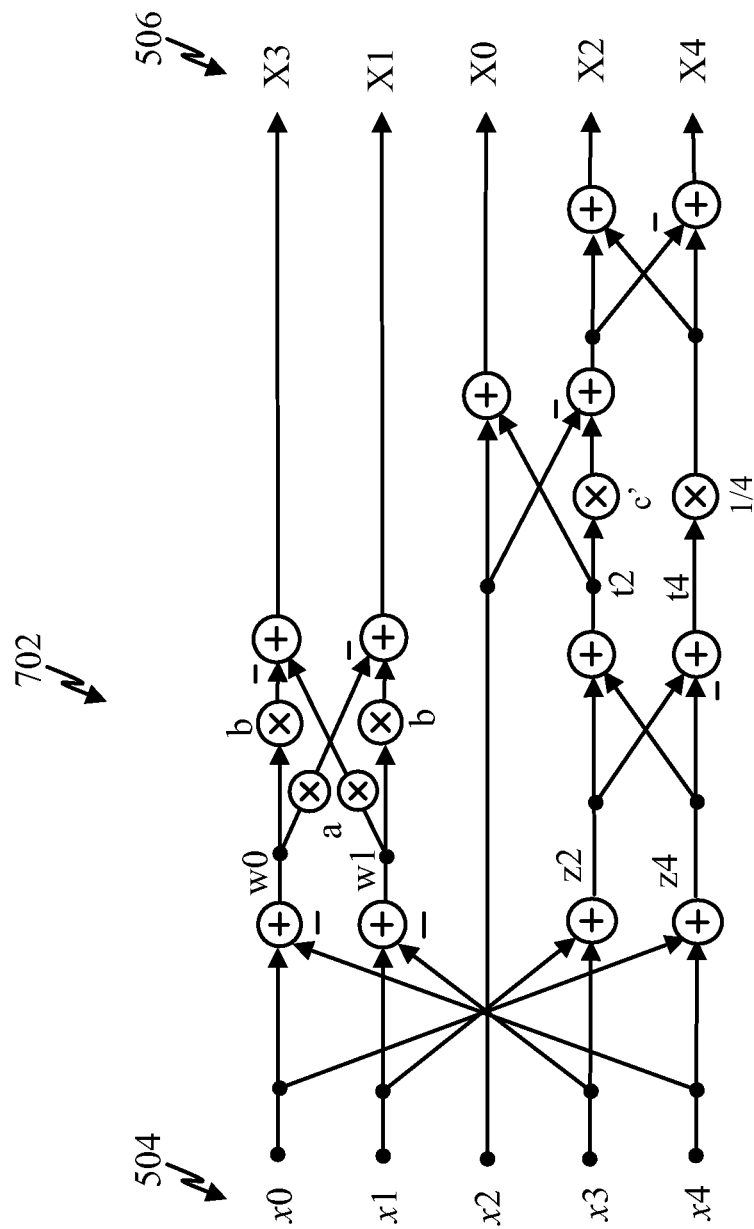
FIG. 7 is a flow diagram illustrating a third example of a factorization of a 5-point DCT-II transform.

FIG. 7 is a flow diagram illustrating a third example of a factorization of a 5-point DCT-II transform 702. This transform 702 may be derived from the transform 602 of FIG. 6 to transform the input coefficients 504 into the output coefficients 506. The equations for coefficients X2 and X4 may represented as:

$$X2 = c*(z4+z2) + 0.5*z2 - x2 = c'*(z4+z2) + d'*(z4-z2) - x2;$$

$$X4 = -c*(z4+z2) - 0.5*z4 + x2 = -c'*(z4+z2) + d'*(z4-z2) + x2;$$

where values c' and d' are selected such that:

$$c*(z4+z2) + 0.5*z2 = c'*(z4+z2) + d'(z4-z2)$$

$$-c*(z4+z2) - 0.5*z4 = -c'*(z4+z2) + d'(z4-z2). \quad \text{(Equation 7)}$$

Equation 7 can be rearranged such that:

$$z4*c + z2*(c+0.5) = z4*(c'+d') + z2*(c'-d').$$

Consequently, it can be shown that:

$$c = c' + d'; \text{ and}$$

$$c + 0.5 = c' - d'.$$

By subtracting both of these equations, it can be shown that:

$$0.5 = -2d'; \text{ or}$$

$$d' = -0.25, \text{ and}$$

$$c' = c - d' = c + 0.25.$$

Consequently, output coefficients X2 and X4 can be represented as:

$$X2 = c'*(z4+z2) - 0.25*(z4-z2) - x2 = 0.25*(z2-z4) + (c'*(z4+z2) - x2);$$

$$X4 = -c'*(z4+z2) - 0.25*(z4-z2) + x2 = 0.25*(z2-z4) - (c'*(z4+z2) - x2);$$

which leads to the transform 702 of FIG. 7.

Consequently, intermediate results are computed as:

$$w0 = x0 - x4;$$

$$w1 = x1 - x3;$$

$$z2 = x1 + x3;$$

$$z4 = x0 + x4;$$

$$t2 = z2 + z4;$$

$$t4 = z2 - z4;$$

$$c' = c + 0.25.$$

Consequently, the 5-point DCT II transform 702 is characterized by:

$$X0 = t2 + x2;$$

$$X1 = b*w1 + a*w0;$$

$$X2 = c'*t2 - 0.25*t4 - x2 = 0.25*t4 + c'*t2 - x2);$$

$$X3 = a*w1 - b*w0;$$

$$X4 = -c'*t2 - 0.25*t4 + x2 = 0.25*t4 - (c'*t2 - x2).$$

This transform 702 can be implemented in twelve (12) additions, five (5) multiplications, and one (1) shift. Note that the ¼ factor in this transform 702 is a dyadic rational, and so such "multiplication" by ¼ is just a binary shift operation (i.e., a shift). The longest path length here is also four (4) operations.

Figure 8:
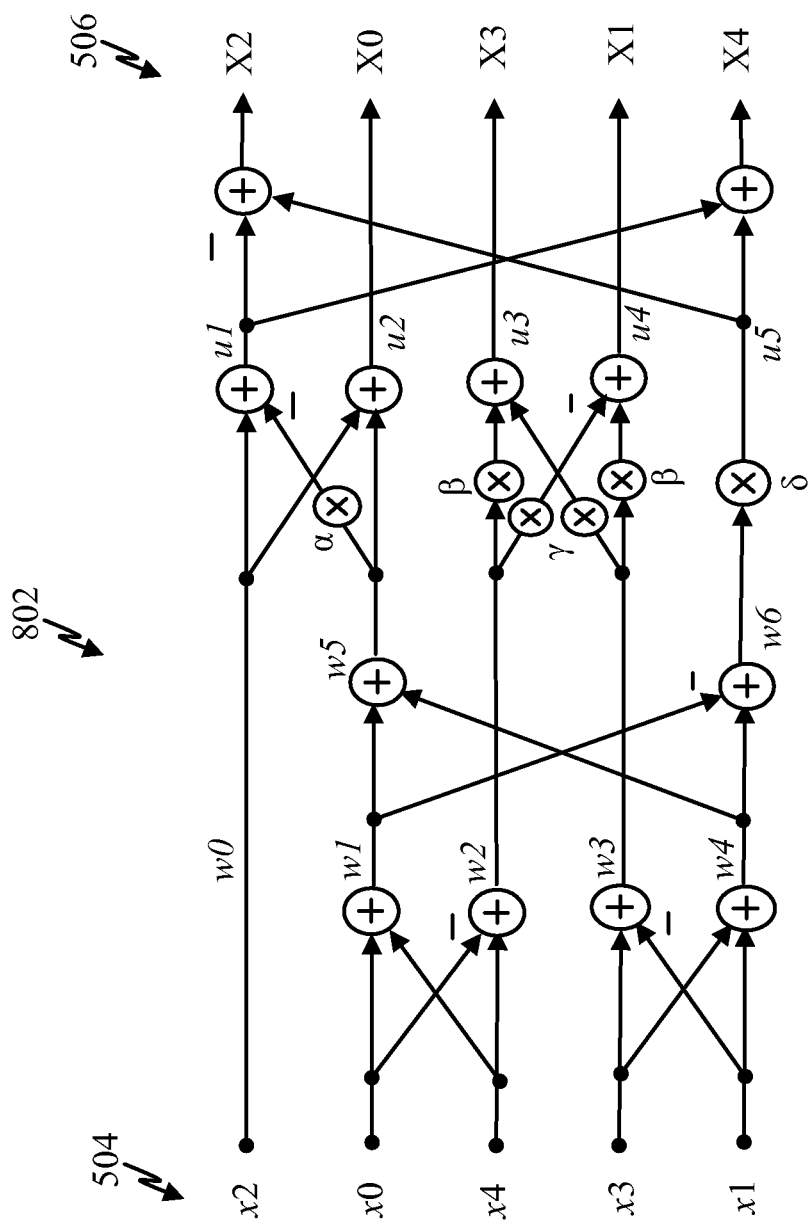
FIG. 8 is a flow diagram illustrating an alternative example of a factorization of a 5-point DCT-II transform.

FIG. 8 is a flow diagram illustrating an alternative example of a factorization of a 5-point DCT-II transform 802. Note that factor α in this transform is a dyadic rational, and so multiplication by it is just a binary shift operation. This 5-point transform can be implemented either using planar rotation and 5 multiplications or by using 4 multiplications by factorizing planar rotation or using lifting steps. For a 5-point sequence of inputs x 504, the outputs X 506 for the 5-point DCT-II transform 802 can be generated using 4 non-trivial multiplications, twelve (12) additions, and two (2) shift or five (5) multiplications, twelve (12) additions, and one (1) shift.

In this example, the multipliers are:

$$\alpha = \frac{1}{4}; \beta = \cos\left(\frac{3\pi}{10}\right); \gamma = -\cos\left(\frac{\pi}{10}\right); \delta = -\frac{\sqrt{5}}{4}.$$

The DCT-II transform 802 may include intermediate results such that:

$$w1 = x0 + x4;$$

$$w2 = x4 - x0;$$

$$w3 = x3 - x1;$$

$$w4 = x3 + x1;$$

$$w5 = w1 + w4;$$

$$w6 = w4 - w1;$$

$$u1 = x2 - \alpha w5;$$

$$u2 = x2 + w5;$$

$$u3 = \beta w2 + \gamma w3;$$

$$u4 = \beta w3 - \gamma w2;$$

$$u5 = \delta w6.$$

Consequently, the outputs X0, X1, X2, X3, and X4 for the DCT-II transform 802 may be represented as:

$$X0 = u2;$$

$$X1 = u4;$$

$$X2 = u4 - u1;$$

$$X3 = u3;$$

$$X4 = u1 + u5.$$

Note that the intermediate results for the transforms illustrated in FIGS. 5-9 (and other transforms herein) may change if a different point in the flow diagram of the transform is selected. Consequently, greater or fewer intermediate results and/or different intermediate results (e.g., at different points in the flow diagram) are contemplated and understood from these transform flow diagrams.

Derivation of Inverse Transform

Figure 32:
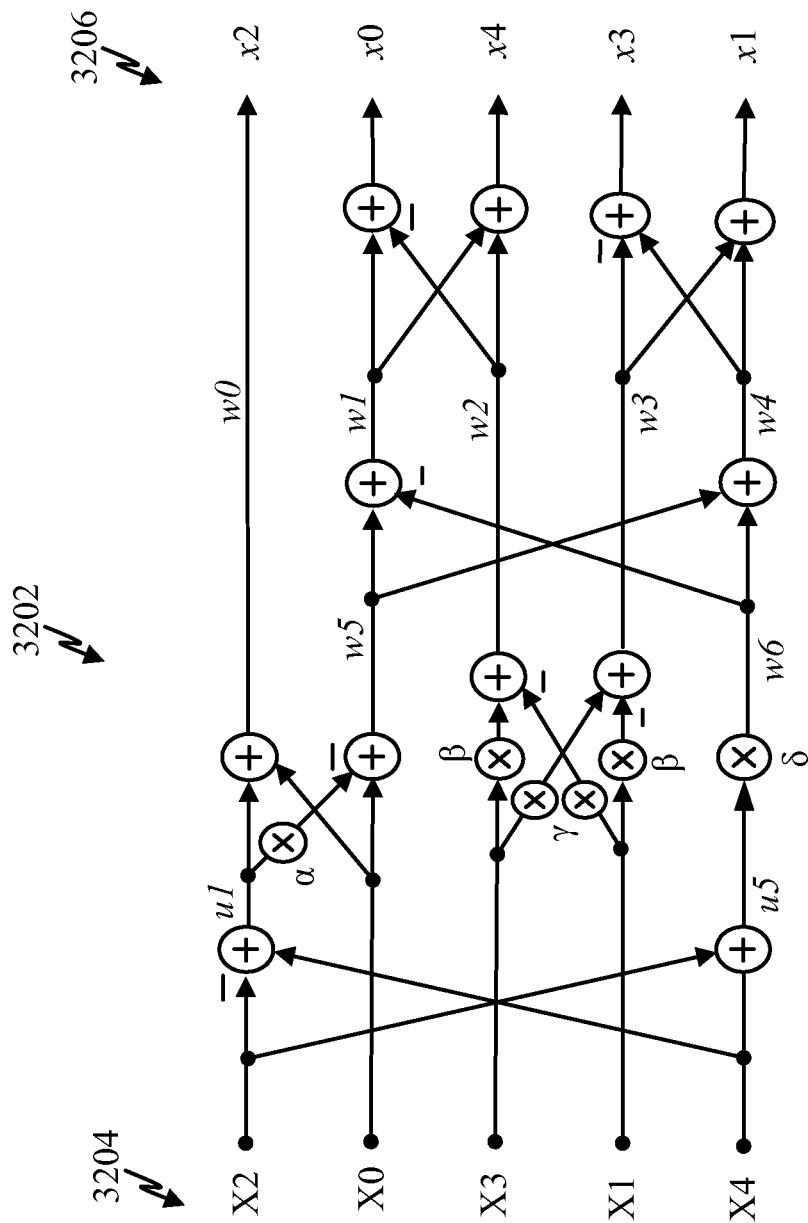
FIG. 32 illustrates an inverse transform corresponding to the forward transform of FIG. 8.

The transforms illustrated in FIGS. 4-20 may be inverted to reverse the forward transforms illustrated therein. FIG. 32 illustrates an inverse transform (5-point IDCT-II inverse transform) corresponding to the forward transform of FIG. 8. The inverse transform 3202 transforms inputs 3204 (spectral coefficients) to outputs (time-domain values) 3206 and may be characterized by the intermediate results:

$$u1 = X4 - X2;$$
$$u5 = X4 + X2;$$
$$w0 = X0 + u1;$$
$$w5 = X0 - \alpha u1;$$
$$w2 = \beta X3 - \gamma X1$$
$$w3 = \gamma X3 - \beta X1; \text{ //using negated factors in software compared to flow-graph//}$$
$$w6 = \delta u5;$$
$$w1 = w5 - w6;$$
$$w4 = w5 + w6;$$

where $$\alpha = \frac{1}{4}; \beta = \cos\left(\frac{3\pi}{10}\right); \gamma = -\cos\left(\frac{\pi}{10}\right); \delta = -\frac{\sqrt{5}}{4}.$$

Consequently, the outputs x0, x1, x2, x3, and x4 3206 for the IDCT-II transform 3202 may be computed as:

$$x0 = w1 - w2;$$
$$x1 = w4 + w3;$$
$$x2 = w0.$$
$$x3 = w4 - w3;$$
$$x4 = w1 + w2.$$

Derivation of Fast Algorithms for Computing 5-Point DCT-IV and DST-IV

An efficient DCT-IV transform and/or DST-IV may be implemented in various ways. For instance, assuming that the input to transform is provided by a vector x, such that $$x := \begin{bmatrix} x0 \\ x1 \\ x2 \\ x3 \\ x4 \end{bmatrix}$$

the product of vector x with the scaled DCT-IV matrix (scaled by $\sqrt{5}$ as in Matrix E) produces a DCT-IV matrix X:

$$X := x \times \sqrt{5} \, C\_IV := \begin{bmatrix} fx0 + gx1 + x2 + hx3 + ix4 \\ gx0 + ix1 - x2 - fx3 - hx4 \\ x0 - x1 - x2 - x3 + x4 \\ hx0 - fx1 + x2 + ix3 - gx4 \\ ix0 - hx1 + x2 - gx3 + fx4 \end{bmatrix} = \begin{bmatrix} X0 \\ X1 \\ X2 \\ X3 \\ X4 \end{bmatrix}$$

Figure 9:
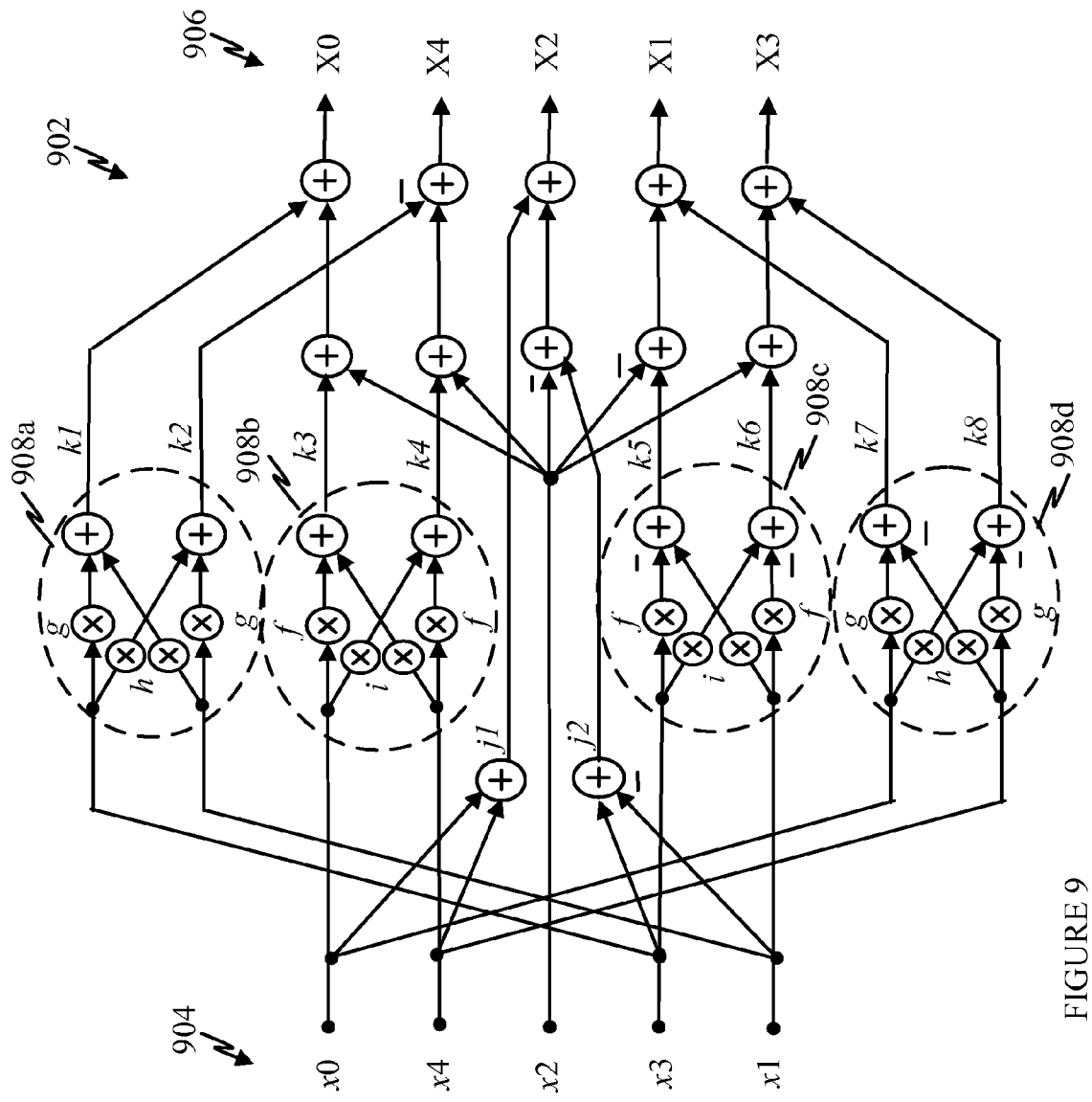
FIG. 9 is a flow diagram illustrating a first example of a factorization of a 5-point DCT-IV transform.

FIG. 9 is a flow diagram illustrating a first example of a factorization of a 5-point DCT-IV transform 902. The transform 902 converts input coefficients x 904 into output coefficients X 906. The transform 902 is obtained by the following simple reordering of terms:

$$X0 = f^*x0 + i^*x4 + g^*x1 + h^*x3 + x2;$$
$$X1 = g^*x0 - h^*x4 + i^*x1 - f^*x3 - x2;$$
$$X2 = -x1 + x3 - x2 + x0 + x4;$$
$$X3 = h^*x0 - g^*x4 - f^*x1 + i^*x3 + x2;$$
$$X4 = i^*x0 + f^*x4 - h^*x1 - g^*x3 + x2;$$

where $f = \sqrt{2} \cos\left(\frac{\pi}{20}\right);$ $$g = \sqrt{2} \cos\left(\frac{3\pi}{20}\right);$$
$$h = \sqrt{2} \cos\left(\frac{7\pi}{20}\right);$$
$$\text{and } i = \sqrt{2} \cos\left(\frac{9\pi}{20}\right).$$

Note that the transform 902 may be computed using intermediate results where:

$$k1 = g^*x1 + h^*x3;$$
$$k2 = h^*x1 + g^*x3;$$
$$k3 = f^*x0 + i^*x4;$$
$$k4 = i^*x0 + f^*x4;$$
$$k5 = i^*x1 - f^*x3;$$
$$k6 = -f^*x1 + i^*x3;$$
$$k7 = g^*x0 - h^*x4;$$
$$k8 = h^*x0 - g^*x4;$$
$$j1 = x0 + x4;$$
$$j2 = x3 - x1.$$

Consequently, the transform 902 may be represented as:

$$X0 = k3 + k1 + x2;$$
$$X1 = k7 + k5 - x2;$$
$$X2 = j1 + j2 - x2;$$
$$X3 = h^*x0 - g^*x4 - f^*x1 + i^*x3 + x2;$$
$$X4 = k4 - k2 + x2.$$

Therefore, the output coefficients X0, X1, X2, X3, and X4 can be computed by using four (4) butterflies 908a, 908b, 908c, and 908d as illustrated in the transform 902 of FIG. 9. The complexity of this implementation is twenty (20) additions and sixteen (16) multiplications. The longest path length in this implementation is only three (3) operations.

Figure 10:
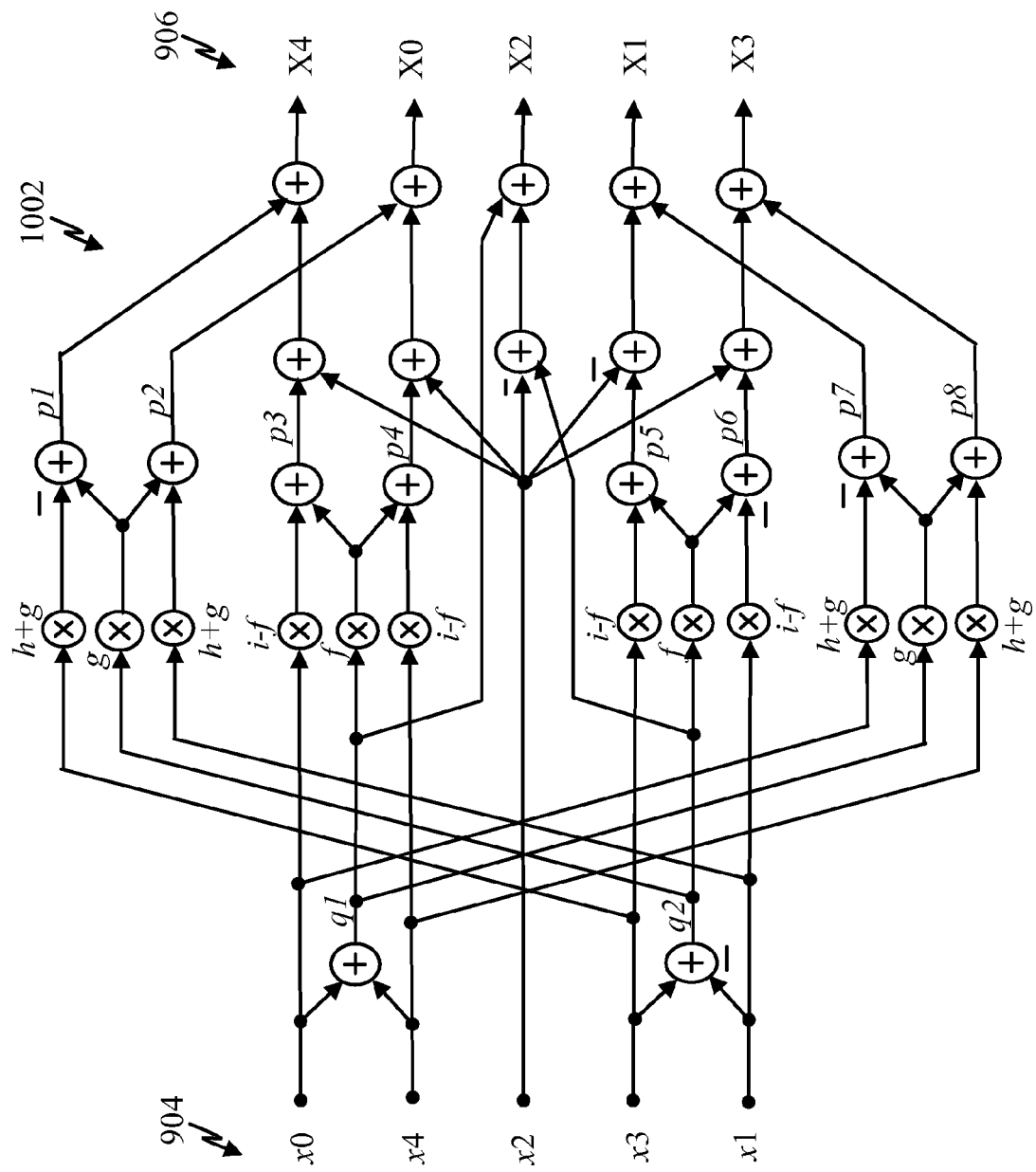
FIG. 10 is a flow diagram illustrating a second example of how a 5-point DCT-IV transform may be implemented.

FIG. 10 is a flow diagram illustrating a second example of how a 5-point DCT-IV transform 1002 may be implemented. Each butterfly in the transform 902 of FIG. 9 can be modified such that it only needs three (3) multiplications to execute. For example, the component operations for output coefficients X0 and X4 can be written as:

$$f^*x0 + i^*x4 = (x0 + x4)^*f + x4^*(i - f);$$
$$i^*x0 + f^*x4 = (x0 + x4)^*f + x0^*(i - f);$$
$$g^*x1 + h^*x3 = (x1 - x3)^*g + x3^*(h + g);$$
$$-h^*x1 - g^*x3 = (x1 - x3)^*g - x1^*(g + h).$$

Similarly, the component operations for output coefficients X1 and X3 can be written as:

$$g*x0-h*x4=(x3-x1)*f+x3*(i-f);$$

$$i*x1-f*x3=(x0+x4)*g+x0*(h+g);$$

$$h*x0-g*x4=(x3-x1)*f-x1*(i-f);$$

$$f*x1+i*x3=(x0+x4)*g+x4*(h+g).$$

By using such decompositions, the output coefficients for transform 1002 can be characterized by:

$$X0=(x0+x4)*f+x4*(i-f)+(x1-x3)*g+x3*(h+g)+x2;$$

$$X1=(x3-x1)*f+x3*(i-f)+(x0+x4)*g+x0*(h+g)-x2$$

$$X2=-x1+x3-x2+x0+x4;$$

$$X3=(x3-x1)*f-x1*(i-f)+(x0+x4)*g+x4*(h+g)+x2;$$

$$X4=(x0+x4)*f+x0*(i-f)+(x1-x3)*g-x1*(g+h)+x2.$$

Note that the transform 1002 may be computed using intermediate results where:

$$q1=x0+x4;$$

$$q2=x3-x1;$$

$$p1=(x1-x3)*g-x1*(g+h)=q2*g-x1*(g+h);$$

$$p2=(x1-x3)*g+x3*(h+g)=q2*g+x3*(g+h);$$

$$p3=(x0+x4)*f+x0*(i-f)=q1*f+x0*(i-f);$$

$$p4=(x0+x4)*f+x4*(i-f)=q1*f+x4*(i-f);$$

$$p5=(x3-x1)*f+x3*(i-f)=q2*f+x3*(i-f);$$

$$p6=(x3-x1)*f-x1*(i-f)=q2*f-x1*(i-f);$$

$$p7=(x0+x4)*g+x0*(h+g)=q1*g+x0*(h+g);$$

$$p8=(x0+x4)*g+x4*(h+g)=q1*g+x4*(h+g).$$

Consequently, the transform 902 may be represented as:

$$X0=p2+p4+x2;$$

$$X1=p5+p7-x2;$$

$$X2=q1+q2-x2;$$

$$X3=p6+p8+x2;$$

$$X4=p1+p3+x2.$$

The complexity of this transform 1002 is now twenty (20) additions and twelve (12) multiplications. The length of the longest path here is four (4) operations.

In an alternative approach, a DCT-IV transforms may be derived by mapping it to a DCT-II transform.

Figure 11:
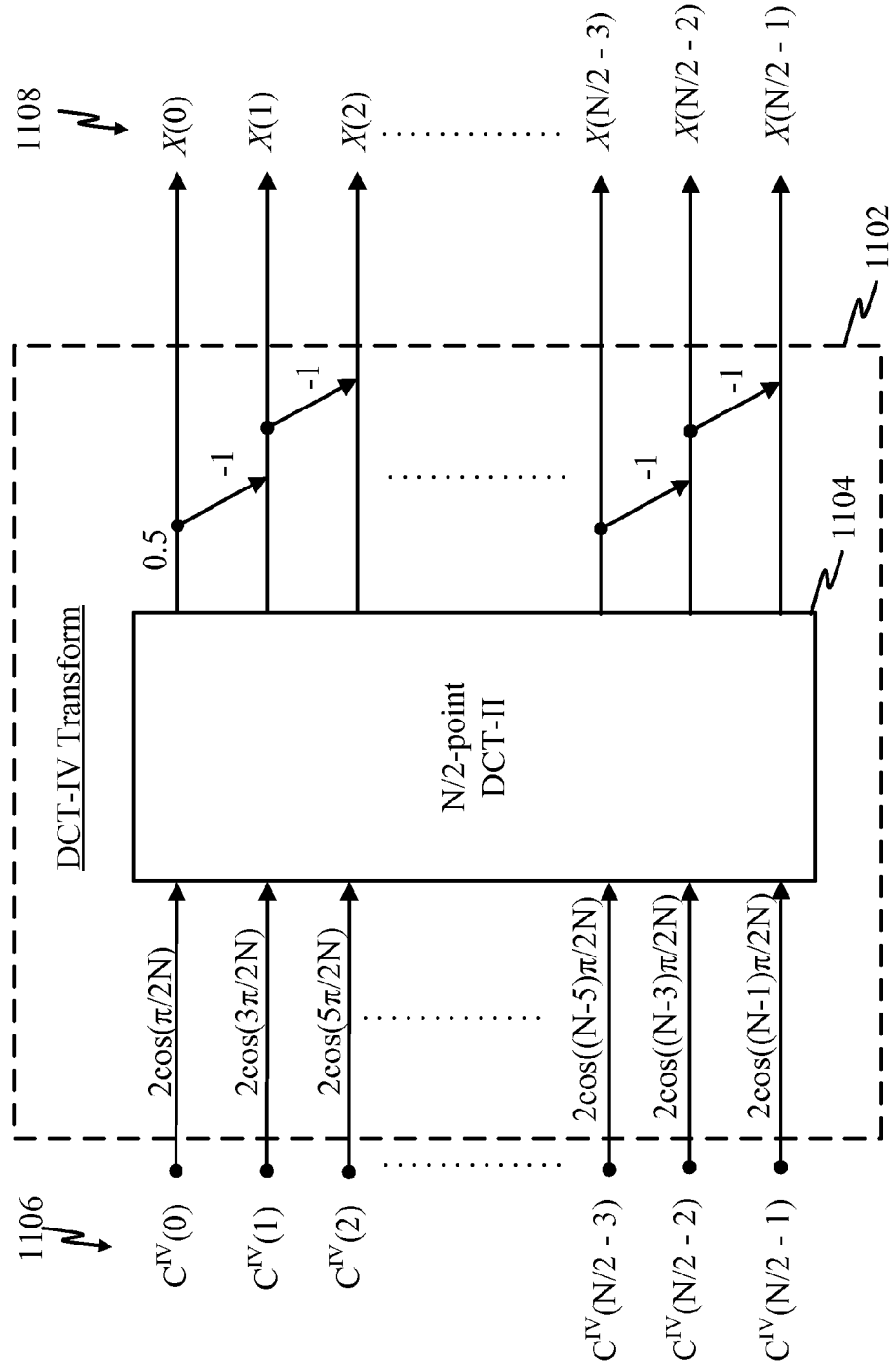
FIG. 11 is a block diagram illustrating how a DCT-IV transform may be mapped to a DCT-II transform to transform input coefficients into output coefficients.

For example, FIG. 11 is a block diagram illustrating how a DCT-IV transform 1102 may be mapped to a DCT-II transform 1104 to transform input coefficients 1106 into output coefficients 1108.

Figure 12:
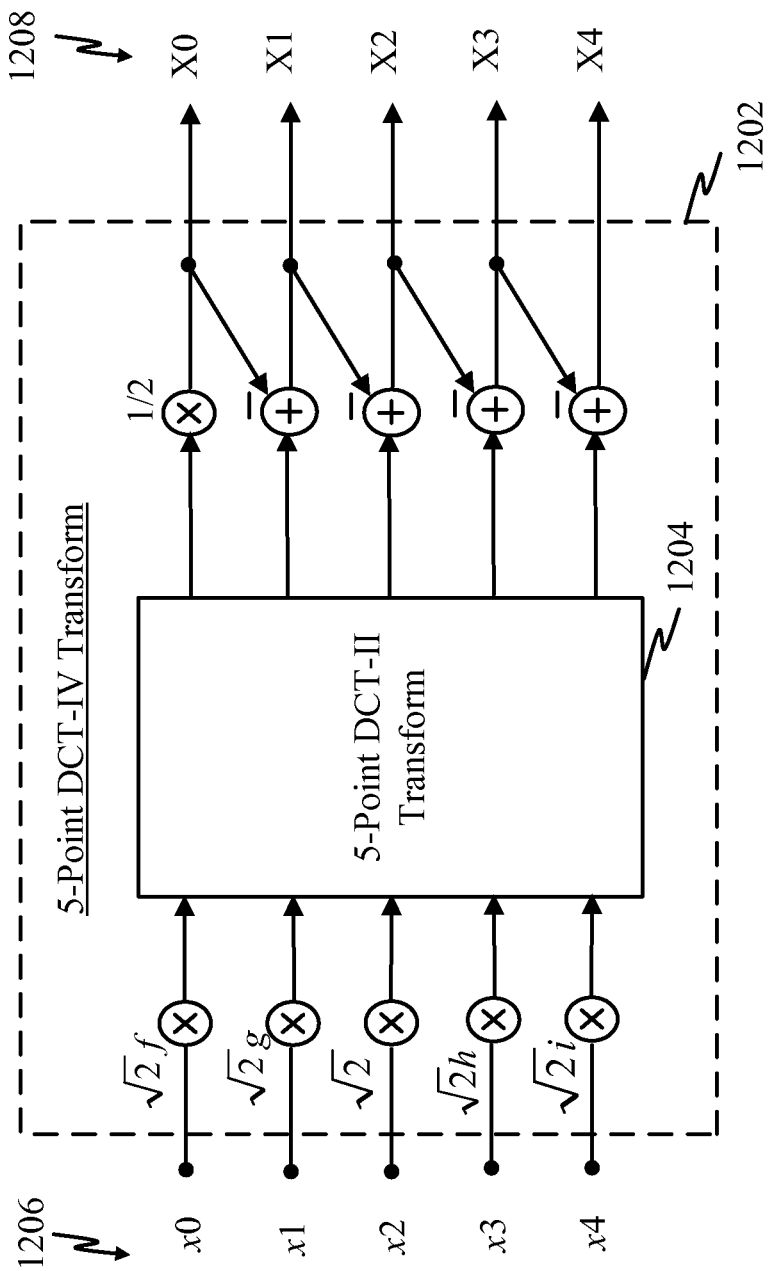
FIG. 12 is a block diagram illustrating a 5-point DCT-IV transform may be implemented using a 5-point DCT-II transform in order to transform input coefficients into output coefficients.

FIG. 12 is a block diagram illustrating a 5-point DCT-IV transform 1202 may be implemented using a 5-point DCT-II transform in order to transform input coefficients 1206 into output coefficients 1208. This is a particular case of the transform mapping illustrated in FIG. 11. In this example, the notation for angles may be represented as:

$$f = \sqrt{2}\cos\left(\frac{\pi}{20}\right);$$

$$g = \sqrt{2}\cos\left(\frac{3\pi}{20}\right);$$

$$h = \sqrt{2}\cos\left(\frac{7\pi}{20}\right);$$

$$i = \sqrt{2}\cos\left(\frac{9\pi}{20}\right).$$

Figure 13:
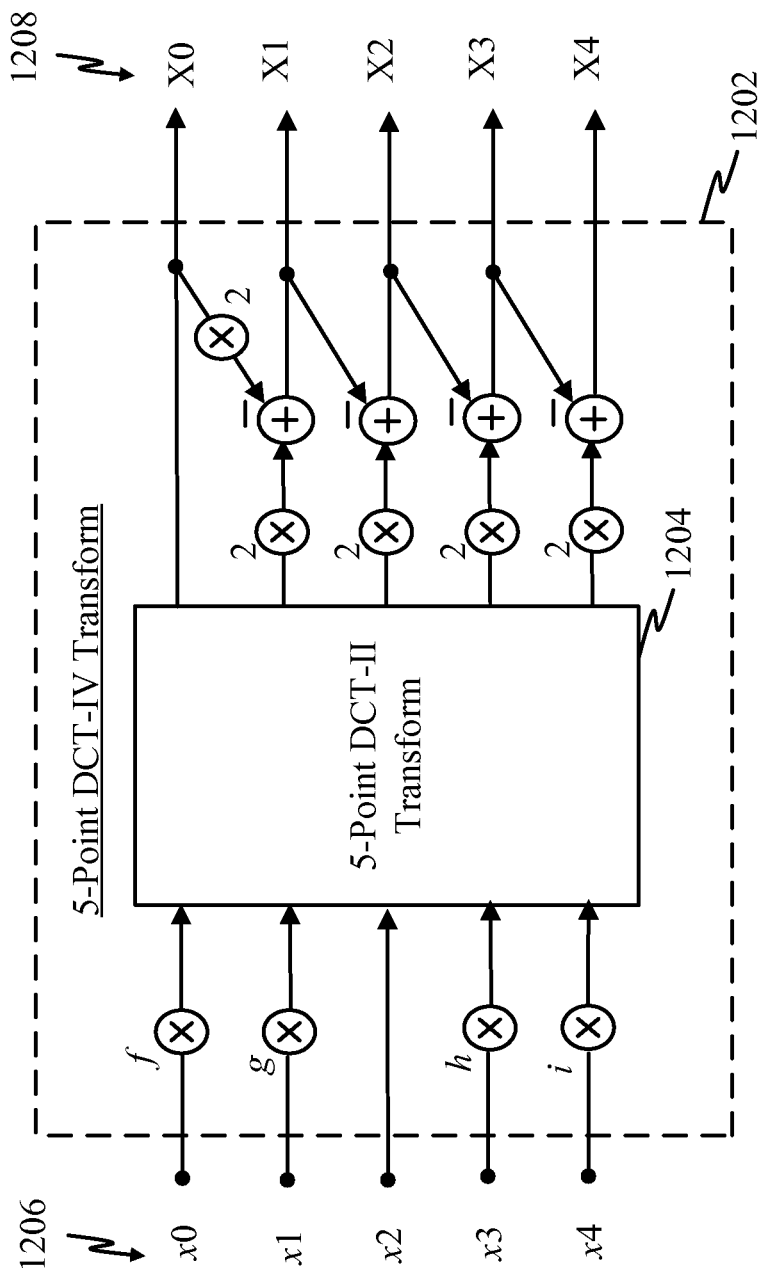
FIG. 13 is a block diagram illustrating an example of the factorization of the 5-point DCT-IV transform of FIG. 12 may be implemented using a 5-point DCT-II transform.

FIG. 13 is a block diagram illustrating an example of the factorization of the 5-point DCT-IV transform of FIG. 12 may be implemented using a 5-point DCT-II transform. In this example, the 5-point DCT-IV transform of FIG. 12 is multiplied by 2 and the $\sqrt{2}$ factors are moved around. This mapping is equivalent to that of FIG. 12.

Figure 14:
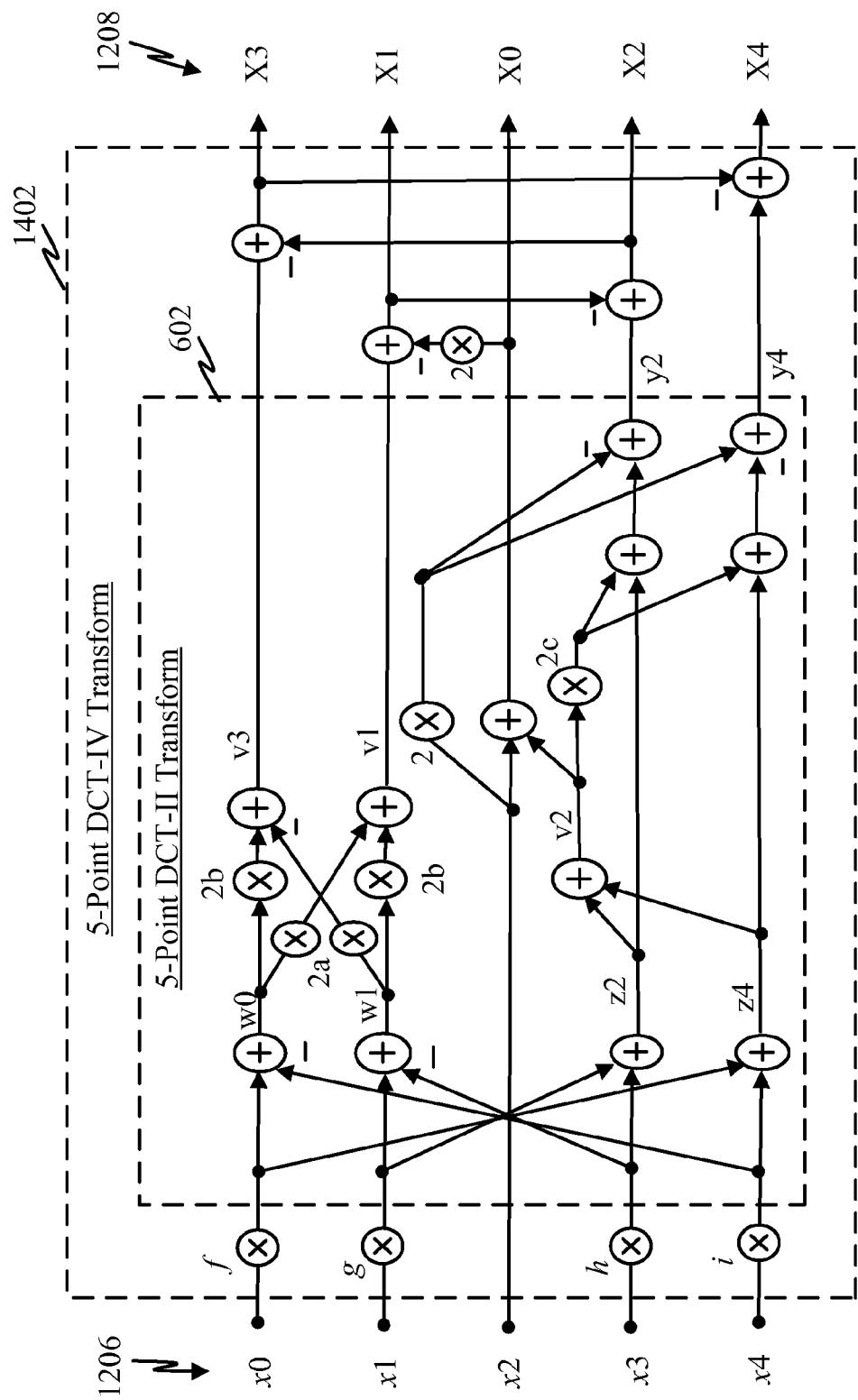
FIG. 14 is a block diagram illustrating how the DCT-IV transform mapping in FIG. 13 may be combined with the DCT-II transform of FIG. 6.

FIG. 14 is a block diagram illustrating how the DCT-IV transform 1202 mapping in FIG. 13 may be combined with the DCT-II transform 602 of FIG. 6. That is, the DCT transform 1402 may be a combination of the transform 1202 of FIG. 13 may be implemented as the DCT-II transform 602 of FIG. 6. Consequently, the output coefficients for transform 1402 can be characterized by:

$$X0=(f*x0+i*x4)+(h*x3+g*x1)+x2;$$

$$X1=[2a*(f*x0-i*x4)+2b*(g*x1-h*x3)]-[2*X0];$$

$$X2=[2c*(f*x0+i*x4+g*x1+h*x3)+(g*x1+h*x3)-2*x2]-[X1];$$

$$X3=[2b*(f*x0-i*x4)-2a*(g*x1-h*x3)]-[X2];$$

$$X4=[-2c*(f*x0+i*x4+g*x1+h*x3)-(f*x0+i*x4)+2*x2]-[X3];$$

where $a = \sqrt{2}\cos\left(\frac{\pi}{10}\right); b = \cos\left(\frac{3\pi}{10}\right); c = -\cos\left(\frac{\pi}{5}\right); d = \cos\left(\frac{2\pi}{5}\right).$ Note that intermediate results may be computed as:

$$w0=f*x0-i*x4;$$

$$w1=g*x1-h*x3;$$

$$z2=g*x1+h*x3;$$

$$z4=f*x0+i*x4;$$

$$v1=2b*w1+2a*w0;$$

$$v2=z2+z4;$$

$$v3=2b*w0-2a*w1;$$

$$y2=2c*v2+z2-2*x2;$$

$$y4=-2c*v2-z4+2*x2.$$

Consequently the outputs may be represented as:

$$X0=v2+x2;$$

$$X1=v1-2*X0;$$

$$X2=y2-X1;$$

$X3=v3-X2;$ $X4=y4-X3.$

This DCT-IV transform 1402 uses only sixteen (16) additions, nine (9) multiplications, and two (2) shifts. Note that the 2 factors in this transform are a dyadic rational, and so such "multiplication" by 2 is just a binary shift operation (i.e., a shift).

Figure 15:
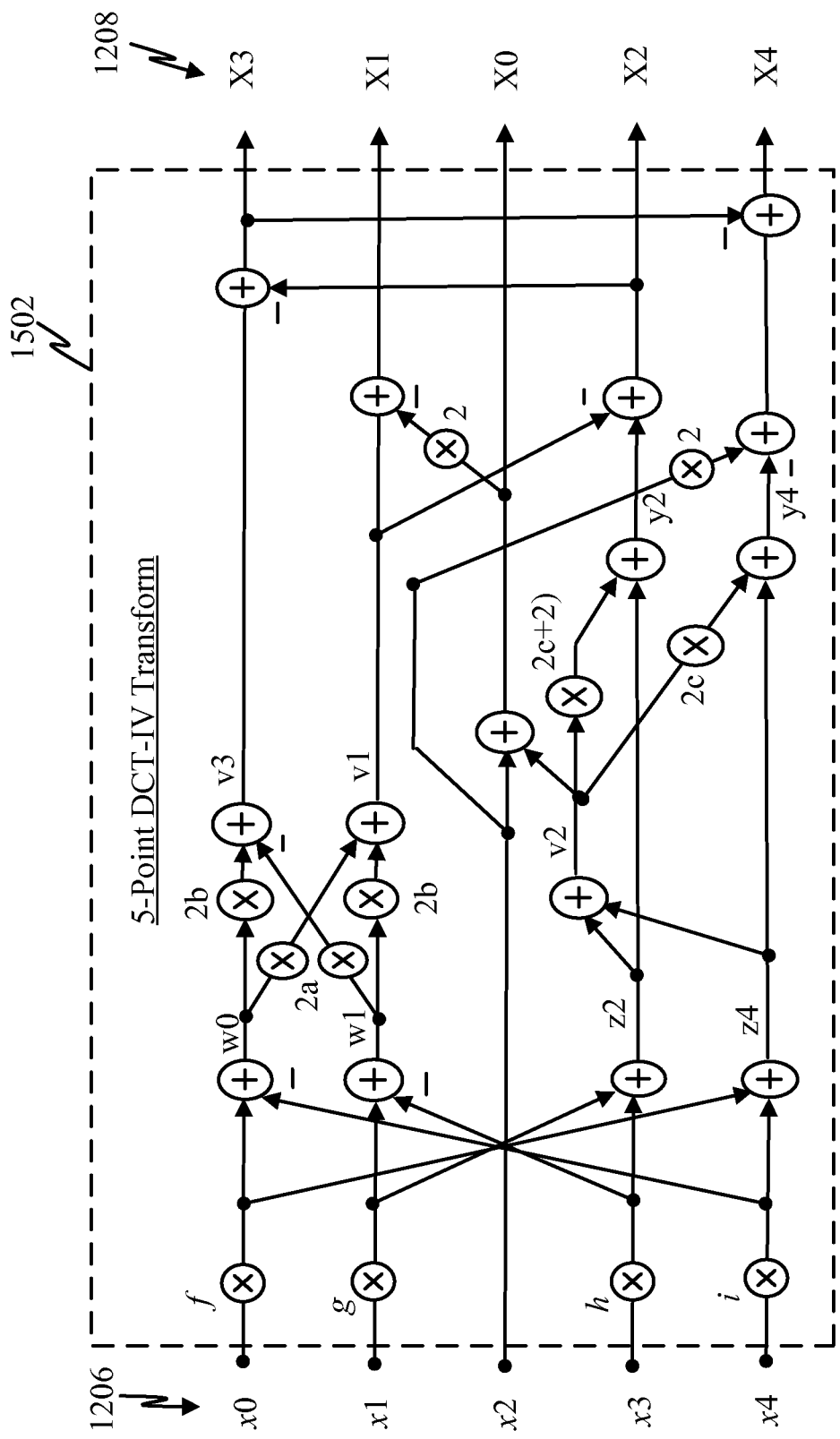
FIG. 15 is a block diagram illustrating how the DCT-IV transform of FIG. 14 may be further modified into an equivalent transform.

FIG. 15 is a block diagram illustrating how the DCT-IV transform 1402 of FIG. 14 may be further modified into an equivalent transform 1502. In this example, the last cascade operations in the transform 1502 allows additional simplifications. Consequently, the output coefficients for transform 1502 can be characterized by:

$X0=(f*x0+i*x4)+(h*x3+g*x1)+x2;$ $X1=[2a*(f*x0-i*x4)+2b*(g*x1-h*x3)]-[2*X0];$ $X2=[(2c+2)*(f*x0+i*x4+g*x1+h*x3)]+(g*x1+h*x3)-[2a*(f*x0-i*x4)+2b*(g*x1-h*x3)];$ $X3=[2b*(f*x0-i*x4)-2a*(g*x1-h*x3)]-[X2];$ $X4=[-2c*(f*x0+i*x4+g*x1+h*x3)-(f*x0+i*x4)+2*x2]-[X3].$

Note that intermediate results may be computed as:

$w0=f*x0-i*x4;$ $w1=g*x1-h*x3;$ $z2=g*x1+h*x3;$ $z4=f*x0+i*x4;$ $v1=2b*w1+2a*w0;$ $v2=z2+z4;$ $v3=2b*w0-2a*w1;$ $y2=(2c+2)*v2+z2;$ $y4=2c*v2+z4.$

Consequently the outputs may be represented as:

$X0=v2+x2;$ $X1=v1-2*X0;$ $X2=y2-v1;$ $X3=v3-X2;$ $X4=-y4+2*x2-X3.$

Consequently, this DCT-IV transform 1502 uses only fifteen (15) additions, ten (10) multiplications, and two (2) shifts. Note that the "2" factors in this transform are a dyadic rational, and so such "multiplication" by 2 is just a binary shift operation (i.e., a shift). The longest path length in this implementation is only five (5) operations.

Figure 16:
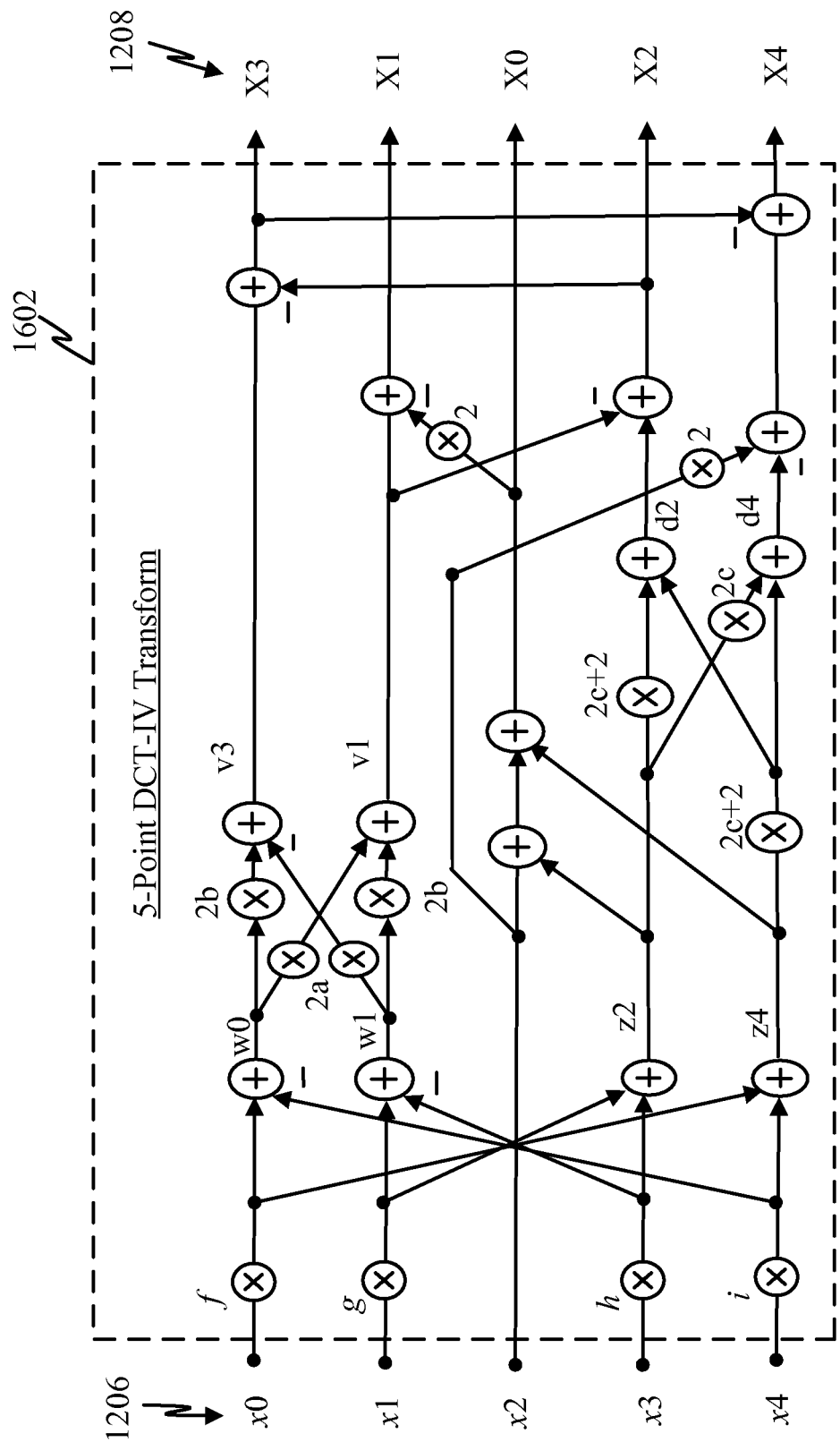
FIG. 16 is a block diagram illustrating how the DCT-IV transform of FIG. 15 may be further modified into an equivalent transform.

FIG. 16 is a block diagram illustrating how the DCT-IV transform 1502 of FIG. 15 may be further modified into an equivalent transform 1602. The output coefficients for transform 1602 can be characterized by:

$X0=(f*x0+i*x4)+(h*x3+g*x1)+x2;$ $X1=[2a*(f*x0-i*x4)+2b*(g*x1-h*x3)]-[2*X0];$ $X2=[(2c+2)*(g*x1+h*x3)+(2c+2)*(f*x0+i*x4)]-[2a*(f*x0-i*x4)+2b*(g*x1-h*x3)];$ $X3=[2b*(f*x0-i*x4)-2a*(g*x1-h*x3)]-[X2];$ $X4=[-(2c+2)*(f*x0+i*x4)-2c*(g*x1+h*x3)+2*x2]-[X3].$

Note that intermediate results may be computed as:

$w0=f*x0-i*x4;$ $w1=g*x1-h*x3;$ $z2=g*x1+h*x3;$ $z4=f*x0+i*x4;$ $v1=2b*w1+2a*w0;$ $v2=z2+z4;$ $v3=2b*w0-2a*w1;$ $d2=(2c+2)*z2+(2c+2)*z4;$ $d4=(2c+2)*z4+2c*z2.$

Consequently the outputs may be represented as:

$X0=z2+z4+x2;$ $X1=v1-2*X0;$ $X2=d2-v1;$ $X3=v3-X2;$ $X4=-d4+2*x2-X3.$

Consequently, this DCT-IV transform 1602 uses only fifteen (15) additions, eleven (11) multiplications, and two (2) shifts. Note that the 2 factors in this transform are a dyadic rational, and so such "multiplication" by 2 is just a binary shift operation (i.e., a shift). The longest path length in this implementation is only five (5) operations.

Figure 17:
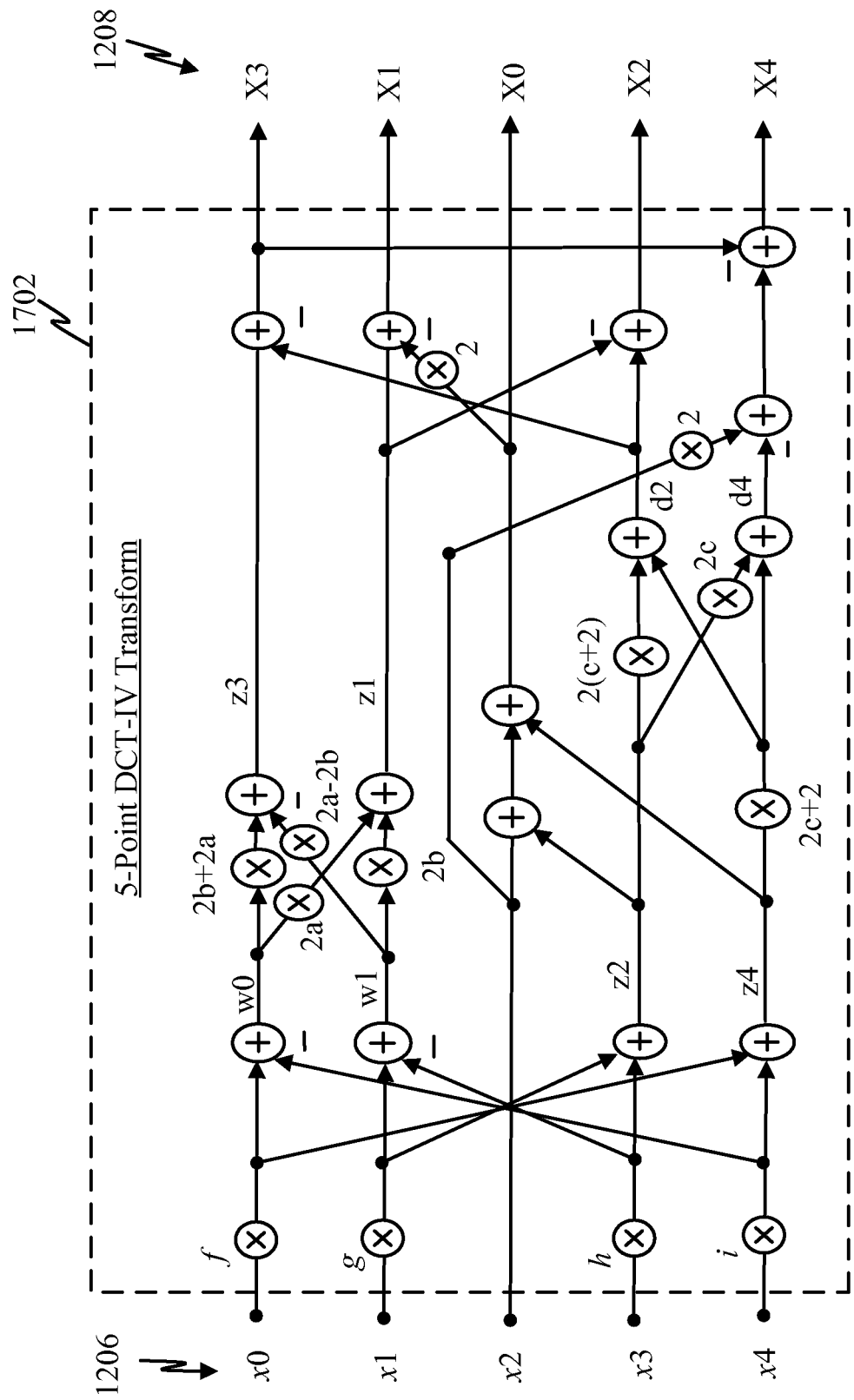
FIG. 17 is a block diagram illustrating how the DCT-IV transform of FIG. 16 may be further modified into an equivalent transform.

FIG. 17 is a block diagram illustrating how the DCT-IV transform 1602 of FIG. 16 may be further modified into an equivalent transform 1702. The output coefficients for transform 1702 can be characterized by:

$X0=(f*x0+i*x4)+(h*x3+g*x1)+x2;$ $X1=[2a*(f*x0-i*x4)+2b*(g*x1-h*x3)]-[2*X0];$ $X2=[2(c+2)*(g*x1+h*x3)+(2c+2)*(f*x0+i*x4)]-[2a*(f*x0-i*x4)+2b*(g*x1-h*x3)];$ $X3=[(2b+2a)*(f*x0-i*x4)-(2a-2b)*(g*x1-h*x3)]-[2(c+2)*(g*x1+h*x3)+(2c+2)*(f*x0+i*x4)];$ $X4=[-(2c+2)*(f*x0+i*x4)-2c*(g*x1+h*x3)+2*x2]-[X3].$

Note that intermediate results may be computed as:

$w0=f*x0-i*x4;$ $w1=g*x1-h*x3;$ $z2=g*x1+h*x3;$ $z4=f*x0+i*x4;$ $z1=2a*w0+2b*w1$ $z3=(2b+2a)*w0-(2a-2b)*w1;$ $$d2=2(c+2)*z2+(2c+2)*z4;$$

$$d4=(2c+2)*z4+2c*z2.$$

Consequently the outputs may be represented as:

$$X0=z2+z4+x2;$$

$$X1=z1-2*X0;$$

$$X2=d2-z1;$$

$$X3=z3-d2;$$

$$X4=-d4+2*x2-X3.$$

Consequently, this DCT-IV transform 1702 uses only fifteen (15) additions, eleven (11) multiplications, and two (2) shifts. Note that the "2" factors in this transform are a dyadic rational, and so such "multiplication" by 2 is just a binary shift operation (i.e., a shift). The longest path length in this implementation is only five (5) operations.

Figure 18:
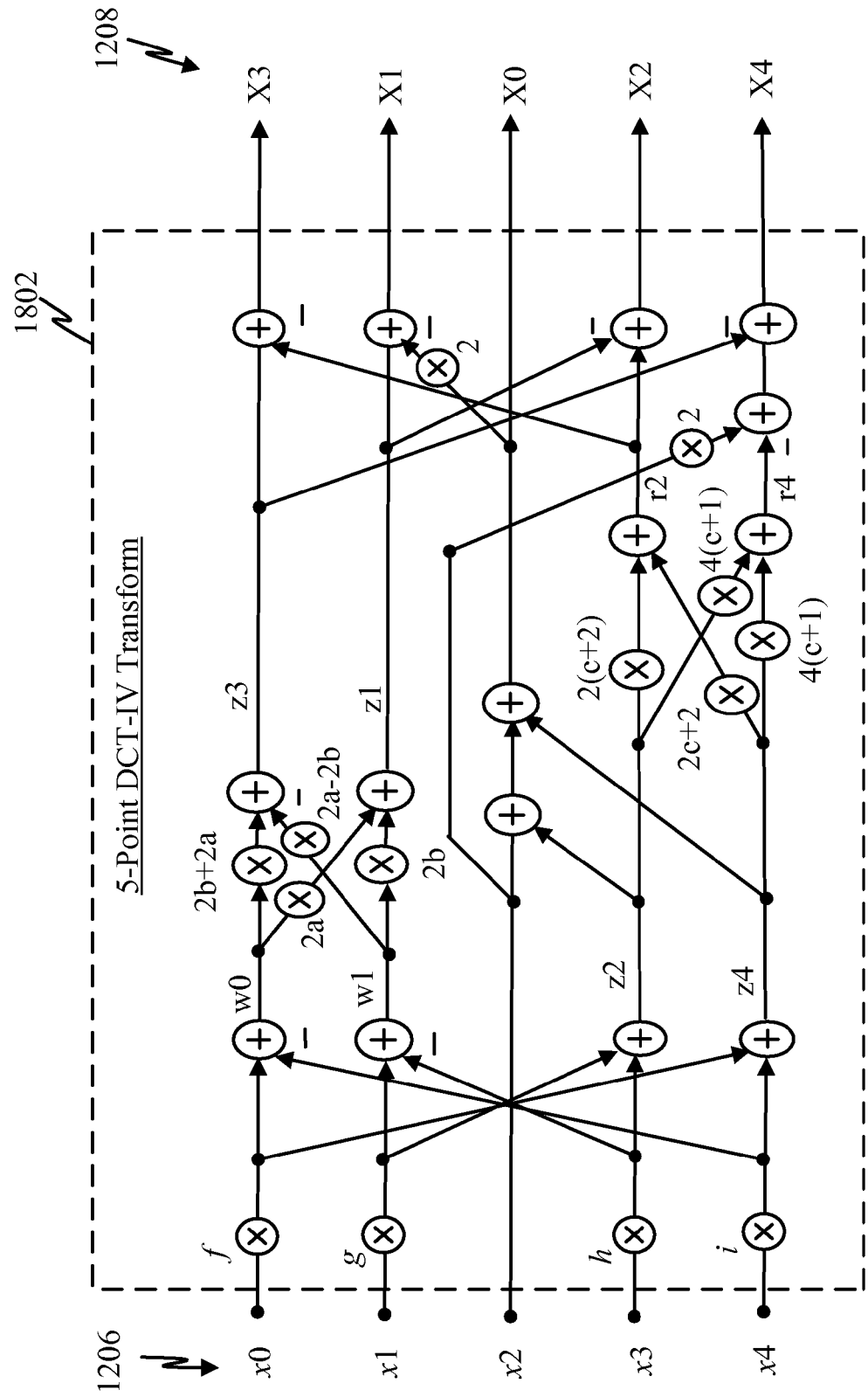
FIG. 18 is a block diagram illustrating how the DCT-IV transform of FIG. 17 may be further modified into an equivalent transform.

FIG. 18 is a block diagram illustrating how the DCT-IV transform 1702 of FIG. 17 may be further modified into an equivalent transform 1802. In this example, a much shorter path length and improved numerical stability is achieved due to the removal of recursive additions at the final stage. The output coefficients for transform 1802 can be characterized by:

$$X0=(f*x0+i*x4)+(h*x3+g*x1)+x2;$$

$$X1=[2a*(f*x0-i*x4)+2b*(g*x1-h*x3)]-[2*X0];$$

$$X2=[2(c+2)*(g*x1+h*x3)+(2c+2)*(f*x0+i*x4)]-[2a*(f*x0-i*x4)+2b*(g*x1-h*x3)];$$

$$X3=[(2b+2a)*(f*x0-i*x4)-(2a-2b)*(g*x1-h*x3)]-[2(c+2)*(g*x1+h*x3)+(2c+2)*(f*x0+i*x4)];$$

$$X4=[-4(c+1)*(f*x0+i*x4)-4(c+1)*(g*x1+h*x3)+2*x2]-[(2b+2a)*(f*x0-1*x4)-(2a-2b)*(g*x1-h*x3)].$$

Note that intermediate results may be computed as:

$$w0=f*x0-i*x4;$$

$$w1=g*x1-h*x3;$$

$$z2=g*x1+h*x3;$$

$$z4=f*x0+i*x4;$$

$$z1=2a*w0+2b*w1$$

$$z3=(2b+2a)*w0-(2a-2b)*w1;$$

$$r2=(2c+2)*z2+(2c+2)*z4;$$

$$r4=4(c+1)*z2+4(c+1)*z4.$$

Consequently the outputs may be represented as:

$$X0=z2+z4+x2;$$

$$X1=z1-2*X0;$$

$$X2=d2-z1;$$

$$X3=z3-r2;$$

$$X4=-r4+2*x2-z3.$$

This transform 1802 uses only fifteen (15) additions, twelve (12) multiplications, and two (2) shifts. Note that the multiplications by "2" are considered shifts. The longest path length in this implementation is only five (5) operations.

Note that the DCT and DST transforms illustrated in FIGS. 5-18 may be reversible as IDCT and IDST transforms to undo or reverse the DCT and DST transform operations therein.

Computing Transforms of Sizes $N=5*2^K$

According to one implementation, an N-sized transform, where $N=5*2K$, may be recursively split in a chain of smaller N/2-sized transforms, which can be based on DCT-II, DCT-IV, DST-IV, or similar kernels, and where the last 5-point cascade is implemented by using one of the described fast algorithms for computing 5-point transforms.

Figure 19:
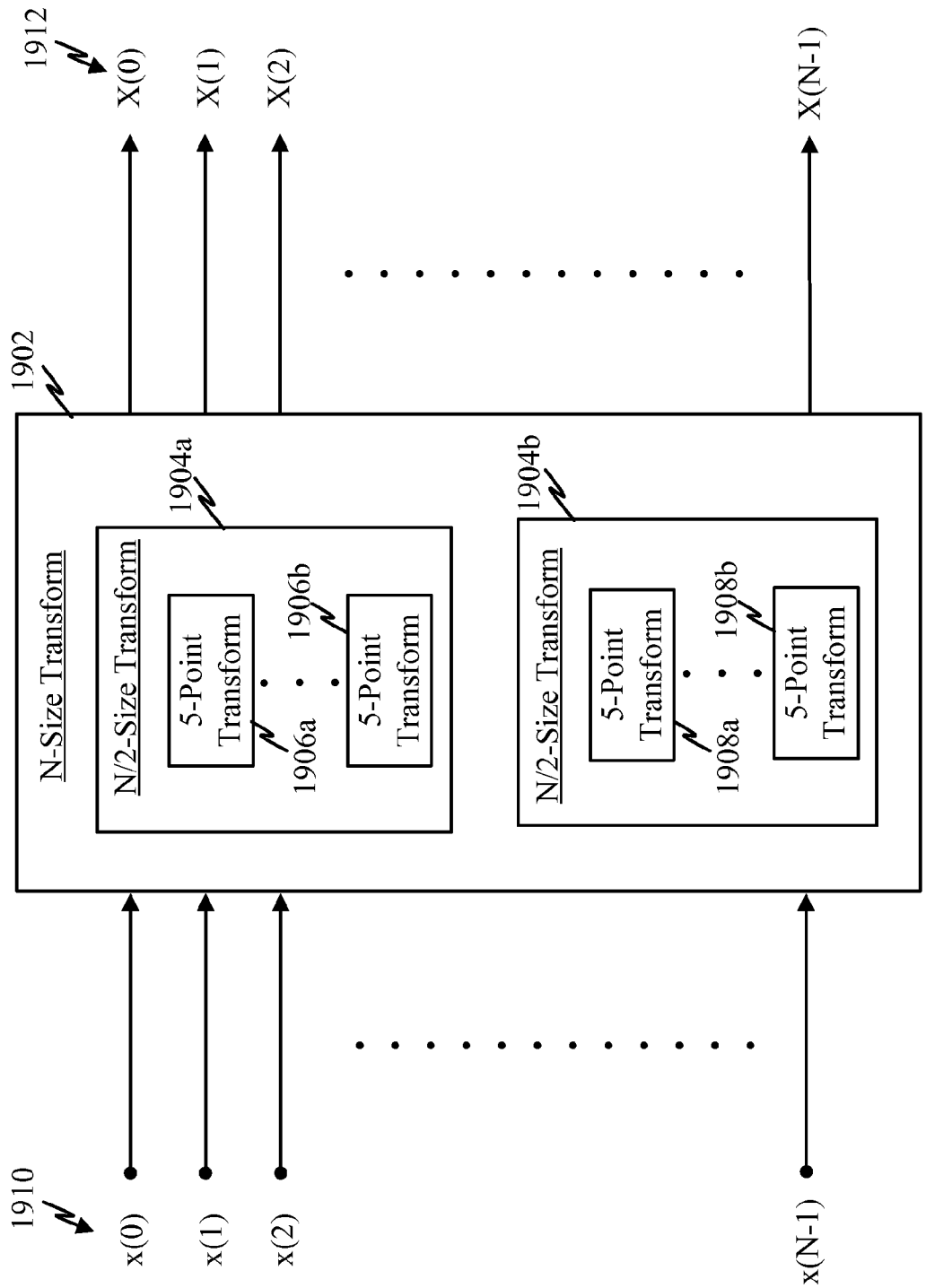
FIG. 19 is a block diagram illustrating how an N-size transform may be recursively split into smaller N/2-sized transforms until it is represented by a plurality of 5-point transforms.

FIG. 19 is a block diagram illustrating how an N-size transform may be recursively split into smaller N/2-sized transforms until it is represented by a plurality of 5-point transforms. For instance, an N-Size (point) transform 1902 receives N input coefficients 1910 and transforms them into N output coefficients 1912. The N-Size transform 1902 may be decimated into two N/2-Size transforms 1904a and 1904b. Similarly, each N/2-Size transform 1904a and 1904b may be further decimated into a plurality of smaller transforms until the smallest transforms are 5-point transforms 1906a, 1906b, 1908a, and 1908b. In various implementations, the 5-point transforms 1906a, 1906b, 1908a, and 1908b may be implemented by any of the 5-point transforms illustrated in FIGS. 5-18.

Figure 20:
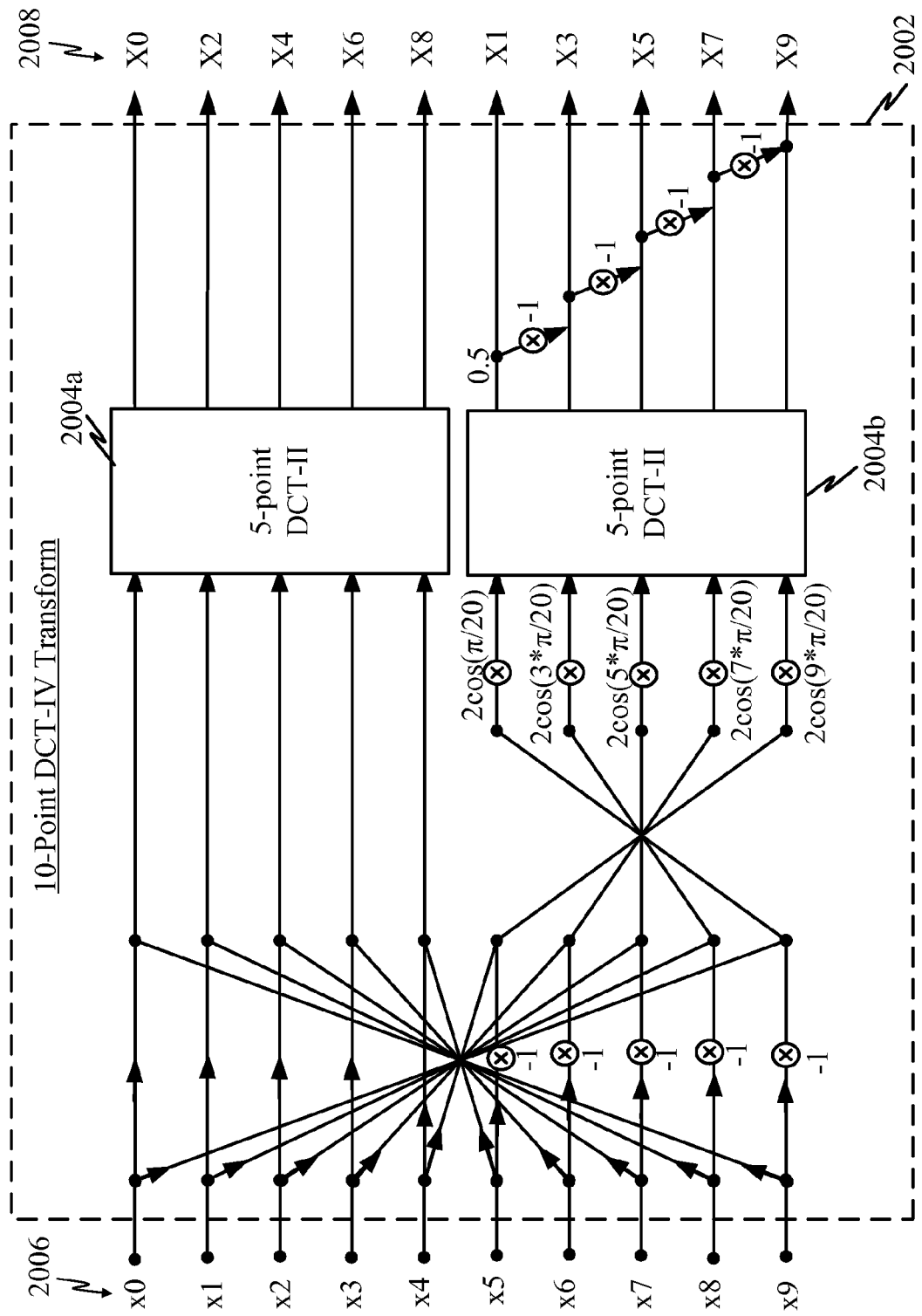
FIG. 20 is a block diagram illustrating an example of transform decimation and splitting in which a 10-point DCT-IV transform is recursively split into a plurality of smaller 5-point DCT-II transforms.

FIG. 20 is a block diagram illustrating an example of transform decimation and splitting in which a 10-point DCT-IV transform is recursively split into a plurality of smaller 5-point DCT-II transforms 2004a and 2004b. In this example, ten input coefficients 2006 are transformed by a pair of smaller 5-point transforms 2004a and 2004b to produce ten output coefficients 2008.

Figure 28:
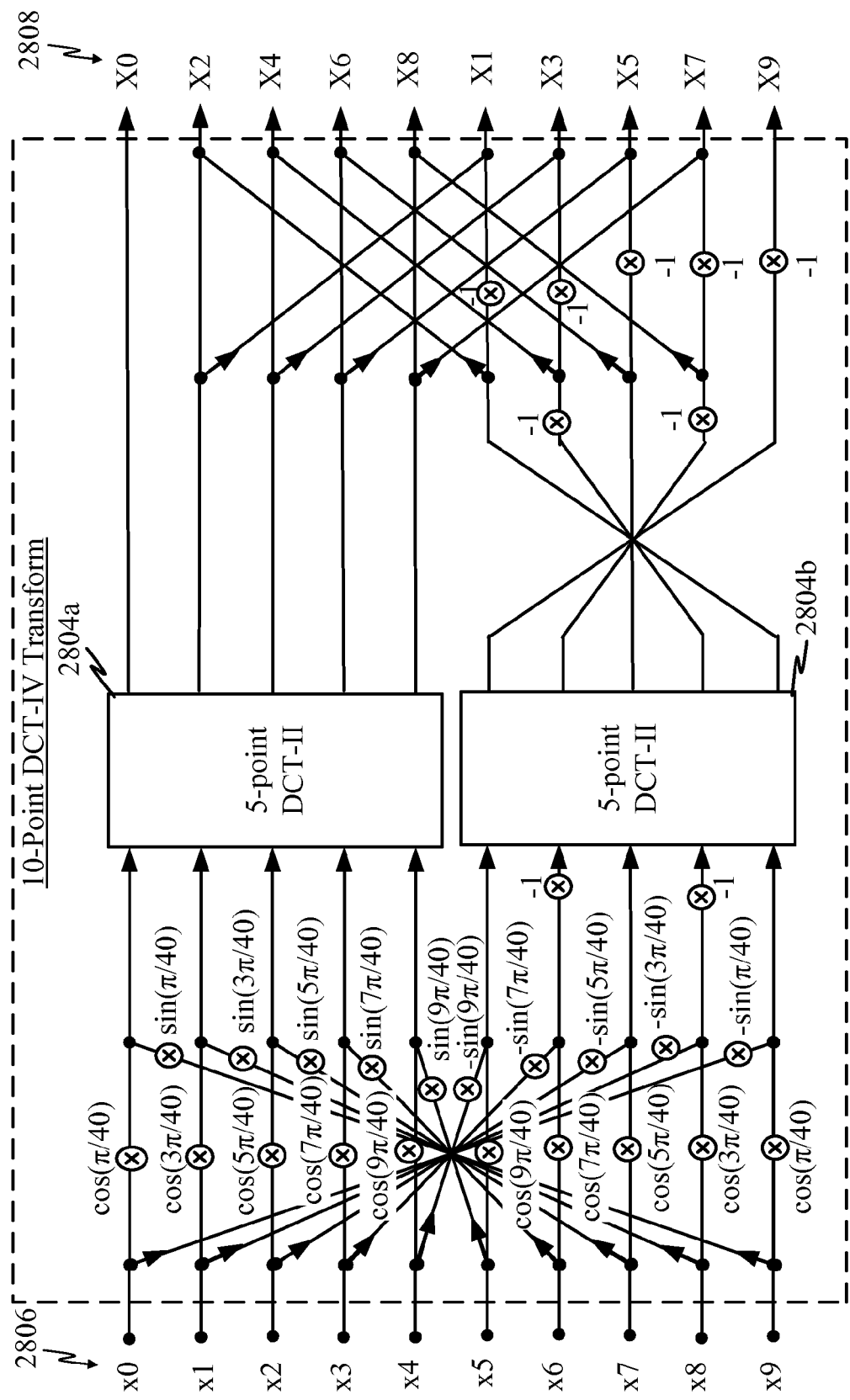
FIG. 28 illustrates an alternative example of transform decimation and splitting in which a 10-point DCT-IV transform is recursively split into a plurality of smaller 5-point DCT-II transforms.

FIG. 28 illustrates an alternative example of transform decimation and splitting in which a 10-point DCT-IV transform is recursively split into a plurality of smaller 5-point DCT-II transforms 2804a and 2804b. In this example, ten input coefficients 2806 are transformed by a pair of smaller 5-point transforms 2804a and 2804b to produce ten output coefficients 2808. Compared to FIG. 20, this alternative decimation process for DCT-IV requires more operations, but it is more robust numerically. That is, running sequence of subtractions post the transform 2004b in scheme FIG. 20 can potentially increase the magnitude of intermediate variables by N/2, where N is the size of the transform. The alternative scheme of FIG. 28 does not have such runs, and it uses only plane rotations (which are orthonormal operations) to compute the transform. The split procedure for DCT-II also has such properties. It should be noted that final algorithm can also alternate transform types recursively in the split process. That is, it can split DCT-II into DCT-II and DCT-IV or half sizes; then it will split DCT-IV into 2 DCT-IIs, while DCT-IIs will be split in further smaller DCT-II and DCT-IV; and so on.

Figure 29:
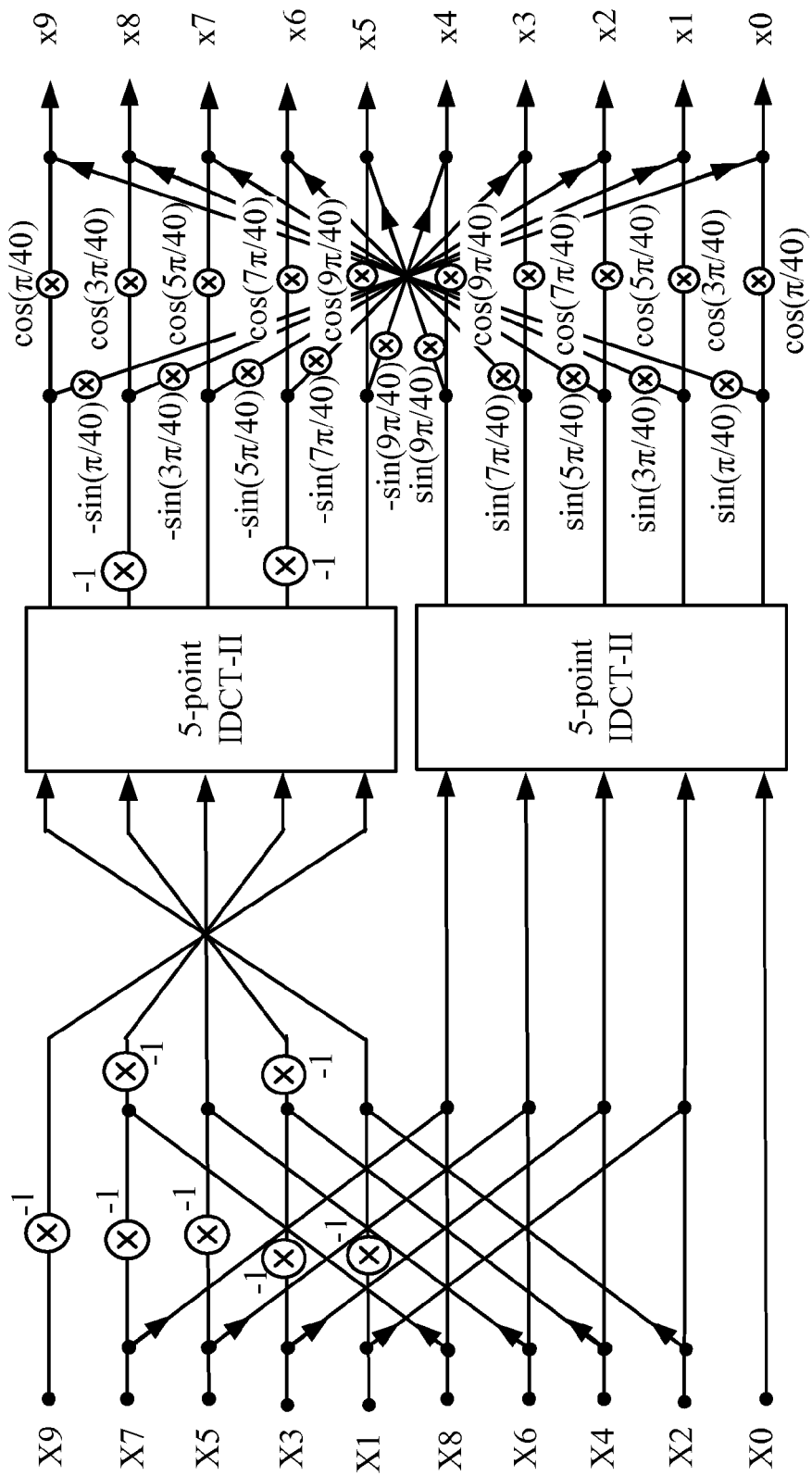
FIG. 29 illustrates 10-point IDCT-IV transform which is the inverse of the transform in FIG. 28.

FIG. 29 illustrates 10-point IDCT-IV transform which is the inverse of the transform in FIG. 28.

Figure 21:
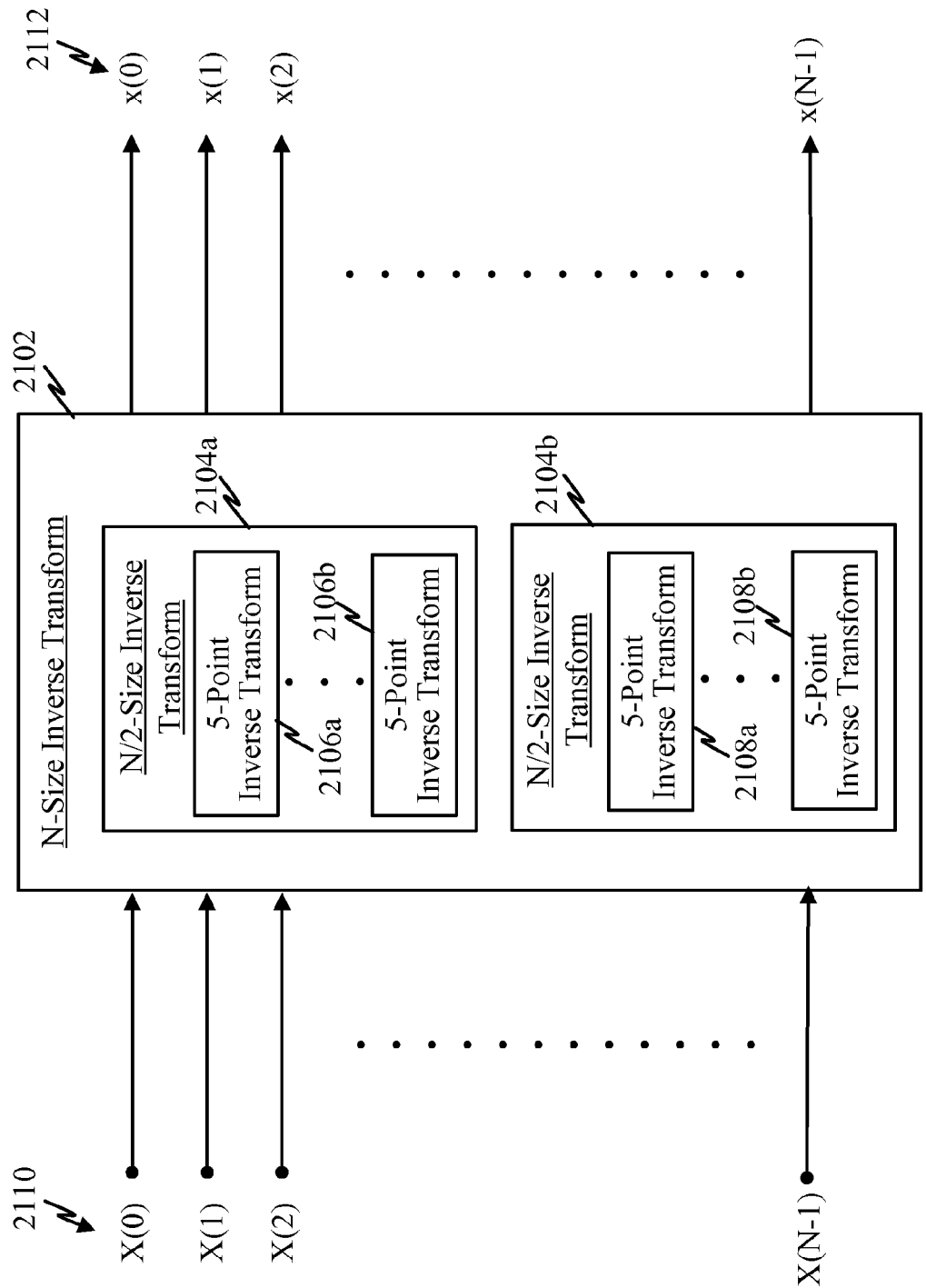
FIG. 21 is a block diagram illustrating how an N-size inverse transform may be recursively split into smaller N/2-size inverse transforms until it is represented by a plurality of 5-point inverse transforms.

FIG. 21 is a block diagram illustrating how an N-size inverse transform may be recursively split into smaller N/2-size inverse transforms until it is represented by a plurality of 5-point inverse transforms. For instance, an N-Size (point) inverse transform 2102 receives N input coefficients 2110 and transforms them into N output coefficients 2112. The N-Size inverse transform 2102 may be decimated into two N/2-Size inverse transforms 2104a and 2104b. Similarly, each N/2-Size inverse transform 2104a and 2104b may be further decimated into a plurality of smaller inverse transforms until the smallest inverse transforms are 5-point inverse transforms 2106a, 2106b, 2108a, and 2108b. In various implementations, the 5-point inverse transforms 2106a, 2106b, 2108a, and 2108b may be implemented by any 5-point inverse transform corresponding to the transforms illustrated in FIGS. 5-18.

Figure 22:
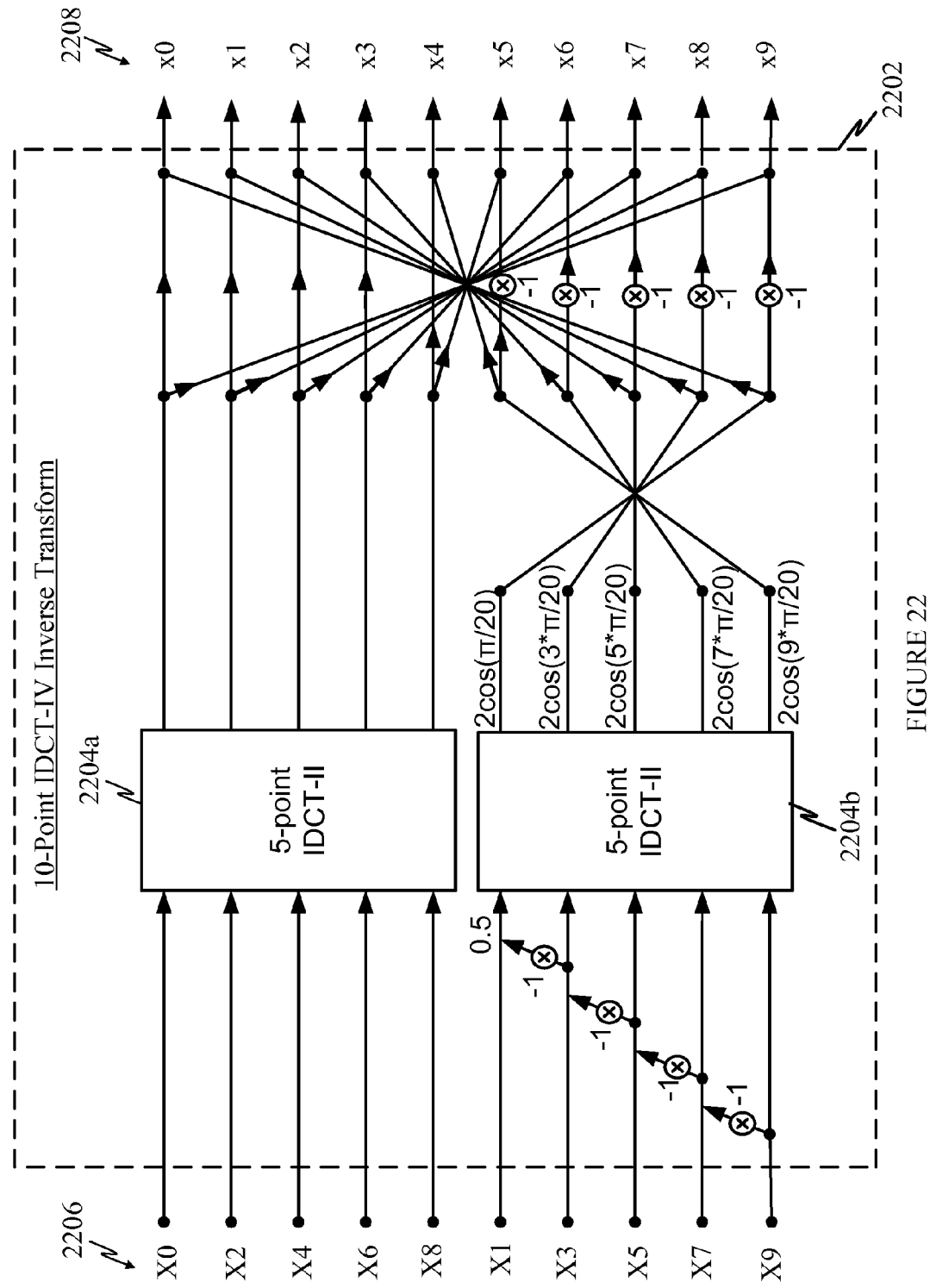
FIG. 22 is a block diagram illustrating an example of inverse transform decimation and splitting in which a 10-point IDCT-IV inverse transform is recursively split into a plurality of smaller 5-point IDCT-II inverse transforms.

FIG. 22 is a block diagram illustrating an example of inverse transform decimation and splitting in which a 10-point IDCT-IV inverse transform 2202 is recursively split into a plurality of smaller 5-point IDCT-II inverse transforms 2204a and 2204b. In this example, ten input coefficients 2206 are transformed by a pair of smaller 5-point inverse transforms 2204a and 2204b to produce ten output coefficients 2208.

Figure 30:
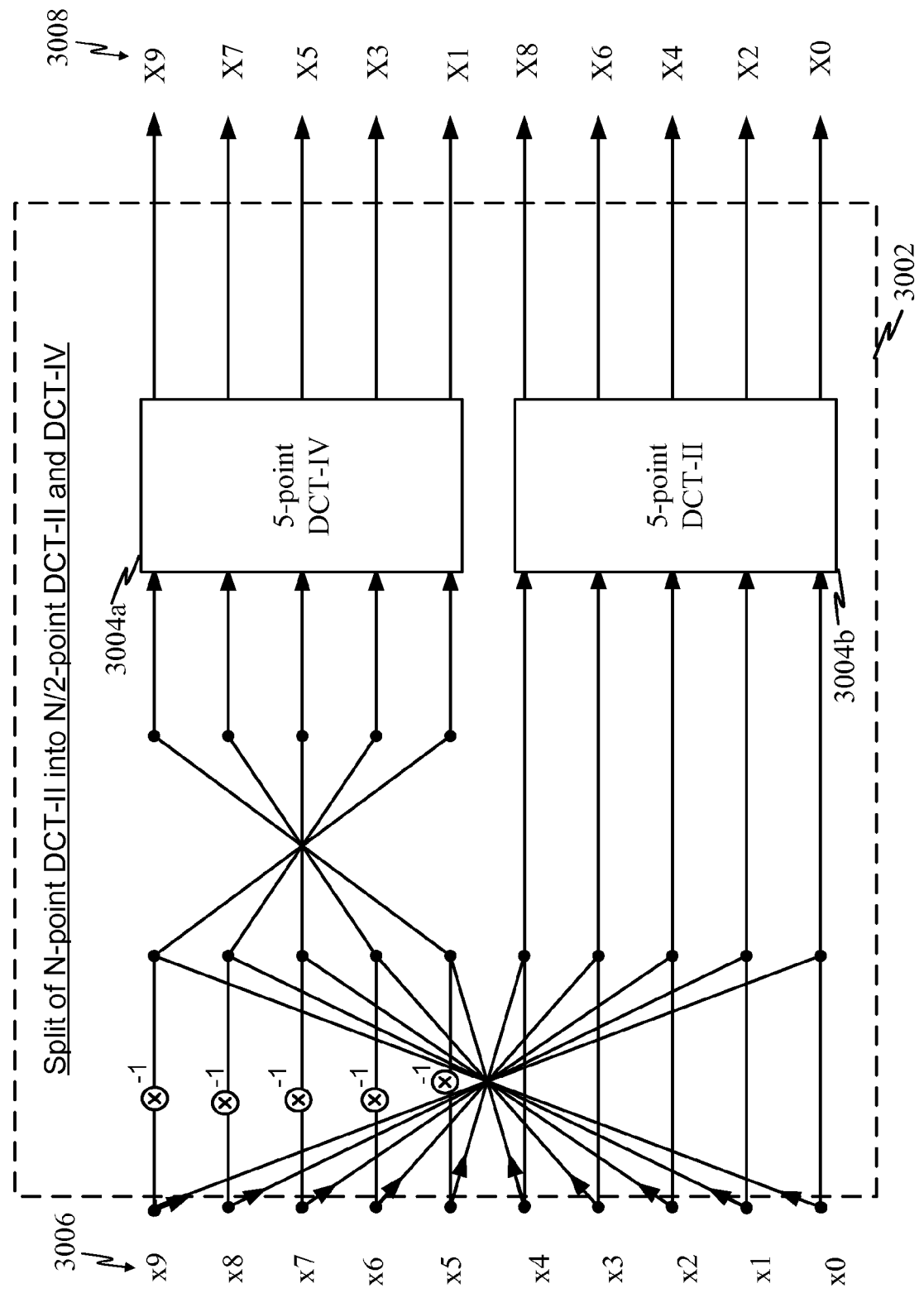
FIG. 30 is a block diagram illustrating an example of transform decimation and splitting in which a 10-point DCT-IV inverse transform is recursively split into a plurality of smaller 5-point DCT-II transform and a 5-point DCT-IV.

FIG. 30 is a block diagram illustrating an example of transform decimation and splitting in which a 10-point DCT-IV inverse transform is recursively split into a plurality of smaller 5-point DCT-II transform and a 5-point DCT-IV.

FIG. 30 is a block diagram illustrating an example of transform decimation and splitting in which a 10-point DCT-IV inverse transform is recursively split into a plurality of smaller 5-point DCT-II transform and a 5-point DCT-IV.

Figure 31:
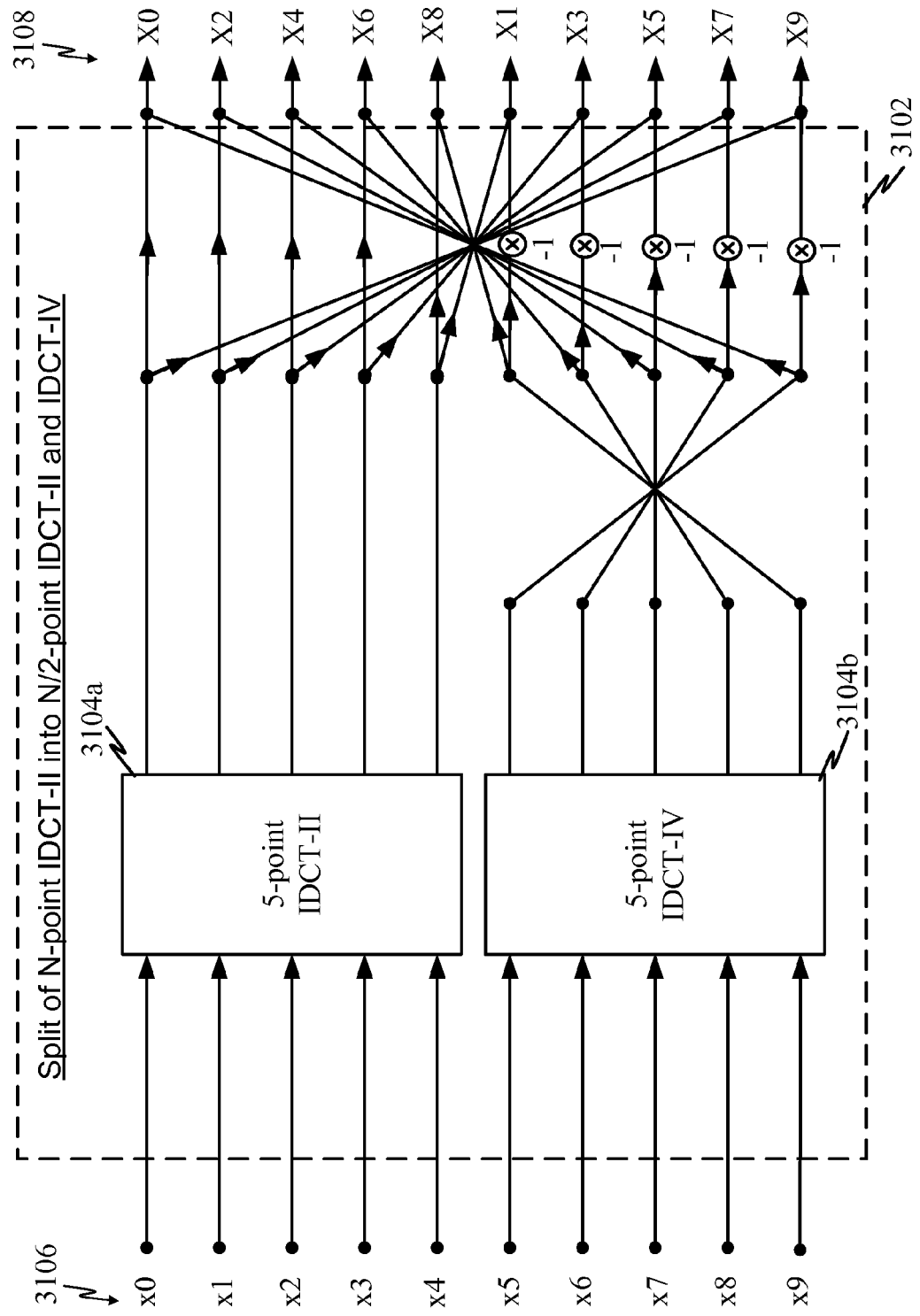
FIG. 31 is a block diagram illustrating an example of an inverse transform for the forward transform of FIG. 30.

FIG. 31 is a block diagram illustrating an example of an inverse transform for the forward transform of FIG. 30.

MDCT Filterbank with Asymmetric Windowing Stage

According to another feature, an asymmetric windowing stage may be implemented as part of an MDCT Filterbank. In some applications, the MDCT Filterbank may be implemented in a scalable speech codec having multiple layers, where some such layers may use the MDCT to transform an error signal from a previous layer. The MDCT of a weighted error signal werr_sp(k) with a 40 millisecond windowing stage is given by:

$$\text{werr\_sp}(k) = \sqrt{\frac{2}{M}} \sum_{n=0}^{2M-M_z-1} w_a(n) \text{werr}(n) \cos\left(\frac{\pi}{M}\left(n + \frac{M+1}{2}\right)\left(k + \frac{1}{2}\right)\right)$$

Figure 23:
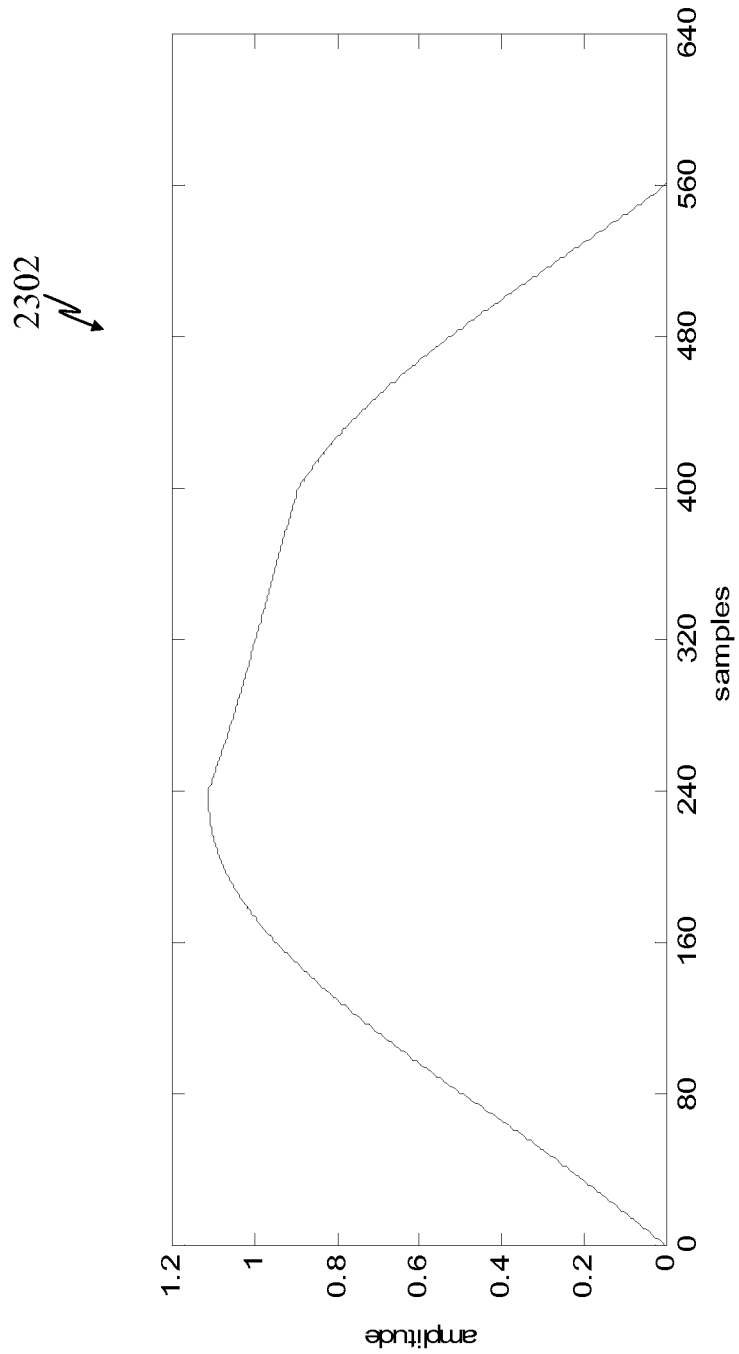
FIG. 23 illustrates an asymmetric window shape which may be used to reduce the delay associated to the transform stage to 10 ms while keeping the same number of frequency coefficients.

FIG. 23 illustrates an asymmetric window shape which may be used to reduce the delay associated to the transform stage to 10 ms while keeping the same number of frequency coefficients. The delay reduction becomes possible due to the fact that the first 80 factors in such asymmetric window function are turned into 0's. Therefore those samples need not be accessed.

As opposed to traditional MDCT windows, this window 2302 is not symmetric; as such the second half of the window is different from the time reversed version of the first half. The analysis asymmetric window shape is given by the following equation:

$$w_a(n) = \frac{w_i(n)}{\sqrt{D(n)}}, \quad 0 \le n < 2M \qquad (6.10\text{-}2)$$

where $$w_i(n) = \begin{cases} \sin\left[\left(n + \frac{1}{2}\right)\frac{\pi}{(2M - M_z)}\right], & 0 \le n < 2M - M_z \\ 0, & 2M - M_z \le n < 2M \end{cases}$$

and D(n) is defined by $$\begin{cases} D(n) = w_i(n)w_i(2M - 1 - n) + w_i(n + M)w_i(M - 1 - n) \\ D(n + M) = D(n) \end{cases}, \qquad (6.10\text{-}4)$$

$$0 \le n < M$$

where M=320 denotes the number of MDCT frequency components, and $M_z$=M/4 is the amount of trailing zeros.

Matrix Explanation of the MDCT to DCT-IV Mapping

The computation of the MDCT coefficients werr_sp(k) is done by applying window and normalization factors $$\sqrt{\frac{2}{M}} w_a(n)$$

on input signal werr(n) first, and then computing product by an M×2M matrix T:

$$T(i, j) = \cos\left(\frac{\pi}{M}\left(j + \frac{M+1}{2}\right)\left(i + \frac{1}{2}\right)\right), \quad \begin{array}{l} i = 0, \ldots, M-1, \\ j = 0, \ldots, 2M-1, \end{array}$$

by using its decomposition in $$T = C_M^{IV} S P^T$$

where $$C_M^{IV}(i, j) = \cos\left(\frac{\pi}{M}\left(i + \frac{1}{2}\right)\left(j + \frac{1}{2}\right)\right), \quad i, j = 0, \ldots, M-1,$$

is the M×M matrix of DCT-IV transform, $$S = \begin{bmatrix} -I_{N/2} & 0 \\ 0 & I_{N/2} \end{bmatrix}, \quad P = \begin{bmatrix} 0 & I_{N/2} \\ 0 & -J_{N/2} \\ J_{N/2} & 0 \\ I_{N/2} & 0 \end{bmatrix},$$

and where $I_{N/2}$ and $J_{N/2}$ denote N/2×N/2 identity and order reversal matrices correspondingly.

Computation of DCT-IV

The computation of DCT-IV of sizes M=5*$2^k$ (k=1, ..., 6) is done by splitting it into DCT-II transforms of twice-smaller sizes:

$$C_M^{IV} = P_M^T \begin{pmatrix} 1 & & & 0 \\ & I_{M/2-1} & I_{M/2-1} & \\ & I_{M/2-1} & -I_{M/2-1} & \\ 0 & & & -1 \end{pmatrix}$$

$$\begin{pmatrix} I_{M/2} & 0 \\ 0 & D_{M/2} J_{M/2} \end{pmatrix} \begin{pmatrix} C_{M/2}^{II} & 0 \\ 0 & C_{M/2}^{II} \end{pmatrix} \begin{pmatrix} I_{M/2} & 0 \\ 0 & D_{M/2} \end{pmatrix} R_M$$

where:
$P_M$ is a permutation matrix producing reordering $$x'_i = x_{2i}, \quad x'_{M-1-i} = -x_{2i+1}, \quad i = 0, 1, \ldots, \frac{M}{2} - 1,$$

$D_M$ is the diagonal sign-alteration matrix $$D_{M/2} = diag\{(-1)^k\}, \quad k = 0, 1, \ldots \frac{M}{2} - 1,$$

$R_M$ is the Givens rotation matrix:

$$R_M = \begin{pmatrix} \cos\frac{\pi}{4M} & & & & & & \sin\frac{\pi}{4M} \\ & \cos\frac{3\pi}{4M} & & & & \sin\frac{3\pi}{4M} & \\ & & \ddots & & \iddots & & \\ & & & \cos\frac{(M-1)\pi}{4M} & \sin\frac{(M-1)\pi}{4M} & & \\ & & & -\sin\frac{(M-1)\pi}{4M} & \cos\frac{(M-1)\pi}{4M} & & \\ & & \iddots & & \ddots & & \\ & -\sin\frac{3\pi}{4M} & & & & \cos\frac{3\pi}{4M} & \\ -\sin\frac{\pi}{4M} & & & & & & \cos\frac{\pi}{4M} \end{pmatrix},$$

and $C_M^{II}$ denotes matrices of the remaining DCT-II transforms:

$$C_M^{II}(i, j) = \cos\left(\frac{\pi}{M}\left(i + \frac{1}{2}\right)j\right), \quad i, j = 0, \ldots, M-1,.$$

An example implementation of such a process of splitting a DCT-IV transform of size M=10 into DCT-II transforms of twice-smaller (M=5) is illustrated in FIG. 20.

The computation of DCT-II transforms of sizes M=5*$2^k$ (k=1, . . . , 5) may also done by splitting it into smaller transforms:

$$C_M^{II} = P_M^T \begin{pmatrix} C_{M/2}^{II} & 0 \\ 0 & C_{M/2}^{IV} \end{pmatrix} \begin{pmatrix} I_{M/2} & J_{M/2} \\ I_{M/2} & -J_{M/2} \end{pmatrix}.$$

An example implementation of such a process of splitting a DCT-II transform of size M=10 into smaller transforms (M=5) is illustrated in FIG. 30.

The above process may be repeated recursively until only 5-point transforms remain. The remaining 5-point transforms may be efficiently implemented by The computation of a 5-point DCT-IV is done via DCT-II as follows:

$$C_5^{IV} = \begin{pmatrix} \frac{1}{2} & & & & \\ -\frac{1}{2} & 1 & & & \\ -\frac{1}{2} & -1 & 1 & & \\ -\frac{1}{2} & 1 & -1 & 1 & \\ -\frac{1}{2} & -1 & 1 & -1 & 1 \end{pmatrix}$$

-continued $$C_5^{II} \begin{pmatrix} 2\cos\frac{\pi}{20} & & & & 0 \\ & 2\cos\frac{3\pi}{20} & & & \\ & & 2\cos\frac{5\pi}{20} & & \\ & & & 2\cos\frac{7\pi}{20} & \\ 0 & & & & 2\cos\frac{9\pi}{20} \end{pmatrix}.$$

Finally, the computation of the 5-point DCT-II for an input vector $x = [x0, x1, x2, x3, x4]^T$ $$y = C_5^{II} x$$

is done as follows:
The DCT-II transform 802 may include intermediate results such that:

$a0 = x0 + x4;$ $a4 = x4 - x0;$ $a3 = x3 - x1;$ $a1 = x3 + x1;$ $b0 = a0 + a1;$ $b1 = \delta(a0 - a1);$ $b2 = x2 - \alpha b0;$ $y0 = b0 + x2;$ $y_1 = \gamma a_3 - \beta a_4;$ $y_2 = b_1 - b_2;$ $y_3 = \beta a_3 + \gamma a_4;$ where $$\alpha = \frac{1}{4}; \beta = \cos\frac{3\pi}{10}; \gamma = \cos\frac{\pi}{10}; \delta = \cos\frac{\pi}{5} - \frac{1}{4}.$$

An example of the flow-graph for this transform is illustrated in FIG. 8.

Example of Encoding Using MDCT Transform

Figure 24:
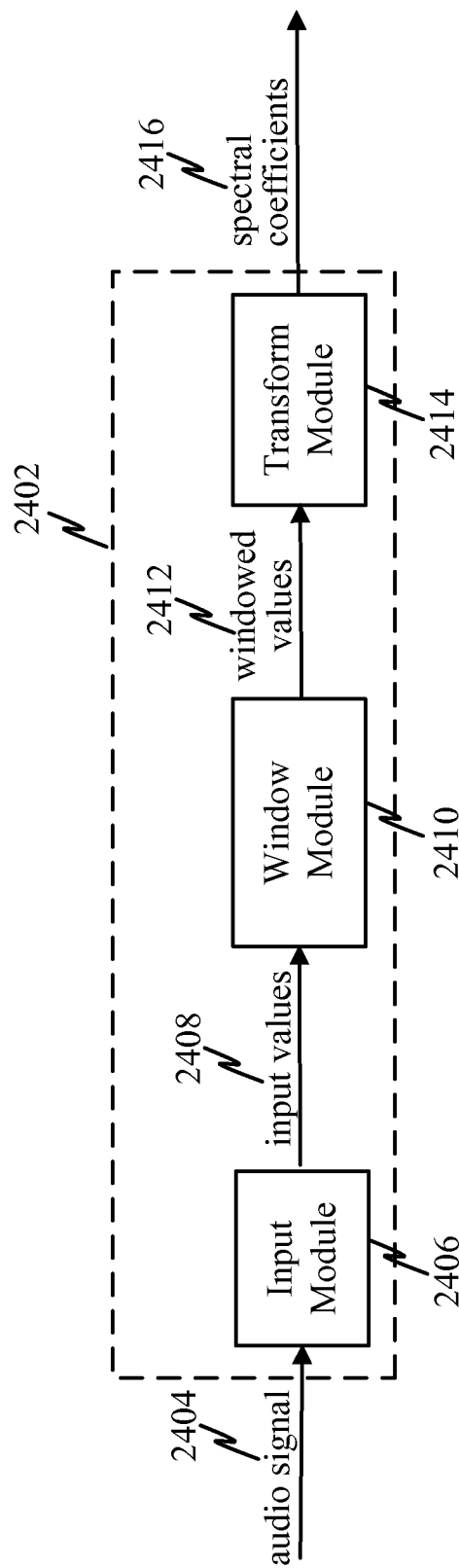
FIG. 24 is a block diagram illustrating a device for computing transform values.

FIG. 24 is a block diagram illustrating a device for computing transform values. The device 2402 may include an input module 2406, a window module 2410, and/or a transform module 2414. The input module 2406 may be adapted to receive an audio signal 2404 and provide time-domain input values 2408 representing the audio signal. The window module 2410 may produce an asymmetric windowing function as illustrated in FIG. 23.

The transform module 2414 may transform the windowed input values 2412 into spectral coefficients 2416 using, for example, a Modified Discrete Cosine Transform (MDCT). The MDCT may be recursively split into at least one of a Discrete Cosine Transform type IV (DCT-IV), a Discrete Cosine Transform type II (DCT-II), or both the DCT-IV and DCT-II, where each such transform is of smaller dimension than the MDCT. In one example, the DCT-II may be a 5-point transform that implements MDCTs of different sizes. The MDCT may implement at least two of 320, 160, 80, 40-point transforms using the same core DCT-II. The components of the device 2402 may be implemented as hardware, software, and/or a combination of the thereof. For example, the device 2402 may be a processor and/or circuit that implements the functions of its components or modules.

Figure 25:
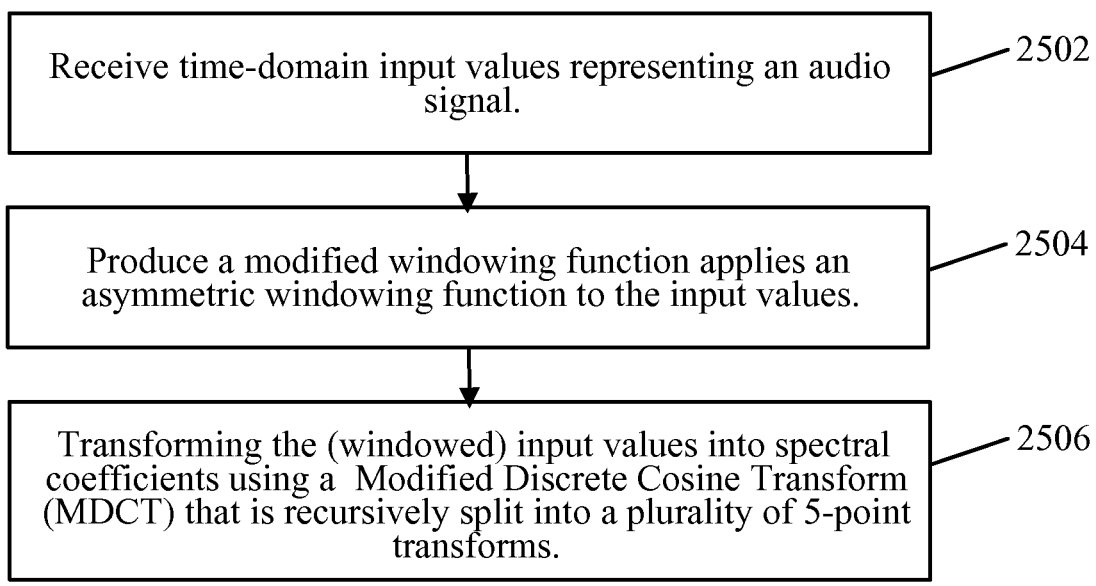
FIG. 25 illustrates an example of a method for encoding a signal using a MDCT transform based on a 5-point core transform.

FIG. 25 illustrates an example of a method for encoding a signal using a MDCT transform based on a 5-point core transform. Time-domain input values representing an audio signal may be received 2502. For instance, an analog audio signal (e.g., voice signal, music, video, etc.) may be sampled to obtain the input values. In one example, a modified windowing function may be produced that applies an asymmetric window function to the input values 2504. The (windowed) input values may then be transformed into spectral coefficients using a Modified Discrete Cosine Transform (MDCT) that is recursively split into a plurality of 5-point transforms. For example, any of the 5-point transforms illustrated in FIGS. 5-22 may be used.

Example of Decoding Using IMDCT Transform

Figure 26:
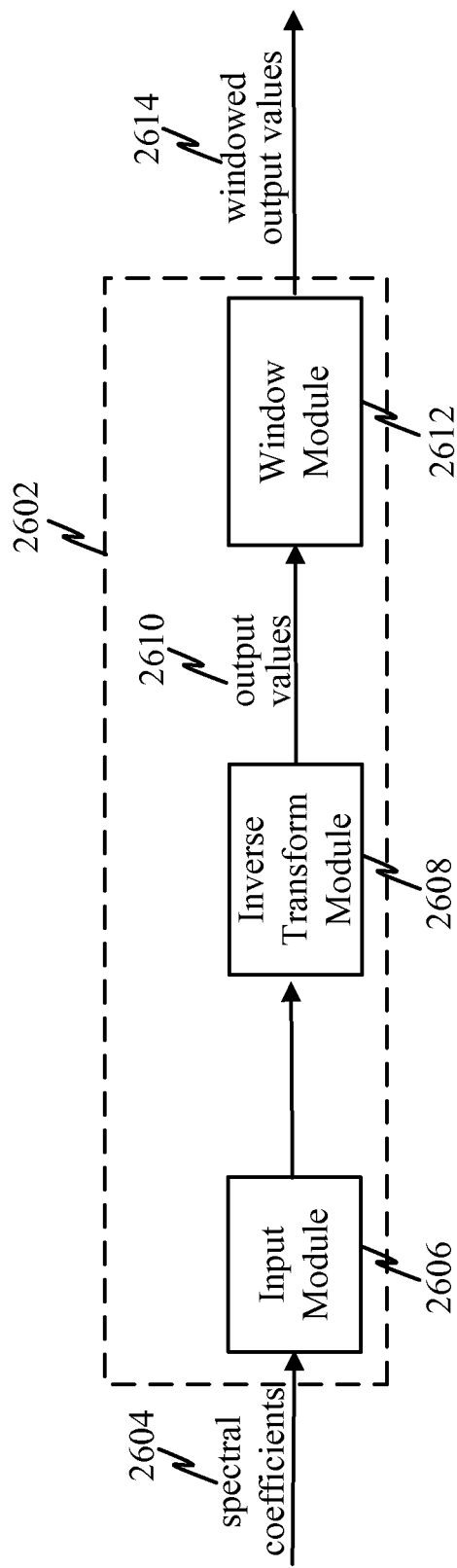
FIG. 26 is a block diagram illustrating a device for computing transform values.

FIG. 26 is a block diagram illustrating a device for computing transform values. The device 2602 may include an input module 2606, an inverse transform module 2608, and/or a window module 2612. The inverse transform module 2608 may be adapted to transform the spectral coefficients 2604 into output values 2610. For example, the inverse transform module may transforming the spectral coefficients into time-domain output values 2610 using an Inverse Modified Discrete Cosine Transform (IMDCT) that is recursively split into at least one of an Inverse Discrete Cosine Transform type IV (IDCT-IV), an Inverse Discrete Cosine Transform type II (IDCT-II), or both the IDCT-IV and IDCT-II, where each such inverse transform is of smaller dimension than the IMDCT.

The window module 2612 may produce a modified windowing function that implements an asymmetric window function on the outputs values 2610 to produce the windowed output values 2614. The components of the device 2602 may be implemented as hardware, software, and/or a combination of the thereof. For example, the device 2602 may be a processor and/or circuit that implements the functions of its components or modules.

Figure 27:
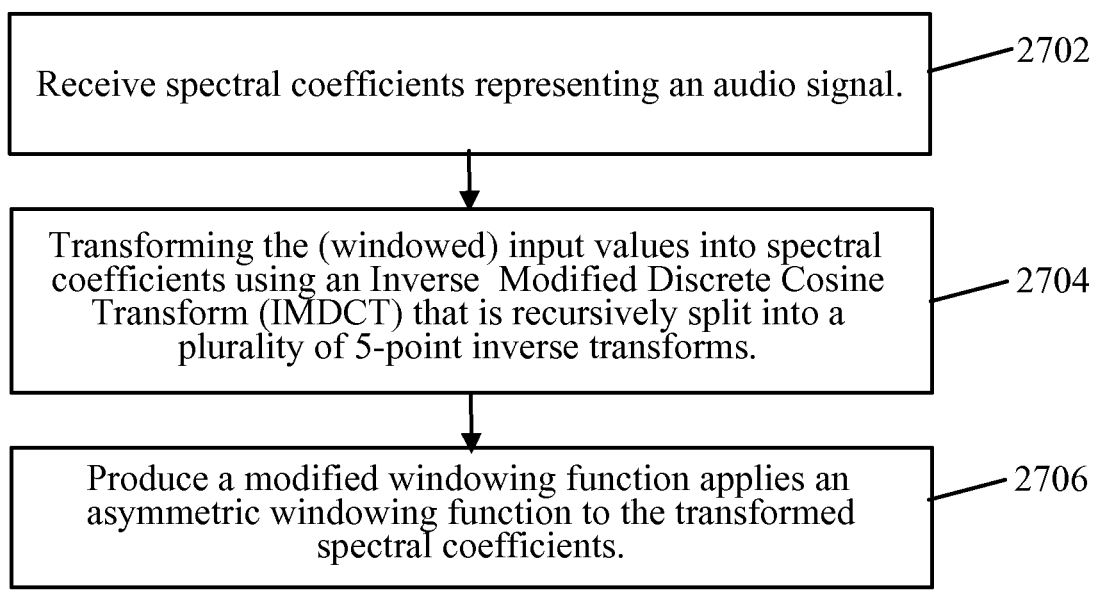
FIG. 27 illustrates an example of a method for decoding a signal using an IMDCT transform based on a core IDCT-II transform.

FIG. 27 illustrates an example of a method for decoding a signal using an IMDCT transform based on a core IDCT-II transform. Spectral coefficients representing an audio signal are received or obtained 2702. The spectral coefficients may be transformed into time-domain output values using an Inverse Modified Discrete Cosine Transform (IMDCT) that is recursively split into a plurality of 5-point inverse transforms 2704. The each of plurality of 5-point inverse transforms may be implemented using the same core transform. The IMDCT implements at least two of 320, 160, 80, 40-point inverse transforms using the same core transform. In various implementations, the core transform may be any one of the 5-point transforms in FIGS. 5-22. Additionally, a modified windowing function may be produced that applies an asymmetric windowing function to the transformed spectral coefficients 2706.

In addition to the examples provided herein, the algorithms described herein that implement decimated transforms may be used to implement any other transform that is a multiple of two. Additionally, it should be noted that the techniques described herein may be applied to various types of signals, including audio, voice, video, data, etc.

It should be understood that the intermediate results for the transforms illustrated in herein may change if a different point in the flow diagram of the transform is selected. Consequently, greater or fewer intermediate results and/or different intermediate results (e.g., at different points in the flow diagram) are contemplated and within the scope of the transform flow diagrams described and claimed herein.

Information and signals may be represented using any of a variety of different technologies and techniques. For example, data, instructions, commands, information, signals and the like that may be referenced throughout the above description may be represented by voltages, currents, electromagnetic waves, magnetic fields or particles, optical fields or particles or any combination thereof.

The various illustrative logical blocks, modules and circuits and algorithm steps described herein may be implemented or performed as electronic hardware, software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. It is noted that the configurations may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be rearranged. A process is terminated when its operations are completed. A process may correspond to a method, a function, a procedure, a subroutine, a subprogram, etc. When a process corresponds to a function, its termination corresponds to a return of the function to the calling function or the main function.

When implemented in hardware, various examples may employ a general purpose processor, a digital signal processor (DSP), an application specific integrated circuit (ASIC), a field programmable gate array signal (FPGA) or other programmable logic device, discrete gate or transistor logic, discrete hardware components or any combination thereof designed to perform the functions described herein. A general purpose processor may be a microprocessor, but in the alternative, the processor may be any conventional processor, controller, microcontroller or state machine. A processor may also be implemented as a combination of computing devices, e.g., a combination of a DSP and a microprocessor, a plurality of microprocessors, one or more microprocessors in conjunction with a DSP core or any other such configuration.

When implemented in software, various examples may employ firmware, middleware or microcode. The program code or code segments to perform the necessary tasks may be stored in a computer-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

As used in this application, the terms "component," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

In one or more examples herein, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. Software may comprise a single instruction, or many instructions, and may be distributed over several different code segments, among different programs and across multiple storage media. An exemplary storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is required for proper operation of the embodiment that is being described, the order and/or use of specific steps and/or actions may be modified without departing from the scope of the claims.

One or more of the components, steps, and/or functions illustrated in the Figures may be rearranged and/or combined into a single component, step, or function or embodied in several components, steps, or functions. Additional elements, components, steps, and/or functions may also be added. The apparatus, devices, and/or components illustrated in some Figures may be configured or adapted to perform one or more of the methods, features, or steps described in other Figures. The algorithms described herein may be efficiently implemented in software and/or embedded hardware for example.

It should be noted that the foregoing configurations are merely examples and are not to be construed as limiting the claims. The description of the configurations is intended to be illustrative, and not to limit the scope of the claims. As such, the present teachings can be readily applied to other types of apparatuses and many alternatives, modifications, and variations will be apparent to those skilled in the art.

What is claimed is:

1. A method of computing transform values within a scalable speech and audio encoder device, comprising:
receiving, at an input circuit, time-domain input values representing an audio signal; and
transforming, within a transform circuit, the input values into spectral coefficients using a Modified Discrete Cosine Transform (MDCT) that is recursively decimated into a plurality of smaller size 5-point transforms, wherein the plurality of 5-point transforms includes at least one of either:
a Discrete Cosine Transform type II (DCT-II) having a longest path length of four operations or less and the DCT-II having a maximum of eight multiplication operations or less, or
a Discrete Cosine Transform type IV (DCT-IV) having a longest path length of five operations or less and the DCT-IV having a maximum of sixteen multiplication operations or less.

2. The method of claim 1, wherein at least one of the plurality of 5-point transforms includes at least one Discrete Cosine Transform type II (DCT-II) (502), the method further comprising: factorizing the at least one DCT-II into twelve (12) addition operations, eight (8) multiplication operations, and a longest path length of three (3) operations.

3. The method of claim 1, wherein at least one of the plurality of 5-point transforms includes at least one Discrete Cosine Transform type II (DCT-II) (502) that takes an input vector [x0, x1, x2, x3, x4] to produce an output vector [X0, X1, X2, X3, X4] and is characterized by at least a plurality of the intermediate results intermediate results of:

$w0=x0-x4$;

$w4=x0+x4$;

$w1=x1-x3$;

$w3=x1+x3$;

$u2=x2+w3+w4$;

$u3=-d*w3+c*w4$;

$u4=d*w4+c*w3$;

such that $X0=u2$;

$X1=b*w1+a*w0$;

$X2=u3-x0$;

$X3=a*w1-b*w0$;

$X4=u4+x0$;

where $a = \sqrt{2}\cos\left(\frac{\pi}{10}\right)$;

$b = \cos\left(\frac{3\pi}{10}\right)$;

$c = -\cos\left(\frac{\pi}{5}\right)$;

and $d = \cos\left(\frac{2\pi}{5}\right)$.

4. The method of claim 1, wherein at least one of the plurality of 5-point transforms includes at least one Discrete Cosine Transform type II (DCT-II) (602), the method further comprising: factorizing the at least one DCT-II into twelve (12) addition operations, five (5) multiplication operations, two (2) shift operations, and a longest path length of four (4) operations.

5. The method of claim 1, wherein at least one of the plurality of 5-point transforms includes at least one Discrete Cosine Transform type II (DCT-II) (602) that takes an input vector [x0, x1, x2, x3, x4] to produce an output vector [X0, X1, X2, X3, X4] and is characterized by at least a plurality of the intermediate results of:

$w0=x0-x4$;

$w1=x1-x3$;

$z2=x1+x3$;

$z4=x0+x4$;

$u2=z2+z4$;

such that $X0=u2+x2$;

$X1=b*w1+a*w0$;

$X2=c*u2+0.5*z2-x2$;

$X3=a*w1-b*w0$;

$X4==-c*u2-0.5*z4+x2$;

where $a = \sqrt{2}\cos\left(\frac{\pi}{10}\right)$;

$b = \cos\left(\frac{3\pi}{10}\right)$;

$c = -\cos\left(\frac{\pi}{5}\right)$;

and $d = \cos\left(\frac{2\pi}{5}\right)$.

6. The method of claim 1, wherein at least one of the plurality of 5-point transforms includes at least one Discrete Cosine Transform type II (DCT-II) (702), the method further comprising: factorizing the at least one DCT-II into twelve (12) addition operations, five (5) multiplication operations, one (1) shift operation, and a longest path length of four (4) operations.

7. The method of claim 1, wherein at least one of the plurality of 5-point transforms includes at least one Discrete Cosine Transform type II (DCT-II) (702) that takes an input vector [x0, x1, x2, x3, x4] to produce an output vector [X0, X1, X2, X3, X4] and is characterized by having intermediate results of:

$w0=x0-x4$;

$w1=x1-x3$;

$z2=x1+x3$;

$z4=x0+x4$;

$t2=z2+z4$;

$t4=z2-z4$;

$c'=c+0.25$;

such that $X0=t2+x2$;

$X1=b*w1+a*w0$;

$X2=c'*t2-0.25*t4-x2=0.25*t4+c'*t2-x2)$;

$X3=a*w1-b*w0$;

$X4=-c'*t2-0.25*t4+x2=0.25*t4-(c'*t2-x2)$;

where $a = \sqrt{2}\cos\left(\frac{\pi}{10}\right)$;

$b = \cos\left(\frac{3\pi}{10}\right)$;

$c = -\cos\left(\frac{\pi}{5}\right)$;

and $d = \cos\left(\frac{2\pi}{5}\right)$.

8. The method of claim 1, wherein at least one of the plurality of 5-point transforms includes at least one Discrete Cosine Transform type II (DCT-II) (802), the method further comprising: factorizing the at least one DCT-II into twelve (12) addition operations, four (4) multiplication operations, two (2) shift operations, and a longest path length of four (4) operations.

9. The method of claim 1, at least one of the plurality of 5-point transforms includes at least one Discrete Cosine Transform type II (DCT-II) (802) that takes an input vector [x0, x1, x2, x3, x4] to produce an output vector [X0, X1, X2, X3, X4] and is characterized by at least a plurality of the intermediate results:

$w1=x0+x4;$ $w2=x4-x0;$ $w3=x3-x1;$ $w4=x3+x1;$ $w5=w1+w4;$ $w6=w4-w1;$ $u1=x2-\alpha w5;$ $u2=x2+w5;$ $u3=\beta w2+\gamma w3;$ $u4=\beta w3-\gamma w2;$ $u5=\delta w6;$ such that $X0=u2;$ $X1=u4;$ $X2=u4-u1;$ $X3=u3;$ $X4=u1+u5;$ where $\alpha = \frac{1}{4}$;

$\beta = \cos\left(\frac{3\pi}{10}\right);$ $\gamma = -\cos\left(\frac{\pi}{10}\right);$ and $\delta = -\frac{\sqrt{5}}{4}.$ 10. The method of claim 1, wherein at least one of the plurality of 5-point transforms includes at least one transform (802), the method further comprising: factorizing the at least one transform (802) into twelve (12) addition operations, five (5) multiplication operations, one (1) shift operation, and a longest path length of four (4) operations.

11. The method of claim 1, wherein at least one of the plurality of 5-point transforms includes a Discrete Cosine Transform type IV (DCT-IV) (902), the method further comprising: factorizing the DCT-IV into twenty (20) addition operations, sixteen (16) multiplication operations, and a longest path length of three (3) operations.

12. The method of claim 1, wherein at least one of the plurality of 5-point transforms includes at least one Discrete Cosine Transform type IV (DCT-IV) (902) that takes an input vector [x0, x1, x2, x3, x4] to produce an output vector [X0, X1, X2, X3, X4] and is characterized by at least a plurality of the intermediate results:

$k1=g*x1+h*x3;$ $k2=h*x1+g*x3;$ $k3=f*x0+i*x4;$ $k4=i*x0+f*x4;$ $k5=i*x1-f*x3;$ $k6=-f*x1+i*x3;$ $k7=g*x0-h*x4;$ $k8=h*x0-g*x4;$ $j1=x0+x4;$ $j2=x3-x1;$ such that $X0=k3+k1+x2;$ $X1=k7+k5-x2;$ $X2=j1+j2-x2;$ $X3=h*x0-g*x4-f*x1+i*x3+x2;$ $X4=k4-k2+x2.$ where $f = \sqrt{2}\cos\left(\frac{\pi}{20}\right);$ $g = \sqrt{2}\cos\left(\frac{3\pi}{20}\right);$ $h = \sqrt{2}\cos\left(\frac{7\pi}{20}\right);$ and $i = \sqrt{2}\cos\left(\frac{9\pi}{20}\right).$ 13. The method of claim 1, wherein at least one of the plurality of 5-point transforms includes a Discrete Cosine Transform type IV (DCT-IV) (1002), the method further comprising: factorizing the DCT-IV into twenty (20) addition operations, twelve (12) multiplication operations, and a longest path length of four (4) operations.

14. The method of claim 1, wherein at least one of the plurality of 5-point transforms includes at least one Discrete Cosine Transform type IV (DCT-IV) (1002) that takes an input vector [x0, x1, x2, x3, x4] to produce an output vector [X0, X1, X2, X3, X4] and is characterized by at least a plurality of the intermediate results:

$q1=x0+x4;$ $q2=x3-x1;$ $p1=(x1-x3)*g-x1*(g+h)=q2*g-x1*(g+h);$ $p2=(x1-x3)*g+x3*(h+g)=q2*g+x3*(g+h);$ $p3=(x0+x4)*f+x0*(i-f)=q1*f+x0*(i-f);$ $p4=(x0+x4)*f+x4*(i-f)=q1*f+x4*(i-f);$ $p5=(x3-x1)*f+x3*(i-f)=q2*f+x3*(i-f);$ $p6=(x3-x1)*f-x1*(i-f)=q2*f-x1*(i-f);$ $p7=(x0+x4)*g+x0*(h+g)=q1*g+x0*(h+g);$ $p8=(x0+x4)*g+x4*(h+g)=q1*g+x4*(h+g);$ such that:

$X0=p2+p4+x2;$ $X1=p5+p7-x2;$ $X2=q1+q2-x2;$ $X3=p6+p8+x2;$ $X4=p1+p3+x2;$ where $f = \sqrt{2}\cos\left(\frac{\pi}{20}\right);$ $g = \sqrt{2}\cos\left(\frac{3\pi}{20}\right);$ $h = \sqrt{2}\cos\left(\frac{7\pi}{20}\right);$ and $i = \sqrt{2}\cos\left(\frac{9\pi}{20}\right).$

15. The method of claim 1, wherein at least one of the plurality of 5-point transforms includes a Discrete Cosine Transform type IV (DCT-IV) (1402), the method further comprising: factorizing the DCT-IV into sixteen (16) addition operations, nine (9) multiplication operations, and a longest path length of five (5) operations.

16. The method of claim 1, wherein at least one of the plurality of 5-point transforms includes at least one Discrete Cosine Transform type IV (DCT-IV) (1402) that takes an input vector [x0, x1, x2, x3, x4] to produce an output vector [X0, X1, X2, X3, X4] and is characterized by at least a plurality of the intermediate results:

$w0=f*x0-i*x4;$ $w1=g*x1-h*x3;$ $z2=g*x1+h*x3;$ $z4=f*x0+i*x4;$ $v1=2b*w1+2a*w0;$ $v2=z2+z4;$ $v3=2b*w0-2a*w1;$ $y2=2c*v2+z2-2*x2;$ $y4=-2c*v2-z4+2*x2;$ such that:

$X0=v2+x2;$ $X1=v1-2*X0;$ $X2=y2-X1;$ $X3=v3-X2;$ $X4=y4-X3;$ where $a = \sqrt{2}\cos\left(\frac{\pi}{10}\right);$ $b = \cos\left(\frac{3\pi}{10}\right);$ $c = -\cos\left(\frac{\pi}{5}\right);$ and $d = \cos\left(\frac{2\pi}{5}\right);$ $f = \sqrt{2}\cos\left(\frac{\pi}{20}\right);$ $g = \sqrt{2}\cos\left(\frac{3\pi}{20}\right);$ $h = \sqrt{2}\cos\left(\frac{7\pi}{20}\right);$ and $i = \sqrt{2}\cos\left(\frac{9\pi}{20}\right).$

17. The method of claim 1, wherein at least one of the plurality of 5-point transforms includes a Discrete Cosine Transform type IV (DCT-IV) (1502), the method further comprising: factorizing the DCT-IV into fifteen (15) addition operations, ten (10) multiplication operations, two shift (2) operations, and a longest path length of five (5) operations.

18. The method of claim 1, wherein at least one of the plurality of 5-point transforms includes at least one Discrete Cosine Transform type IV (DCT-IV) (1502) that takes an input vector [x0, x1, x2, x3, x4] to produce an output vector [X0, X1, X2, X3, X4] and is characterized by at least a plurality of the intermediate results of:

$w0=f*x0-i*x4;$ $w1=g*x1-h*x3;$ $z2=g*x1+h*x3;$ $z4=f*x0+i*x4;$ $v1=2b*w1+2a*w0;$ $v2=z2+z4;$ $v3=2b*w0-2a*w1;$ $y2=(2c+2)*v2+z2;$ $y4=2c*v2+z4;$ such that $X0=v2+x2;$ $X1=v1-2*X0;$ $X2=y2-v1;$ $X3=v3-X2;$ $X4=-y4+2*x2-X3;$ where $a = \sqrt{2}\cos\left(\frac{\pi}{10}\right)$;

$b = \cos\left(\frac{3\pi}{10}\right)$;

$c = -\cos\left(\frac{\pi}{5}\right)$;

and $d = \cos\left(\frac{2\pi}{5}\right)$;

$f = \sqrt{2}\cos\left(\frac{\pi}{20}\right)$;

$g = \sqrt{2}\cos\left(\frac{3\pi}{20}\right)$;

$h = \sqrt{2}\cos\left(\frac{7\pi}{20}\right)$;

and $i = \sqrt{2}\cos\left(\frac{9\pi}{20}\right)$.

19. The method of claim 1, wherein at least one of the plurality of 5-point transforms includes a Discrete Cosine Transform type IV (DCT-IV) (1602/1702), the method further comprising: factorizing the DCT-IV into fifteen (15) addition operations, eleven (11) multiplication operations, two shift (2) operations, and a longest path length of five (5) operations.

20. The method of claim 1, wherein at least one of the plurality of 5-point transforms includes at least one Discrete Cosine Transform type IV (DCT-IV) (1602) that takes an input vector [x0, x1, x2, x3, x4] to produce an output vector [X0, X1, X2, X3, X4] and is characterized by at least a plurality of the intermediate results of:

$w0 = f*x0 - i*x4$;

$w1 = g*x1 - h*x3$;

$z2 = g*x1 + h*x3$;

$z4 = f*x0 + i*x4$;

$v1 = 2b*w1 + 2a*w0$;

$v2 = z2 + z4$;

$v3 = 2b*w0 - 2a*w1$;

$d2 = (2c+2)*z2 + (2c+2)*z4$;

$d4 = (2c+2)*z4 + 2c*z2$;

such that:

$X0 = z2 + z4 + x2$;

$X1 = v1 - 2*X0$;

$X2 = d2 - v1$;

$X3 = v3 - X2$;

$X4 = -d4 + 2*x2 - X3$;

where $a = \sqrt{2}\cos\left(\frac{\pi}{10}\right)$;

$b = \cos\left(\frac{3\pi}{10}\right)$;

$c = -\cos\left(\frac{\pi}{5}\right)$;

and $d = \cos\left(\frac{2\pi}{5}\right)$;

$f = \sqrt{2}\cos\left(\frac{\pi}{20}\right)$;

$g = \sqrt{2}\cos\left(\frac{3\pi}{20}\right)$;

$h = \sqrt{2}\cos\left(\frac{7\pi}{20}\right)$;

and $i = \sqrt{2}\cos\left(\frac{9\pi}{20}\right)$.

21. The method of claim 1, wherein at least one of the plurality of 5-point transforms includes at least one Discrete Cosine Transform type IV (DCT-IV) (1702) that takes an input vector [x0, x1, x2, x3, x4] to produce an output vector [X0, X1, X2, X3, X4] and is characterized by at least a plurality of the intermediate results of:

$w0 = f*x0 - i*x4$;

$w1 = g*x1 - h*x3$;

$z2 = g*x1 + h*x3$;

$z4 = f*x0 + i*x4$;

$z1 = 2a*w0 + 2b*w1$;

$z3 = (2b+2a)*w0 - (2a-2b)*w1$;

$d2 = 2(c+2)*z2 + (2c+2)*z4$;

$d4 = (2c+2)*z4 + 2c*z2$;

such that:

$X0 = z2 + z4 + x2$;

$X1 = z1 - 2*X0$;

$X2 = d2 - z1$;

$X3 = z3 - d2$;

$X4 = -d4 + 2*x2 - X3$;

where $a = \sqrt{2}\cos\left(\frac{\pi}{10}\right)$;

$b = \cos\left(\frac{3\pi}{10}\right)$;

$c = -\cos\left(\frac{\pi}{5}\right)$;

and $d = \cos\left(\frac{2\pi}{5}\right)$;

$f = \sqrt{2}\cos\left(\frac{\pi}{20}\right)$;

$g = \sqrt{2}\cos\left(\frac{3\pi}{20}\right)$;

$h = \sqrt{2}\cos\left(\frac{7\pi}{20}\right)$;

and $i = \sqrt{2}\cos\left(\frac{9\pi}{20}\right)$.

22. The method of claim 1, wherein at least one of the plurality of 5-point transforms includes a Discrete Cosine Transform type IV (DCT-IV) (1802), the method further comprising: factorizing the DCT-IV into fifteen (15) addition operations, twelve (12) multiplication operations, two (2) shift operations, and a longest path length of five (5) operations.

23. The method of claim 1, wherein at least one of the plurality of 5-point transforms includes at least one Discrete Cosine Transform type IV (DCT-IV) (1802) that takes an input vector [x0, x1, x2, x3, x4] to produce an output vector [X0, X1, X2, X3, X4] and is characterized by intermediate results of:

$$w0 = f*x0 - i*x4;$$

$$w1 = g*x1 - h*x3;$$

$$z2 = g*x1 + h*x3;$$

$$z4 = f*x0 + i*x4;$$

$$z1 = 2a*w0 + 2b*w1$$

$$z3 = (2b+2a)*w0 - (2a-2b)*w1;$$

$$r2 = (2c+2)*z2 + (2c+2)*z4;$$

$$T4 = 4(c+1)*z2 + 4(c+1)*z4.$$

such that $$X0 = z2 + z4 + x2;$$

$$X1 = z1 - 2*X0;$$

$$X2 = d2 - z1;$$

$$X3 = z3 - r2;$$

$$X4 = -r4 + 2*x2 - z3;$$

where $a = \sqrt{2}\cos\left(\frac{\pi}{10}\right)$;

$b = \cos\left(\frac{3\pi}{10}\right)$;

$c = -\cos\left(\frac{\pi}{5}\right)$;

and $d = \cos\left(\frac{2\pi}{5}\right)$;

$f = \sqrt{2}\cos\left(\frac{\pi}{20}\right)$;

$g = \sqrt{2}\cos\left(\frac{3\pi}{20}\right)$;

$h = \sqrt{2}\cos\left(\frac{7\pi}{20}\right)$;

and $i = \sqrt{2}\cos\left(\frac{9\pi}{20}\right)$.

24. The method of claim 1, further comprising:
performing a windowing operation on the input values prior to performing the transformation, wherein the windowing operation implements an asymmetric window function.

25. The method of claim 1, wherein the MDCT implements at least one of a 640, 320, 160, 80, 40-point transform using a 5-point Discrete Cosine Transform type II.

26. The method of claim 1, wherein the MDCT implements at least one of a 640, 320, 160, 80, 40-point transform using a 5-point Discrete Cosine Transform type IV.

27. The method of claim 1, wherein the MDCT implements at least one of a 640, 320, 160, 80, 40-point transform using a 5-point Discrete Cosine Transform type II and a 5-point Discrete Cosine Transform type IV.

28. The method of claim 1, wherein the MDCT implements at least one of a 640, 320, 160, 80, 40-point transform using a 5-point Discrete Sine Transform type IV.

29. A scalable speech and audio encoder device, comprising:
a Discrete Cosine Transform (DCT)-type transform layer circuit adapted to obtain, at an input circuit, time-domain input values representing an audio signal; and
transform, within a transform circuit, the input values into spectral coefficients using a Modified Discrete Cosine Transform (MDCT) that is recursively decimated into a plurality of smaller size 5-point transforms, wherein the plurality of 5-point transforms includes at least one of either:
a Discrete Cosine Transform type II (DCT-II) having a longest path length of four operations or less and the DCT-II having a maximum of eight multiplication operations or less, or
a Discrete Cosine Transform type IV (DCT-IV) having a longest path length of five operations or less and the DCT-IV having a maximum of sixteen multiplication operations or less.

30. The device of claim 29, wherein at least one of the plurality of 5-point transforms includes at least one Discrete Cosine Transform type II (DCT-II) (802) factorized by twelve (12) addition operations, four (4) multiplication operations, two (2) shift operations, and a longest path length of four (4) operations.

31. The device of claim 29, wherein at least one of the plurality of 5-point transforms includes at least one Discrete Cosine Transform type II (DCT-II) (802) that takes an input vector [x0, x1, x2, x3, x4] to produce an output vector [X0, X1, X2, X3, X4] and is characterized by at least a plurality of the intermediate results:

$$w1 = x0 + x4;$$

$$w2 = x4 - x0;$$

$$w3 = x3 - x1;$$

$$w4 = x3 + x1;$$

$$w5 = w1 + w4;$$

$$w6 = w4 - w1;$$

$$u1 = x2 - \alpha w5;$$

$$u2 = x2 + w5;$$

$$u3 = \beta w2 + \gamma w3;$$

$$u4 = \beta w3 - \gamma w2;$$

$$u5 = \delta w6;$$

such that $$X0 = u2;$$

$$X1 = u4;$$

$X2 = u4 - u1;$ $X3 = u3;$ $X4 = u1 + u5;$ where $\alpha = \frac{1}{4};$ $\beta = \cos\left(\frac{3\pi}{10}\right);$ $\gamma = -\cos\left(\frac{\pi}{10}\right);$ and $\delta = -\frac{\sqrt{5}}{4}.$

32. The device of claim 29, wherein at least one of the plurality of 5-point transforms includes at least one transform (802) factorized by twelve (12) addition operations, five (5) multiplication operations, one (1) shift operation, and a longest path length of four (4) operations.

33. A scalable speech and audio encoder device, comprising:
  means for obtaining time-domain input values representing an audio signal; and
  means for transforming the input values into spectral coefficients using a Modified Discrete Cosine Transform (MDCT) that is recursively decimated into a plurality of smaller size 5-point transforms, wherein the plurality of 5-point transforms includes at least one of either:
    a Discrete Cosine Transform type II (DCT-II) having a longest path length of four operations or less and the DCT-II having a maximum of eight multiplication operations or less, or
    a Discrete Cosine Transform type IV (DCT-IV) having a longest path length of five operations or less and the DCT-IV having a maximum of sixteen multiplication operations or less.

34. The device of claim 33, wherein at least one of the plurality of 5-point transforms includes at least one Discrete Cosine Transform type II (DCT-II) (802) that takes an input vector [x0, x1, x2, x3, x4] to produce an output vector [X0, X1, X2, X3, X4] and is characterized by at least a plurality of the intermediate results:

$w1 = x0 + x4;$ $w2 = x4 - x0;$ $w3 = x3 - x1;$ $w4 = x3 + x1;$ $w5 = w1 + w4;$ $w6 = w4 - w1;$ $u1 = x2 - \alpha w5;$ $u2 = x2 + w5;$ $u3 = \beta w2 + \gamma w3;$ $u4 = \beta w3 - \gamma w2;$ $u5 = \delta w6;$ such that $X0 = u2;$ $X1 = u4;$ $X2 = u4 - u1;$ $X3 = u3;$ $X4 = u1 + u5;$ where $\alpha = \frac{1}{4};$ $\beta = \cos\left(\frac{3\pi}{10}\right);$ $\gamma = -\cos\left(\frac{\pi}{10}\right);$ and $\delta = -\frac{\sqrt{5}}{4}.$

35. A processor including a scalable speech and audio encoding circuit adapted to:
  obtain, at an input circuit, time-domain input values representing an audio signal; and
  transform, within a transform circuit, the input values into spectral coefficients using a Modified Discrete Cosine Transform (MDCT) that is recursively decimated into a plurality of 5-point transforms, wherein at least one of the plurality of 5-point transforms includes at least one Discrete Cosine Transform type II (DCT-II) (802) that takes an input vector [x0, x1, x2, x3, x4] to produce an output vector [X0, X1, X2, X3, X4] and is characterized by at least a plurality of the intermediate results:

$w1 = x0 + x4;$ $w2 = x4 - x0;$ $w3 = x3 - x1;$ $w4 = x3 + x1;$ $w5 = w1 + w4;$ $w6 = w4 - w1;$ $u1 = x2 - \alpha w5;$ $u2 = x2 + w5;$ $u3 = \beta w2 + \gamma w3;$ $u4 = \beta w3 - \gamma w2;$ $u5 = \delta w6;$ such that $X0 = u2;$ $X1 = u4;$ $X2 = u4 - u1;$ $X3 = u3;$ $X4 = u1 + u5;$ where $\alpha = \frac{1}{4}$;

$\beta = \cos\left(\frac{3\pi}{10}\right)$;

$\gamma = -\cos\left(\frac{\pi}{10}\right)$;

and $\delta = -\frac{\sqrt{5}}{4}$.

36. A non-transitory machine-readable storage medium comprising instructions operational for scalable speech and audio encoding, which when executed by one or more processors causes the processors to:
obtain time-domain input values representing an audio signal; and
transform the input values into spectral coefficients using a Modified Discrete Cosine Transform (MDCT) that is recursively decimated into a plurality of 5-point transforms, wherein at least one of the plurality of 5-point transforms includes at least one Discrete Cosine Transform type II (DCT-II) (802) that takes an input vector [x0, x1, x2, x3, x4] to produce an output vector [X0, X1, X2, X3, X4] and is characterized by at least a plurality of the intermediate results:

$w1=x0+x4$;

$w2=x4-x0$;

$w3=x3-x1$;

$w4=x3+x1$;

$w5=w1+w4$;

$w6=w4-w1$;

$u1=x2-\alpha w5$;

$u2=x2+w5$;

$u3=\beta w2+\gamma w3$;

$u4=\beta w3-\gamma w2$;

$u5=\delta w6$;

such that $X0=u2$;

$X1=u4$;

$X2=u4-u1$;

$X3=u3$;

$X4=u1+u5$;

where $\alpha = \frac{1}{4}$;

$\beta = \cos\left(\frac{3\pi}{10}\right)$;

$\gamma = -\cos\left(\frac{\pi}{10}\right)$;

and $\delta = -\frac{\sqrt{5}}{4}$.

37. A method of computing inverse transform values within a scalable speech and audio decoder device, comprising:
receiving, at an input circuit, spectral coefficient input values representing an audio signal; and
transforming, within a transform circuit, the spectral coefficient input values into time-domain output values using an Inverse Modified Discrete Cosine Transform (IMDCT) that is recursively decimated into a plurality of smaller size 5-point inverse transforms, wherein the plurality of 5-point inverse transforms includes at least one of either:
an Inverse Discrete Cosine Transform type II (IDCT-II) having a longest path length of four operations or less and the IDCT-II having a maximum of eight multiplication operations or less, or
an Inverse Discrete Cosine Transform type IV (IDCT-IV) having a longest path length of five operations or less and the IDCT-IV having a maximum of sixteen multiplication operations or less.

38. The method of claim 37, wherein at least one of the plurality of 5-point inverse transforms includes at least one Inverse Discrete Cosine Transform type II (DCT-II) (3202) factorized by twelve (12) addition operations, four (4) multiplication operations, two (2) shift operations, and a longest path length of four (4) operations.

39. The method of claim 37, wherein at least one of the plurality of 5-point inverse transforms includes at least one Inverse Discrete Cosine Transform type II (IDCT-II) (3202) that takes an input vector [X0, X1, X2, X3, X4] to produce an output vector [x0, x1, x2, x3, x4] and is characterized by at least a plurality of the intermediate results:

$u1=X4-X2$;

$u5=X4+X2$;

$w0=X0+u1$;

$w5=X0-\alpha u1$;

$w2=\beta X3-\gamma X1$;

$w3=\gamma X3-\beta X1$;

$w6=\delta u5$;

$w1=w5-w6$;

$w4=w5+w6$;

such that $x0=w1-w2$;

$x1=w4+w3$;

$x2=w0$;

$x3=w4-w3$;

$x4=w1+w2$;

where $\alpha = \frac{1}{4}$;

$\beta = \cos\left(\frac{3\pi}{10}\right)$;

$\gamma = -\cos\left(\frac{\pi}{10}\right)$;

$\delta = -\frac{\sqrt{5}}{4}$.

40. The method of claim 37, further comprising:
performing a windowing operation on the input values after performing the inverse transformation, wherein the windowing operation implements an asymmetric window function.

41. The method of claim 37, wherein the IMDCT implements at least one of a 640, 320, 160, 80, 40-point transform using a 5-point Inverse Discrete Cosine Transform type II.

42. The method of claim 37, wherein the IMDCT implements at least one of a 640, 320, 160, 80, 40-point transform using a 5-point Inverse Discrete Cosine Transform type IV.

43. The method of claim 37, wherein the IMDCT implements at least one of a 640, 320, 160, 80, 40-point transform using a 5-point Inverse Discrete Cosine Transform type II and a 5-point Inverse Discrete Cosine Transform type IV.

44. The method of claim 37, wherein the IMDCT implements at least one of a 640, 320, 160, 80, 40-point transform using a 5-point Inverse Discrete Sine Transform type IV.

45. A scalable speech and audio decoder device, comprising:
an Inverse Discrete Cosine Transform (DCT)-type transform layer circuit adapted to
receive, at an input circuit, spectral coefficient input values representing an audio signal; and
transform, within a transform circuit, the spectral coefficient input values into time-domain output values using an Inverse Modified Discrete Cosine Transform (IMDCT) that is recursively decimated into a plurality of smaller size 5-point inverse transforms, wherein the plurality of 5-point inverse transforms includes at least one of either:
an Inverse Discrete Cosine Transform type II (IDCT-II) having a longest path length of four operations or less and the IDCT-II having a maximum of eight multiplication operations or less, or
an Inverse Discrete Cosine Transform type IV (IDCT-IV) having a longest path length of five operations or less and the IDCT-IV having a maximum of sixteen multiplication operations or less.

46. The device of claim 45, wherein at least one of the plurality of 5-point inverse transforms includes at least one Inverse Discrete Cosine Transform type II (DCT-II) (3202) factorized by twelve (12) addition operations, four (4) multiplication operations, two (2) shift operations, and a longest path length of four (4) operations.

47. The device of claim 45, wherein at least one of the plurality of 5-point inverse transforms includes at least one Inverse Discrete Cosine Transform type II (IDCT-II) (3202) that takes an input vector [X0, X1, X2, X3, X4] to produce an output vector [x0, x1, x2, x3, x4] and is characterized by at least a plurality of the intermediate results:

$u1 = X4 - X2$;

$u5 = X4 + X2$;

$w0 = X0 + u1$;

$w5 = X0 - \alpha u1$;

$w2 = \beta X3 - \gamma X1$;

$w3 = \gamma X3 - \beta X1$;

$w6 = \delta u5$;

$w1 = w5 - w6$;

$w4 = w5 + w6$;

such that $x0 = w1 - w2$;

$x1 = w4 + w3$;

$x2 = w0$;

$x3 = w4 - w3$;

$x4 = w1 + w2$;

where $\alpha = \frac{1}{4}$;

$\beta = \cos\left(\frac{3\pi}{10}\right)$;

$\gamma = -\cos\left(\frac{\pi}{10}\right)$;

$\delta = -\frac{\sqrt{5}}{4}$.

48. A scalable speech and audio decoder device, comprising:
means for receiving spectral coefficient input values representing an audio signal; and
means transforming the spectral coefficient input values into time-domain output values using an Inverse Modified Discrete Cosine Transform (IMDCT) that is recursively decimated into a plurality of smaller size 5-point inverse transforms, wherein the plurality of 5-point inverse transforms includes at least one of either:
an Inverse Discrete Cosine Transform type II (IDCT-II) having a longest path length of four operations or less and the IDCT-II having a maximum of eight multiplication operations or less, or
an Inverse Discrete Cosine Transform type IV (IDCT-IV) having a longest path length of five operations or less and the IDCT-IV having a maximum of sixteen multiplication operations or less.

49. The device of claim 48, wherein at least one of the plurality of 5-point inverse transforms includes at least one Inverse Discrete Cosine Transform type II (DCT-II) (3202) factorized by twelve (12) addition operations, four (4) multiplication operations, two (2) shift operations, and a longest path length of four (4) operations.

50. The device of claim 48, wherein at least one of the plurality of 5-point inverse transforms includes at least one Inverse Discrete Cosine Transform type II (IDCT-II) (3202) that takes an input vector [X0, X1, X2, X3, X4] to produce an output vector [x0, x1, x2, x3, x4] and is characterized by at least a plurality of the intermediate results:

$u1 = X4 - X2$;

$u5 = X4 + X2$;

$w0 = X0 + u1;$ $w5 = X0 - \alpha u1;$ $w2 = \beta X3 - \gamma X1;$ $w3 = \gamma X3 - \beta X1;$ $w6 = \delta u5;$ $w1 = w5 - w6;$ $w4 = w5 + w6;$ such that $x0 = w1 - w2;$ $x1 = w4 + w3;$ $x2 = w0;$ $x3 = w4 - w3;$ $x4 = w1 + w2;$ where $\alpha = \frac{1}{4};$ $\beta = \cos\left(\frac{3\pi}{10}\right);$ $\gamma = -\cos\left(\frac{\pi}{10}\right);$ $\delta = -\frac{\sqrt{5}}{4}.$

51. A processor including a scalable speech and audio decoding circuit adapted to:
receive, at an input circuit, spectral coefficient input values representing an audio signal; and
transform, within a transform circuit, the spectral coefficient input values into time-domain output values using an Inverse Modified Discrete Cosine Transform (IMDCT) that is recursively decimated into a plurality of 5-point inverse transforms,
wherein at least one of the plurality of 5-point inverse transforms includes at least one Inverse Discrete Cosine Transform type II (IDCT-II) (3202) that takes an input vector [X0, X1, X2, X3, X4] to produce an output vector [x0, x1, x2, x3, x4] and is characterized by at least a plurality of the intermediate results:

$u1 = X4 - X2;$ $u5 = X4 + X2;$ $w0 = X0 + u1;$ $w5 = X0 - \alpha u1;$ $w2 = \beta X3 - \gamma X1;$ $w3 = \gamma X3 - \beta X1;$ $w6 = \delta u5;$ $w1 = w5 - w6;$ $w4 = w5 + w6;$ such that $x0 = w1 - w2;$ $x1 = w4 + w3;$ $x2 = w0;$ $x3 = w4 - w3;$ $x4 = w1 + w2;$ where $\alpha = \frac{1}{4};$ $\beta = \cos\left(\frac{3\pi}{10}\right);$ $\gamma = -\cos\left(\frac{\pi}{10}\right);$ $\delta = -\frac{\sqrt{5}}{4}.$

52. A non-transitory machine-readable storage medium comprising instructions operational for scalable speech and audio decoding, which when executed by one or more processors causes the processors to:
receive spectral coefficient input values representing an audio signal; and
transform the spectral coefficient input values into time-domain output values using an Inverse Modified Discrete Cosine Transform (IMDCT) that is recursively decimated into a plurality of 5-point inverse transforms, wherein at least one of the plurality of 5-point inverse transforms includes at least one Inverse Discrete Cosine Transform type II (IDCT-II) (3202) that takes an input vector [X0, X1, X2, X3, X4] to produce an output vector [x0, x1, x2, x3, x4] and is characterized by at least a plurality of the intermediate results:

$u1 = X4 - X2;$ $u5 = X4 + X2;$ $w0 = X0 + u1;$ $w5 = X0 - \alpha u1;$ $w2 = \beta X3 - \gamma X1;$ $w3 = \gamma X3 - \beta X1;$ $w6 = \delta u5;$ $w1 = w5 - w6;$ $w4 = w5 + w6;$ such that $x0 = w1 - w2;$ $x1 = w4 + w3;$ $x2 = w0;$ $x3 = w4 - w3;$ $x4 = w1 + w2;$ where $\alpha = \frac{1}{4}$;

$\beta = \cos\left(\frac{3\pi}{10}\right)$;

$\gamma = -\cos\left(\frac{\pi}{10}\right)$;

$\delta = -\frac{\sqrt{5}}{4}$.

* * * * *